US012669683B2

(12) United States Patent
Lin et al.

(10) Patent No.: US 12,669,683 B2
(45) Date of Patent: Jun. 30, 2026

(54) PHOTOGRAPHING LENS ASSEMBLY, IMAGE CAPTURING UNIT AND ELECTRONIC DEVICE

(71) Applicant: LARGAN PRECISION CO., LTD., Taichung City (TW)

(72) Inventors: Yu Jui Lin, Taichung City (TW); Yu-Han Shih, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 331 days.

(21) Appl. No.: 18/440,130

(22) Filed: Feb. 13, 2024

(65) Prior Publication Data

US 2025/0231378 A1 Jul. 17, 2025

(30) Foreign Application Priority Data

Jan. 12, 2024 (TW) .................................. 113101327

(51) Int. Cl.
  *G02B 13/00* (2006.01)
  *G02B 9/64* (2006.01)
(52) U.S. Cl.
  CPC ........... *G02B 13/0045* (2013.01); *G02B 9/64* (2013.01)
(58) Field of Classification Search
  None
  See application file for complete search history.

(56) References Cited

U.S. PATENT DOCUMENTS 3,051,053 A 8/1962 Berger
3,063,341 A 11/1962 Beck 3,537,774 A 11/1970 Kingslake
3,926,503 A 12/1975 Takahashi et al.
4,089,591 A 5/1978 Glatzel et al.
4,316,653 A 2/1982 Shimizu
5,815,312 A 9/1998 Takato
(Continued)

FOREIGN PATENT DOCUMENTS

CN 108828749 A 11/2018
CN 108873253 A 11/2018
(Continued)

OTHER PUBLICATIONS

TW Office Action dated Jul. 16, 2024 in application 113101327.
GB Search and Examination Report dated Apr. 29, 2025 as received in Application No. 2417343.7.

*Primary Examiner* — Richard H Kim
(74) *Attorney, Agent, or Firm* — Maschoff Brennan

(57) ABSTRACT

A photographing lens assembly includes seven lens elements which are, in order from an object side to an image side along an optical path: a first lens element, a second lens element, a third lens element, a fourth lens element, a fifth lens element, a sixth lens element and a seventh lens element. The first lens element has negative refractive power. The second lens element has an image-side surface being concave in a paraxial region thereof. The third lens element has an image-side surface being convex in a paraxial region thereof. The fourth lens element has negative refractive power. The sixth lens element with positive refractive power has an object-side surface being convex in a paraxial region thereof and an image-side surface being convex in a paraxial region thereof. The seventh lens element has an image-side surface having at least one inflection point.

29 Claims, 31 Drawing Sheets

(56)  References Cited

U.S. PATENT DOCUMENTS

| | | | |
|---|---|---|---|
| 8,670,194 B2 | 3/2014 | Yoshinaga et al. | |
| 10,481,370 B2 | 11/2019 | Koida et al. | |
| 11,125,978 B2 | 9/2021 | Tseng et al. | |
| 11,353,686 B2 | 6/2022 | Baik et al. | |
| 11,662,554 B2 | 5/2023 | Sun et al. | |
| 11,698,511 B2 | 7/2023 | Chen et al. | |
| 11,835,685 B2 | 12/2023 | Chen et al. | |
| 2016/0085053 A1 | 3/2016 | Asami | |
| 2016/0109687 A1 | 4/2016 | Son | |
| 2016/0154230 A1 | 6/2016 | Kakakura | |
| 2017/0059833 A1 | 3/2017 | Saito | |
| 2020/0400924 A1 | 12/2020 | Xu et al. | |
| 2021/0373284 A1 | 12/2021 | Wang et al. | |
| 2022/0003966 A1 | 1/2022 | Chen et al. | |
| 2022/0163772 A1 | 5/2022 | Zhang et al. | |
| 2022/0163784 A1 | 5/2022 | Harada | |
| 2022/0308323 A1 | 9/2022 | Zou et al. | |
| 2023/0333348 A1 | 10/2023 | Meng-Kuan | |
| 2024/0134154 A1 | 4/2024 | Fan et al. | |
| 2025/0383528 A1* | 12/2025 | Kim | G02B 9/64 |

FOREIGN PATENT DOCUMENTS

| | | | |
|---|---|---|---|
| CN | 109960004 A | 7/2019 | |
| CN | 111025577 A | 4/2020 | |
| CN | 111505810 A | 8/2020 | |
| CN | 111505811 A | 8/2020 | |
| CN | 111505812 A | 8/2020 |
| CN | 112230370 A | 1/2021 |
| CN | 112230396 A | 1/2021 |
| CN | 112578536 A | 3/2021 |
| CN | 113093371 A | 7/2021 |
| CN | 113484997 A | 10/2021 |
| CN | 113721347 A | 11/2021 |
| CN | 113866994 A | 12/2021 |
| CN | 113885176 A | 1/2022 |
| CN | 114460723 A | 5/2022 |
| CN | 114740599 A | 7/2022 |
| CN | 110542999 B | 9/2022 |
| CN | 115128769 A | 9/2022 |
| CN | 115951496 A | 4/2023 |
| CN | 116009216 A | 4/2023 |
| CN | 218917770 U | 4/2023 |
| EP | 4 279 973 A1 | 11/2023 |
| JP | S50-45627 A | 4/1975 |
| JP | H08-248315 A | 9/1996 |
| TW | 202240232 A | 10/2022 |
| TW | 202336479 A | 9/2023 |
| WO | 2012/026069 A1 | 3/2012 |
| WO | 2014/129149 A1 | 8/2014 |
| WO | 2021/128064 A1 | 7/2021 |
| WO | 2021/128147 A1 | 7/2021 |
| WO | 2021/128185 A1 | 7/2021 |
| WO | 2021/159406 A1 | 8/2021 |
| WO | 2022/082734 A1 | 4/2022 |
| WO | 2022/174724 A1 | 8/2022 |
| WO | 2023/145678 A1 | 8/2023 |

* cited by examiner

100

101

102

103

104

PHOTOGRAPHING LENS ASSEMBLY, IMAGE CAPTURING UNIT AND ELECTRONIC DEVICE

RELATED APPLICATIONS

This application claims priority to Taiwan Application 113101327, filed on Jan. 12, 2024, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the first lens element has negative refractive power. Preferably, the image-side surface of the second lens element is concave in a paraxial region thereof. Preferably, the image-side surface of the third lens element is convex in a paraxial region thereof. Preferably, the fourth lens element has negative refractive power. Preferably, the sixth lens element has positive refractive power. Preferably, the object-side surface of the sixth lens element is convex in a paraxial region thereof. Preferably, the image-side surface of the sixth lens element is convex in a paraxial region thereof. Preferably, the image-side surface of the seventh lens element has at least one inflection point.

When an axial distance between the object-side surface of the first lens element and an image surface is TL, a focal length of the photographing lens assembly is f, a curvature radius of the object-side surface of the fifth lens element is R9, and a curvature radius of the object-side surface of the sixth lens element is R11, the following conditions are preferably satisfied:

$$1.80 < TL/f < 4.20; \text{ and}$$

$$0.00 < 100 \times |R11/R9| < 23.50.$$

According to another aspect of the present disclosure, a photographing lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the first lens element has negative refractive power. Preferably, the image-side surface of the first lens element is concave in a paraxial region thereof. Preferably, the image-side surface of the second lens element is concave in a paraxial region thereof. Preferably, the fourth lens element has negative refractive power. Preferably, the sixth lens element has positive refractive power. Preferably, the object-side surface of the sixth lens element is convex in a paraxial region thereof. Preferably, the image-side surface of the sixth lens element is convex in a paraxial region thereof. Preferably, the image-side surface of the seventh lens element has at least one inflection point.

When an axial distance between the object-side surface of the first lens element and an image surface is TL, a focal length of the photographing lens assembly is f, a focal length of the first lens element is f1, a focal length of the fourth lens element is f4, a focal length of the sixth lens element is f6, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a central thickness of the second lens element is CT2, a curvature radius of the object-side surface of the first lens element is R1, and a curvature radius of the object-side surface of the sixth lens element is R11, the following conditions are preferably satisfied:

$$1.80 < TL/f < 4.20;$$

$$1.85 < (|f/f1| + |f/f6|)/|f/f4| < 12.50;$$

$$0.10 < (T12 + T23)/CT2 < 1.80;$$

$$0.50 < (|R1| + |R11|)/f < 10.00; \text{ and}$$

$$(T23 + T34)/(T12 + T45) < 1.85.$$

According to another aspect of the present disclosure, a photographing lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the first lens element has negative refractive power. Preferably, the object-side surface of the first lens element is concave in a paraxial region thereof. Preferably, the sixth lens element has positive refractive power. Preferably, the image-side surface of the seventh lens element has at least one inflection point.

When an axial distance between the object-side surface of the first lens element and an image surface is TL, a focal length of the photographing lens assembly is f, a sum of central thicknesses of all lens elements of the photographing lens assembly is ΣCT, a sum of axial distances between each of all adjacent lens elements of the photographing lens assembly is ΣAT, a focal length of the fifth lens element is f5, a focal length of the sixth lens element is f6, an axial distance between the object-side surface of the first lens element and the image-side surface of the seventh lens element is TD, a central thickness of the first lens element is CT1, a central thickness of the second lens element is CT2, a central thickness of the fourth lens element is CT4, and a central thickness of the fifth lens element is CT5, the following conditions are preferably satisfied:

$$1.80 < TL/f < 4.10;$$

$$2.65 < \sum CT / \sum AT < 10.00;$$

$$0.00 \le |f6/f5| < 0.55;$$

$$1.85 < 10 \times f/TD < 3.90; \text{ and}$$

$$1.40 < (CT2 + CT5)/(CT1 + CT4).$$

According to another aspect of the present disclosure, an image capturing unit includes one of the aforementioned photographing lens assemblies and an image sensor, wherein the image sensor is disposed on the image surface of the photographing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
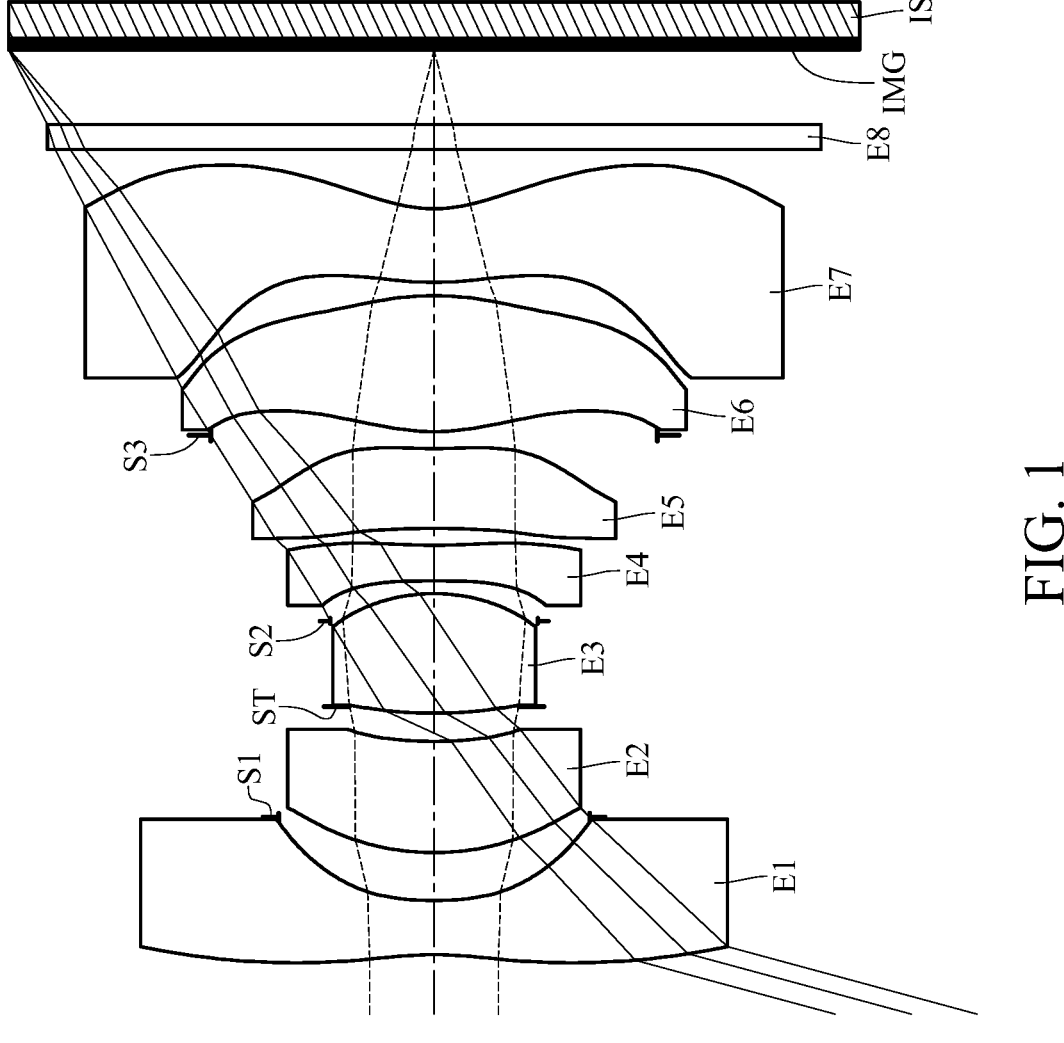
FIG. 1 is a schematic view of an image capturing unit according to the 1st embodiment of the present disclosure.

A photographing lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element has negative refractive power. Therefore, it is favorable for enlarging the field of view so as to obtain a relatively large range of image information. The object-side surface of the first lens element can be concave in a paraxial region thereof. Therefore, it is favorable for correcting aberrations caused by incident light from a large field of view. The image-side surface of the first lens element can be concave in a paraxial region thereof. Therefore, it is favorable for adjusting the lens shape of the first lens element and harmonizing the optical path so as to obtain a proper balance between the viewing angle and the image size.

The object-side surface of the second lens element can be convex in a paraxial region thereof. Therefore, it is favorable for effectively receiving light from the large field of view and adjusting the deflection angle of the optical path, thereby reducing the outer diameter of the photographing lens assembly at the object end thereof. The image-side surface of the second lens element can be concave in a paraxial region thereof. Therefore, it is favorable for correcting aberrations such as spherical aberration and coma, thereby improving image quality.

The third lens element can have positive refractive power. Therefore, it is favorable for converging light to reduce the size of the photographing lens assembly. The object-side surface of the third lens element can be convex in a paraxial region thereof. Therefore, it is favorable for collaborating with the lens shape of the image-side surface of the second lens element so as to further correct aberrations. The image-side surface of the third lens element can be convex in a paraxial region thereof. Therefore, it is favorable for converging light to prevent inefficient light convergence at the periphery due to insufficient light deflection.

The fourth lens element can have negative refractive power. Therefore, it is favorable for adjusting the optical path to enlarge the image surface, and it is also favorable for correcting aberrations such as spherical aberration generated by size reduction.

The sixth lens element can have positive refractive power. Therefore, it is favorable for converging light and reducing the length of the photographing lens assembly at the image end thereof. The object-side surface of the sixth lens element can be convex in a paraxial region thereof. Therefore, it is favorable for preventing light divergence and reducing the back focal length while reducing field curvature. The image-side surface of the sixth lens element can be convex in a paraxial region thereof. Therefore, it is favorable for correcting field curvature and correcting distortion of the photographing lens assembly so as to improve image quality.

The seventh lens element can have negative refractive power. Therefore, it is favorable for effectively controlling the back focal length so as to prevent an overly long total track length of the lens unit. The image-side surface of the seventh lens element can be concave in a paraxial region thereof. Therefore, it is favorable for reducing field curvature and reducing the back focal length to prevent an overly long total track length.

According to the present disclosure, at least one of the object-side surface and the image-side surface of the sixth lens element can have at least one inflection point. Therefore, it is favorable for enhancing aberration correction ability of the sixth lens element at the periphery thereof, and it is also favorable for reducing surface reflection of light from the large field of view. Moreover, the object-side surface of the sixth lens element can have at least one inflection point. Therefore, it is favorable for increasing design flexibility of peripheral lens shape of the object-side surface of the sixth lens element, and it is also favorable for balancing convergence quality of incident light from the large field of view. Moreover, the image-side surface of the seventh lens element has at least one inflection point.

Figure 27:
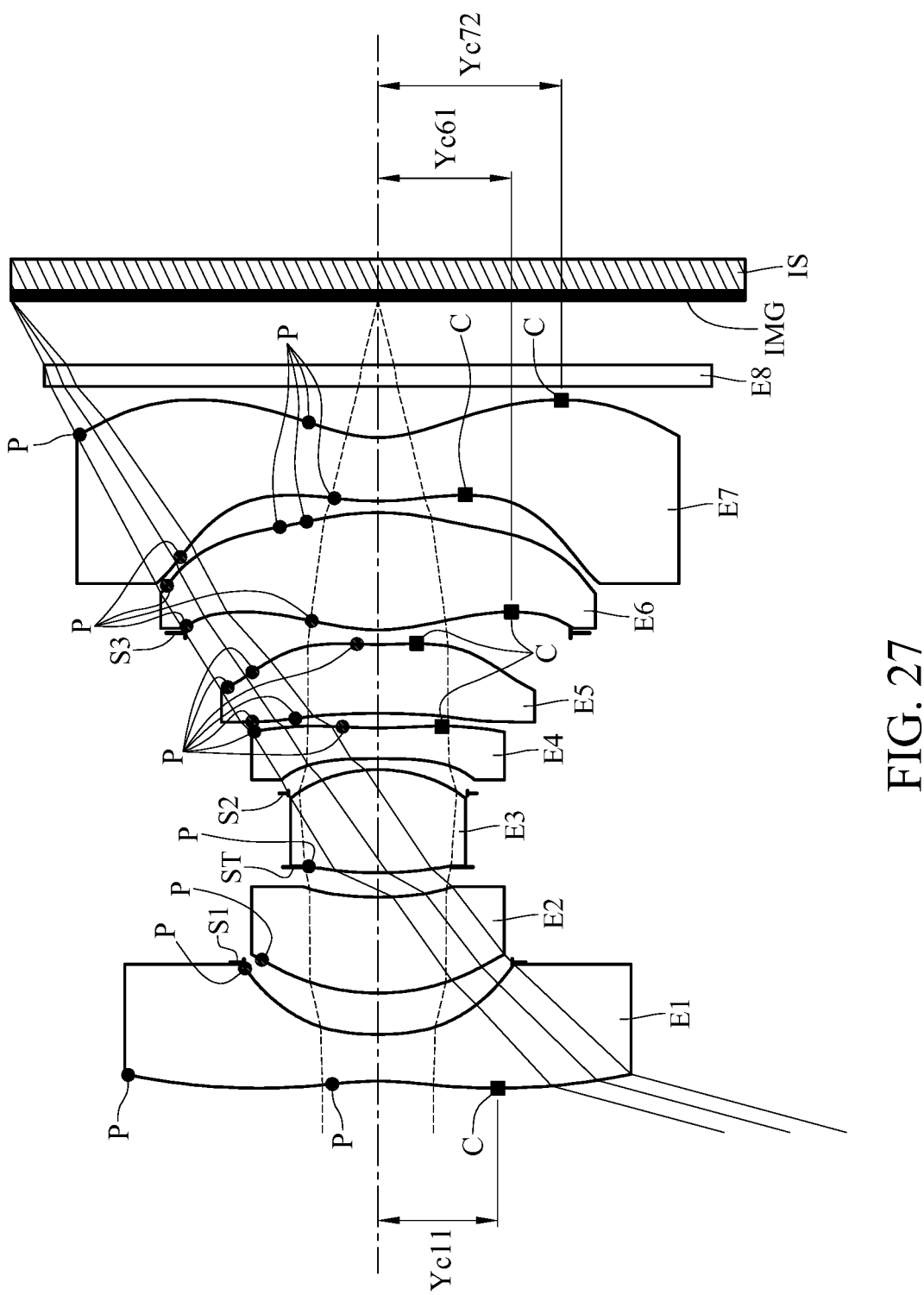
FIG. 27 shows a schematic view of inflection points on lens surfaces, critical points on lens surfaces, Yc11, Yc61 and Yc72 according to the 1st embodiment of the present disclosure.

Therefore, it is favorable for adjusting light incident angle onto the image surface so as to prevent vignetting at the image periphery while correcting distortion. Please refer to FIG. 27, which shows a schematic view of inflection points P on the object-side surface of the sixth lens element E6, the image-side surface of the sixth lens element E6 and the image-side surface of the seventh lens element E7 according to the 1st embodiment of the present disclosure. The above-mentioned inflection points P on the object-side surface of the sixth lens element, the image-side surface of the sixth lens element and the image-side surface of the seventh lens element in FIG. 27 are exemplary. Each of lens surfaces in various embodiments of the present disclosure may also have one or more inflection points.

According to the present disclosure, at least one of the object-side surface and the image-side surface of each of all lens elements of the photographing lens assembly can be aspheric. Therefore, it is favorable for effectively eliminating limitation on optical design to easily harmonize the optical path for achieving target specifications.

According to the present disclosure, at least four lens elements of the photographing lens assembly can be made of plastic material. Therefore, it is favorable for reducing manufacturing costs and effectively increasing manufacturability of aspheric lens elements.

According to the present disclosure, the photographing lens assembly can further comprise an aperture stop that can be disposed between the first lens element and the third lens element. Therefore, it is favorable for effectively reducing the total track length of the photographing lens assembly and satisfying an imaging effect with high brightness while maintaining the specifications of a relatively wide viewing angle of photographing and a relatively large range of imaging. Moreover, the aperture stop can also be disposed between the second lens element and the third lens element.

When an axial distance between the object-side surface of the first lens element and an image surface is TL, and a focal length of the photographing lens assembly is f, the following condition is satisfied: 1.80<TL/f<4.20. Therefore, it is favorable for obtaining a proper balance between the total track length and the field of view. Moreover, the following condition can also be satisfied: 1.80<TL/f<4.10. Moreover, the following condition can also be satisfied: 1.95<TL/f<4.00. Moreover, the following condition can also be satisfied: 3.08≤TL/f≤3.78.

When a curvature radius of the object-side surface of the fifth lens element is R9, and a curvature radius of the object-side surface of the sixth lens element is R11, the following condition can be satisfied: 0.00<100×|R11/R9|<23.50. Therefore, it is favorable for collaborating the lens shapes of the object-side surface of the fifth lens element and the object-side surface of the sixth lens element, thereby facilitating the adjustment of the optical path at the image end of the photographing lens assembly and improving image quality. Moreover, the following condition can also be satisfied: 0.00<100×|R11/R9|<22.00. Moreover, the following condition can also be satisfied: 0.11≤100×|R11/R9|≤19.34.

When the focal length of the photographing lens assembly is f, a focal length of the first lens element is f1, a focal length of the fourth lens element is f4, and a focal length of the sixth lens element is f6, the following condition can be satisfied: 1.85<(|f/f1|+|f/f6|)/|f/f4|<12.50. Therefore, it is favorable for adjusting the refractive powers of the first lens element, the fourth lens element and the sixth lens element to balance convergence or divergence of light from the large field of view, thereby improving convergence quality at various fields of view. Moreover, the following condition can also be satisfied: $1.85<(|f/f1|+|f/f6|)/|f/f4|<8.00$. Moreover, the following condition can also be satisfied: $2.05<(|f/f1|+|f/f6|)/|f/f4|<7.00$. Moreover, the following condition can also be satisfied: $2.64≤(|f/f1|+|f/f6|)/|f/f4|≤4.76$.

When an axial distance between the first lens element and the second lens element is T12, an axial distance between the second lens element and the third lens element is T23, and a central thickness of the second lens element is CT2, the following condition can be satisfied: $0.10<(T12+T23)/CT2<1.80$. Therefore, it is favorable for adjusting the arrangement space of the second lens element so as to reduce the size of the photographing lens assembly at the object end thereof. Moreover, the following condition can also be satisfied: $0.15<(T12+T23)/CT2<1.70$. Moreover, the following condition can also be satisfied: $0.20<(T12+T23)/CT2<1.70$. Moreover, the following condition can also be satisfied: $0.62≤(T12+T23)/CT2≤1.29$.

When a curvature radius of the object-side surface of the first lens element is R1, the curvature radius of the object-side surface of the sixth lens element is R11, and the focal length of the photographing lens assembly is f, the following condition can be satisfied: $0.50<(|R1|+|R11|)/f<10.00$. Therefore, it is favorable for adjusting the ratio of the total focal length with respect to the curvature radius of the object-side surface of the first lens element and the curvature radius of the object-side surface of the sixth lens element, such that the said two lens surfaces have relatively curved lens shapes, thereby effectively controlling the optical path and thus enlarging the image surface. Moreover, the following condition can also be satisfied: $0.80<(|R1|+|R11|)/f<7.00$. Moreover, the following condition can also be satisfied: $1.30<(|R1|+|R11|)/f<6.30$. Moreover, the following condition can also be satisfied: $1.80≤(|R1|+|R11|)/f≤4.08$.

When the axial distance between the first lens element and the second lens element is T12, the axial distance between the second lens element and the third lens element is T23, an axial distance between the third lens element and the fourth lens element is T34, and an axial distance between the fourth lens element and the fifth lens element is T45, the following condition can be satisfied: $(T23+T34)/(T12+T45)<1.85$. Therefore, it is favorable for balancing the space arrangement of lens elements so as to reduce sensitivity of the photographing lens assembly. Moreover, the following condition can also be satisfied: $0.05<(T23+T34)/(T12+T45)<1.68$. Moreover, the following condition can also be satisfied: $0.17≤(T23+T34)/(T12+T45)≤0.68$.

When a sum of central thicknesses of all lens elements of the photographing lens assembly is $\Sigma CT$, and a sum of axial distances between each of all adjacent lens elements of the photographing lens assembly is $\Sigma AT$, the following condition can be satisfied: $2.65<\Sigma CT/\Sigma AT<10.00$. Therefore, it is favorable for arranging all lens elements closely to effectively utilize the space. Moreover, the following condition can also be satisfied: $2.75<\Sigma CT/\Sigma AT<9.50$. Moreover, the following condition can also be satisfied: $2.90≤\Sigma CT/\Sigma AT≤5.11$.

When a focal length of the fifth lens element is f5, and focal length of the sixth lens element is f6, the following condition can be satisfied: $0.00≤|f6/f5|<0.55$. Therefore, it is favorable for balancing overall refractive power arrangement of the photographing lens assembly and correcting aberrations and distortion by controlling the refractive ratio of the fifth and sixth lens elements. Moreover, the following condition can also be satisfied: $0.00≤|f6/f5|<0.48$. Moreover, the following condition can also be satisfied: $0.00≤|f6/f5|≤0.38$.

When the focal length of the photographing lens assembly is f, and an axial distance between the object-side surface of the first lens element and the image-side surface of the seventh lens element is TD, the following condition can be satisfied: $1.85<10×f/TD<3.90$. Therefore, it is favorable for effectively reducing the size of the lens unit so as to prevent an overly long total track length. Moreover, the following condition can also be satisfied: $2.50<10×f/TD<3.80$. Moreover, the following condition can also be satisfied: $2.80<10×f/TD<3.70$. Moreover, the following condition can also be satisfied: $3.08≤10×f/TD≤3.82$.

When a central thickness of the first lens element is CT1, the central thickness of the second lens element is CT2, a central thickness of the fourth lens element is CT4, and a central thickness of the fifth lens element is CT5, the following condition can be satisfied: $1.40<(CT2+CT5)/(CT1+CT4)$. Therefore, it is favorable for adjusting the arrangement space of lens elements so as to reduce manufacturing tolerance. Moreover, the following condition can also be satisfied: $1.40<(CT2+CT5)/(CT1+CT4)<4.60$. Moreover, the following condition can also be satisfied: $1.50<(CT2+CT5)/(CT1+CT4)<3.00$. Moreover, the following condition can also be satisfied: $1.72≤(CT2+CT5)/(CT1+CT4)≤2.12$.

When the central thickness of the fifth lens element is CT5, and a central thickness of the sixth lens element is CT6, and the following condition can be satisfied: $0.80<CT6/CT5<3.50$. Therefore, it is favorable for adjusting the ratio of the central thicknesses of the fifth and sixth lens elements so as to balance the refractive power arrangement of the fifth and sixth lens elements, thereby harmonizing the optical path of the photographing lens assembly at the image end thereof. Moreover, the following condition can also be satisfied: $0.90<CT6/CT5<3.00$.

When the focal length of the photographing lens assembly is f, and a composite focal length of the third lens element and the fourth lens element is f34, the following condition can be satisfied: $0.25<|f/f34|<1.25$. Therefore, it is favorable for adjusting the refractive powers of the third and fourth lens elements, thereby harmonizing the deflection direction of light from the large field of view. Moreover, the following condition can also be satisfied: $0.25<|f/f34|<1.00$.

When the curvature radius of the object-side surface of the sixth lens element is R11, a curvature radius of the image-side surface of the sixth lens element is R12, and the focal length of the photographing lens assembly is f, the following condition can be satisfied: $0.50<(|R11|+|R12|)/f<15.00$. Therefore, it is favorable for ensuring a relatively strong curvature radius of the lens shape of the sixth lens element, thereby converging light to reduce the total track length. Moreover, the following condition can also be satisfied: $0.80<(|R11|+|R12|)/f<10.00$. Moreover, the following condition can also be satisfied: $1.00<(|R11|+|R12|)/f<5.00$.

When the curvature radius of the object-side surface of the first lens element is R1, and a curvature radius of the image-side surface of the first lens element is R2, the following condition can be satisfied: $0.00<|R1+R2|/|R1-R2|<1.50$. Therefore, it is favorable for effectively balancing the curvature radii of the object-side surface and the image-side surface of the first lens element, thereby correcting aberrations caused by incident light from the large field of view. Moreover, the following condition can also be satisfied: $0.00<|R1+R2|/|R1-R2|<1.20$.

When the central thickness of the sixth lens element is CT6, and a central thickness of the seventh lens element is CT7, the following condition can be satisfied: $0.30<CT7/CT6<1.05$. Therefore, it is favorable for reducing manufacturing tolerance and thus improving yield rate.

When the focal length of the first lens element is f1, and a focal length of the third lens element is f3, the following condition can be satisfied: $0.10<|f1/f3|<5.00$. Therefore, it is favorable for effectively balancing the refractive powers of the first and third lens elements, thereby increasing the photography viewing angle and correcting off-axis aberrations. Moreover, the following condition can also be satisfied: $0.50<|f1/f3|<4.00$.

When a curvature radius of the object-side surface of the seventh lens element is R13, and a curvature radius of the image-side surface of the seventh lens element is R14, the following condition can be satisfied: $-0.30<(R13+R14)/(R13-R14)<10.00$. Therefore, it is favorable for adjusting the curvature radii of the object-side surface and the image-side surface of the seventh lens element, thereby correcting distortion of the photographing lens assembly. Moreover, the following condition can also be satisfied: $0.00<(R13+R14)/(R13-R14)<8.00$.

When an entrance pupil diameter of the photographing lens assembly is EPD, and a maximum image height of the photographing lens assembly (which can be half of a diagonal length of an effective photosensitive area of the image sensor) is ImgH, the following condition can be satisfied: $0.20<EPD/ImgH<0.50$. Therefore, it is favorable for increasing relative illuminance at the peripheral field of view and obtaining a proper balance between illuminance, the depth of view and the image size.

Figure 28:
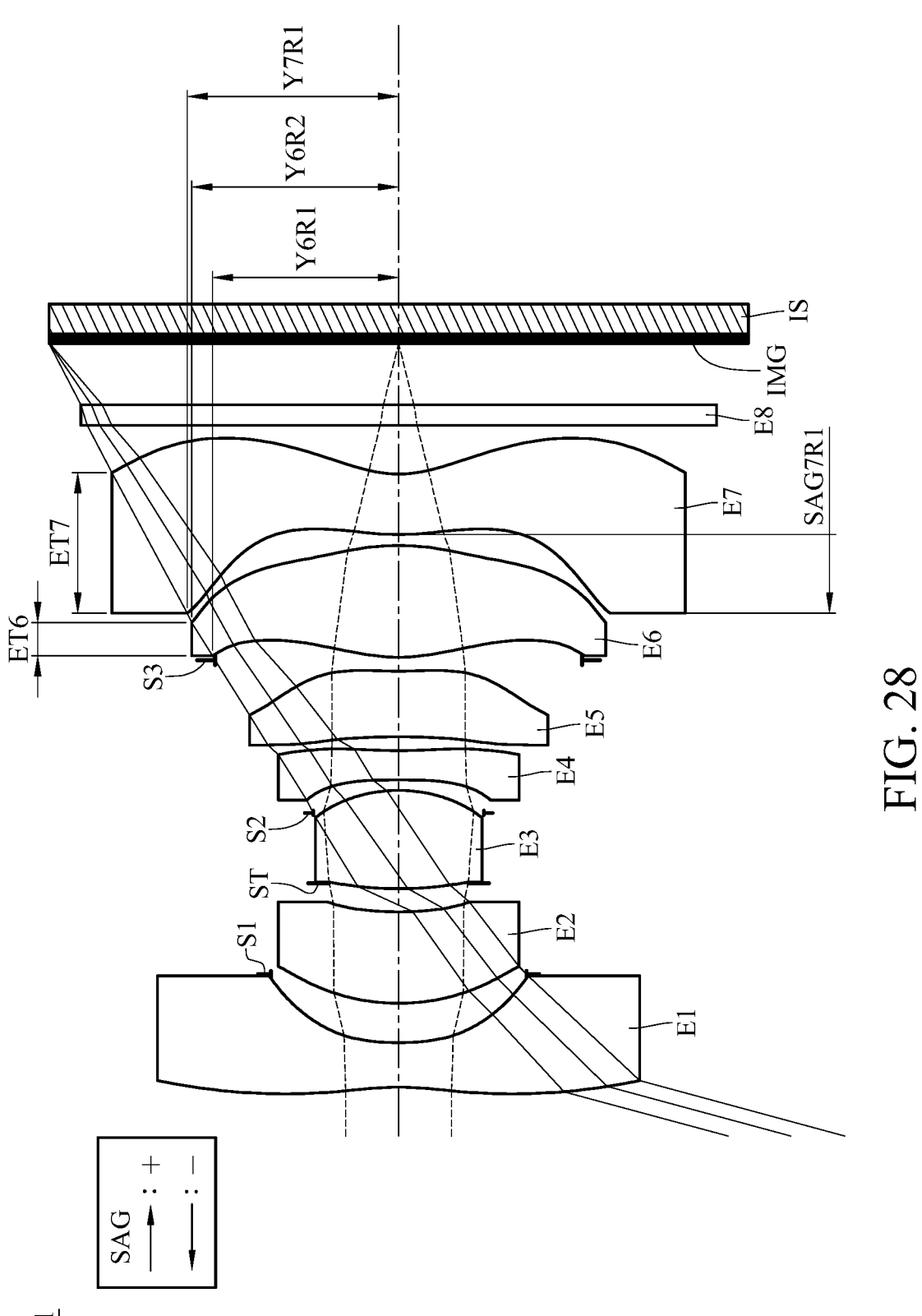
FIG. 28 shows a schematic view of ET6, ET7, SAG7R1, Y6R1, Y6R2 and Y7R1 according to the 1st embodiment of the present disclosure.

When a maximum effective radius of the object-side surface of the sixth lens element is Y6R1, and a maximum effective radius of the object-side surface of the seventh lens element is Y7R1, the following condition can be satisfied: $1.00<Y7R1/Y6R1<1.25$. Therefore, it is favorable for adjusting optical effective radii of the object-side surface of the sixth lens element and the object-side surface of the seventh lens element, thereby preventing total reflection of peripheral light due to an overly large deflection angle thereof. Please refer to FIG. 28, which shows a schematic view of Y6R1 and Y7R1 according to the 1st embodiment of the present disclosure.

When a vertical distance between a critical point on the image-side surface of the seventh lens element and an optical axis is Yc72, and a maximum effective radius of the image-side surface of the sixth lens element is Y6R2, the following condition can be satisfied: $0.70<Yc72/Y6R2<1.15$. Therefore, it is favorable for increasing flexibility of lens surfaces, thereby improving image quality of light from a wide field of view and response efficiency of the image sensor. Please refer to FIG. 27 and FIG. 28, which respectively show schematic views of Yc72 and Y6R2 according to the 1st embodiment of the present disclosure. The abovementioned critical point C on the image-side surface of the seventh lens element in FIG. 27 is exemplary. Each of lens surfaces in various embodiments of the present disclosure may also have one or more critical points in an off-axis region thereof.

When a maximum value of an absolute value of a distortion aberration on the image surface at various fields of view is |DIST|max, the following condition can be satisfied: $30.0\%<|DIST|max<80.0\%$. Therefore, it is favorable for effectively controlling image quality and thus preventing image deformation and image distortion. Moreover, the following condition can also be satisfied: $35.0\%<|DIST|max<70.0\%$.

When a maximum field of view of the photographing lens assembly is FOV, the following condition can be satisfied: $138.0$ degrees$<FOV<180.0$ degrees. Therefore, it is favorable for standardizing the viewing angle specification, thereby obtaining a proper balance between the large field of view and image quality of the photographing lens assembly. Moreover, the following condition can also be satisfied: $138.0$ degrees$<FOV<170.0$ degrees. Moreover, the following condition can also be satisfied: $140.0$ degrees$<FOV<160.0$ degrees.

When the axial distance between the first lens element and the second lens element is T12, and a central thickness of the third lens element is CT3, the following condition can be satisfied: $0.10<T12/CT3<0.90$. Therefore, it is favorable for increasing manufacturability, thereby balancing size distribution of the lens unit at the object end thereof. Moreover, the following condition can also be satisfied: $0.25<T12/CT3<0.90$.

When the focal length of the fourth lens element is f4, and the focal length of the sixth lens element is f6, the following condition can be satisfied: $-10.50<f4/f6<-1.00$. Therefore, it is favorable for collaborating refractive powers of the fourth and sixth lens elements, thereby correcting aberrations and astigmatism and adjusting the viewing angle. Moreover, the following condition can also be satisfied: $-6.50<f4/f6<-1.00$.

When the curvature radius of the object-side surface of the first lens element is R1, and a curvature radius of the image-side surface of the second lens element is R4, the following condition can be satisfied: $0.00<|(R1+R4)/(R1-R4)|<2.20$. Therefore, it is favorable for adjusting the curvature radius of the object-side surface of the first lens element so as to allow light from the large field of view to enter the photographing lens assembly with the balance performed by adjusting the curvature radius of the image-side surface of the second lens element, thereby preventing excessive aberrations. Moreover, the following condition can also be satisfied: $0.00<|(R1+R4)/(R1-R4)|<1.50$. Moreover, the following condition can also be satisfied: $0.00<|(R1+R4)/(R1-R4)|<0.80$.

When the focal length of the first lens element is f1, and a focal length of the seventh lens element is f7, the following condition can be satisfied: $0.00<f1/f7<1.50$. Therefore, it is favorable for adjusting refractive power arrangement of the first and seventh lens elements, thereby increasing the balance of the photographing lens assembly. Moreover, the following condition can also be satisfied: $0.00<f1/f7<1.30$.

When the axial distance between the first lens element and the second lens element is T12, the axial distance between the second lens element and the third lens element is T23, and the central thickness of the second lens element is CT2, the following condition can be satisfied: $0.20<T12/(CT2+T23)<3.00$. Therefore, it is favorable for balancing the space arrangement of lens elements and thus reducing the length of the photographing lens assembly at the object end thereof. Moreover, the following condition can also be satisfied: $0.20<T12/(CT2+T23)<1.50$.

When an Abbe number of the second lens element is V2, an Abbe number of the fourth lens element is V4, and an Abbe number of the fifth lens element is V5, the following condition can be satisfied: $0.30<(V2+V4)/V5<1.80$. Therefore, a proper selection of materials of the second, fourth and fifth lens elements is favorable for effectively correcting chromatic aberration of the photographing lens assembly so as to prevent image overlapping, thereby improving image quality. Moreover, the following condition can also be satisfied: $0.50 < (V2+V4)/V5 < 1.50$.

When a displacement in parallel with the optical axis from an axial vertex on the object-side surface of the seventh lens element to a maximum effective radius position on the object-side surface of the seventh lens element is SAG7R1, and the central thickness of the seventh lens element is CT7, the following condition can be satisfied: $-2.00 < SAG7R1/CT7 < -0.50$. Therefore, it is favorable for balancing curvature degree of peripheral lens shape of the object-side surface of the seventh lens element, thereby increasing the viewing angle and correcting distortion. Please refer to FIG. 28, which shows a schematic view of SAG7R1 according to the 1st embodiment of the present disclosure. When the direction from the axial vertex of one surface to the maximum effective radius position of the same surface is facing towards the image side of the photographing lens assembly, the value of displacement is positive; when the direction from the axial vertex of the surface to the maximum effective radius position of the same surface is facing towards the object side of the photographing lens assembly, the value of displacement is negative.

When a curvature radius of the object-side surface of the third lens element is R5, and a curvature radius of the image-side surface of the third lens element is R6, the following condition can be satisfied: $0.18 < (R5+R6)/(R5-R6) < 1.00$. Therefore, it is favorable for controlling the optical path, thereby increasing the photography viewing angle and enlarging the image surface. Moreover, the following condition can also be satisfied: $0.25 < (R5+R6)/(R5-R6) < 1.00$.

When the axial distance between the first lens element and the second lens element is T12, and the central thickness of the seventh lens element is CT7, the following condition can be satisfied: $0.10 < T12/CT7 < 1.35$. Therefore, a limitation between the central thickness of the seventh lens element and the axial distance of the first and second lens elements is favorable for increasing space utilization and manufacturability. Moreover, the following condition can also be satisfied: $0.30 < T12/CT7 < 1.28$.

When the focal length of the photographing lens assembly is f, and the focal length of the third lens element is f3, the following condition can be satisfied: $0.60 < |f/f3| < 2.00$. Therefore, it is favorable for having sufficient refractive power of the third lens element, thereby facilitating adjustment of the optical path of a wide viewing angle lens. Moreover, the following condition can also be satisfied: $0.70 < |f/f3| < 1.50$.

When a distance in parallel with the optical axis between a maximum effective radius position of the object-side surface of the sixth lens element and a maximum effective radius position of the image-side surface of sixth first lens element is ET6, and a distance in parallel with the optical axis between a maximum effective radius position of the object-side surface of the seventh lens element and the maximum effective radius position of the image-side surface of the seventh lens element is ET7, the following condition can be satisfied: $2.40 < ET7/ET6 < 6.00$. Therefore, adjustment of edge thicknesses of the sixth and seventh lens elements is favorable for assisting in entering the light with the large field of view into the image surface. Moreover, the following condition can also be satisfied: $2.90 < ET7/ET6 < 5.50$. Please refer to FIG. 28, which shows a schematic view of ET6 and ET7 according to the 1st embodiment of the present disclosure.

When a vertical distance between a critical point on the object-side surface of the first lens element and the optical axis is Yc11, and a vertical distance between a critical point on the object-side surface of the sixth lens element and the optical axis is Yc61, the following condition can be satisfied: $0.75 < Yc61/Yc11 < 1.80$. Therefore, it is favorable for increasing the image size and reducing the outer diameter of the lens unit, thereby preventing total reflection of peripheral light. Please refer to FIG. 27, which shows a schematic view of Yc11 and Yc61 according to the 1st embodiment of the present disclosure. The abovementioned critical points C on the object-side surface of the first lens element and the object-side surface of the sixth lens element in FIG. 27 are exemplary. Each of lens surfaces in various embodiments of the present disclosure may also have one or more critical points in an off-axis region thereof.

According to the present disclosure, the aforementioned features and conditions can be utilized in numerous combinations so as to achieve corresponding effects.

According to the present disclosure, the lens elements of the photographing lens assembly can be made of either glass or plastic material. When the lens elements are made of glass material, the refractive power distribution of the photographing lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing lens assembly, based on the corresponding image sensor, can be flat or curved, especially a curved surface being concave facing towards the object side of the photographing lens assembly.

According to the present disclosure, an image correction unit, such as a field flattener, can be optionally disposed between the lens element closest to the image side of the photographing lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 29:
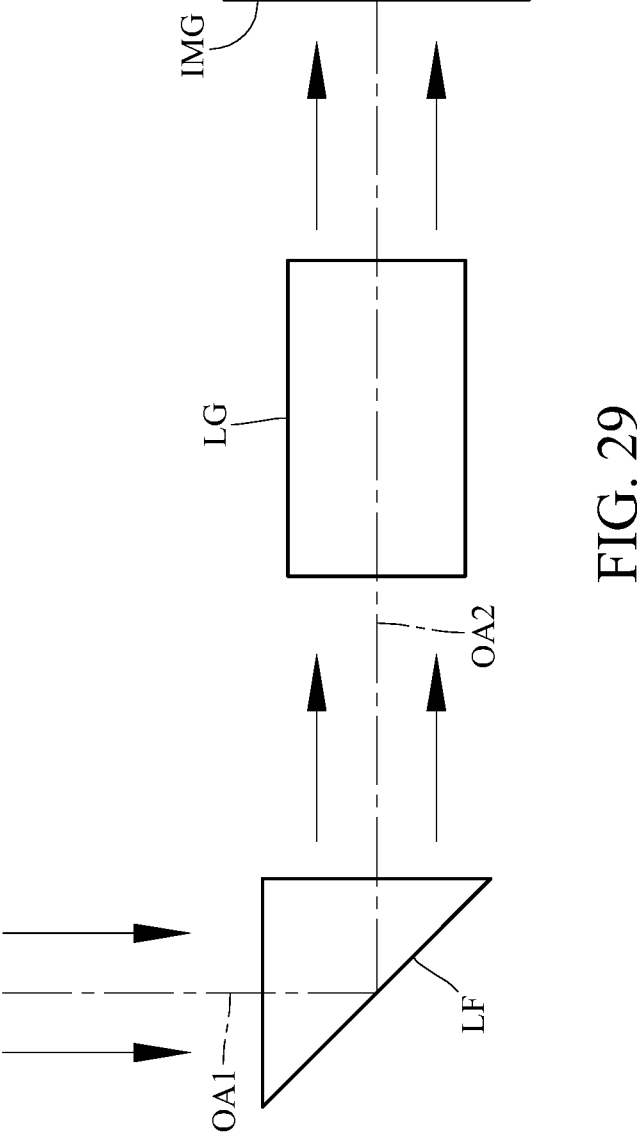
FIG. 29 shows a schematic view of a configuration of a light-folding element in a photographing lens assembly according to one embodiment of the present disclosure.
Figure 30:
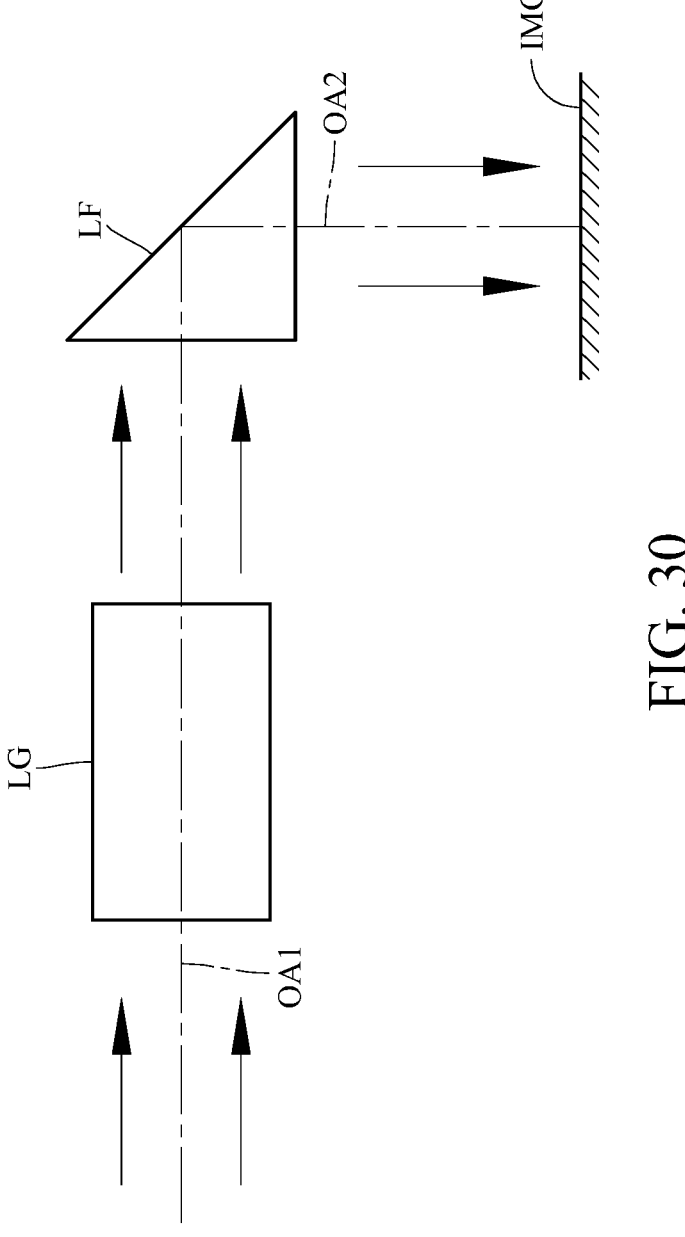
FIG. 30 shows a schematic view of another configuration of a light-folding element in a photographing lens assembly according to one embodiment of the present disclosure.
Figure 31:
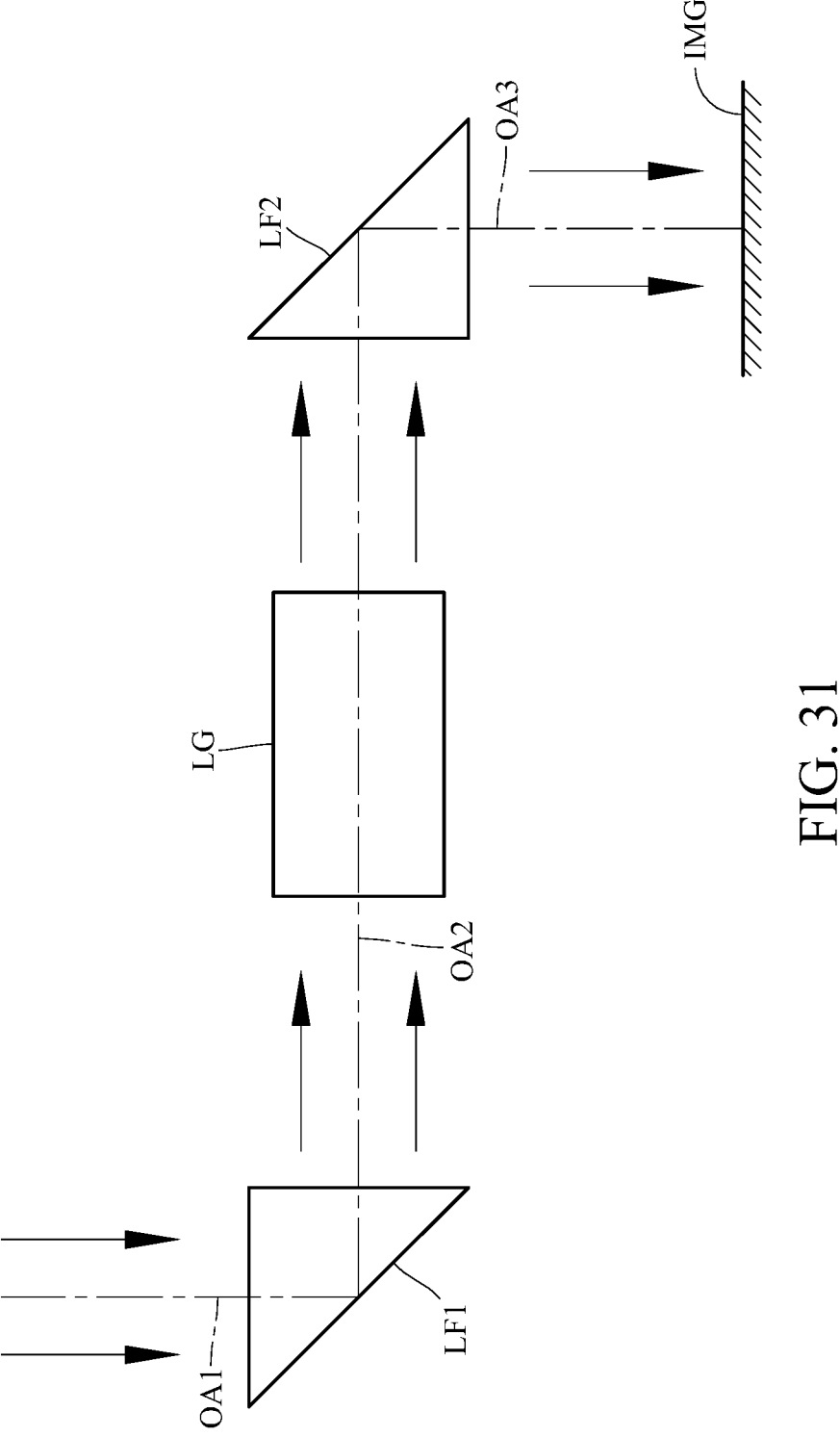
FIG. 31 shows a schematic view of a configuration of two light-folding elements in a photographing lens assembly according to one embodiment of the present disclosure.

According to the present disclosure, at least one light-folding element, such as a prism or a mirror which can have a surface being planar, spherical, aspheric or in free-form, can be optionally disposed between an imaged object and the image surface on the imaging optical path, such that the photographing lens assembly can be more flexible in space arrangement, and therefore the dimensions of an electronic device is not restricted by the total track length of the photographing lens assembly. Specifically, please refer to FIG. 29 and FIG. 30. FIG. 29 shows a schematic view of a configuration of a light-folding element in a photographing lens assembly according to one embodiment of the present disclosure, and FIG. 30 shows a schematic view of another configuration of a light-folding element in a photographing lens assembly according to one embodiment of the present disclosure. In FIG. 29 and FIG. 30, the photographing lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the photographing lens assembly as shown in FIG. 29 or disposed between a lens group LG of the photographing lens assembly and the image surface IMG as shown in FIG. 30. Furthermore, please refer to FIG. 31, which shows a schematic view of a configuration of two light-folding elements in a photographing lens assembly according to one embodiment of the present disclosure. In FIG. 31, the photographing lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the photographing lens assembly, the second light-folding element LF2 is disposed between the lens group LG of the photographing lens assembly and the image surface IMG, and the travelling direction of light on the first optical axis OA1 can be the same direction as the travelling direction of light on the third optical axis OA3 as shown in FIG. 31. The photographing lens assembly can be optionally provided with three or more light-folding elements, and the present disclosure is not limited to the type, amount and position of the light-folding elements of the embodiments disclosed in the aforementioned figures.

According to the present disclosure, the photographing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing lens assembly and thereby provides a wider field of view for the same.

According to the present disclosure, the photographing lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the photographing lens assembly can include one or more optical elements for limiting the form of light passing through the photographing lens assembly. Each optical element can be, but not limited to, a filter, a polarizer, etc., and each optical element can be, but not limited to, a single-piece element, a composite component, a thin film, etc. The optical element can be located at the object side or the image side of the photographing lens assembly or between any two adjacent lens elements so as to allow light in a specific form to pass through, thereby meeting application requirements.

According to the present disclosure, the photographing lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and the image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 2:
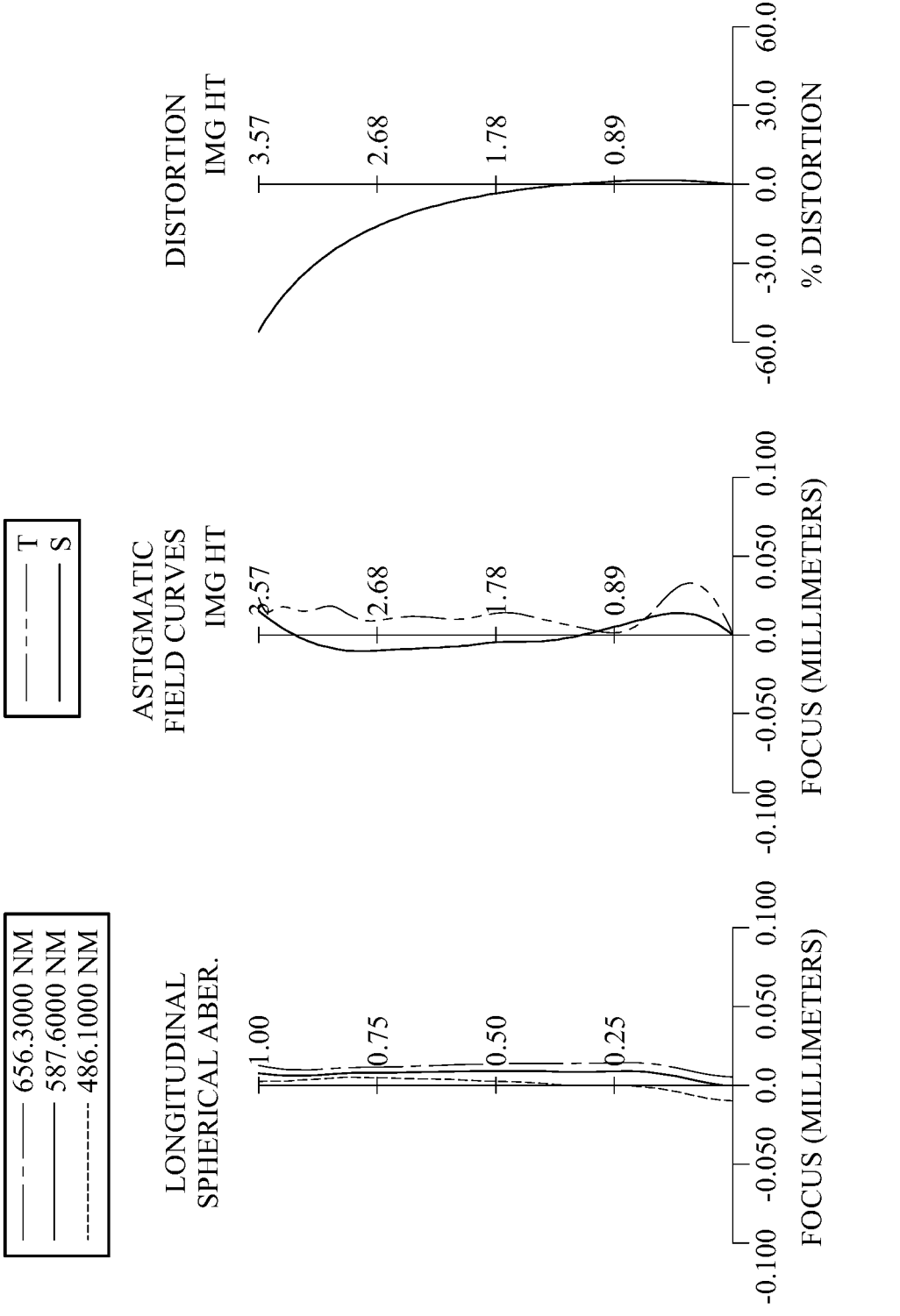
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the photographing lens assembly (its reference numeral is omitted) of the present disclosure and an image sensor IS. The photographing lens assembly includes, in order from an object side to an image side along an optical axis, a first lens element E1, a stop S1, a second lens element E2, an aperture stop ST, a third lens element E3, a stop S2, a fourth lens element E4, a fifth lens element E5, a stop S3, a sixth lens element E6, a seventh lens element E7, a filter E8 and an image surface IMG. The photographing lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has one critical point in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has three inflection points. The image-side surface of the fifth lens element E5 has one critical point in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has three inflection points. The object-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the photographing lens assembly. The image sensor IS is disposed on or near the image surface IMG of the photographing lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28 and 30.

In the photographing lens assembly of the image capturing unit 1 according to the 1st embodiment, when a focal length of the photographing lens assembly is f, an f-number of the photographing lens assembly is Fno, and half of a maximum field of view of the photographing lens assembly is HFOV, these parameters have the following values: f=2.19 millimeters (mm), Fno=2.03, HFOV=74.9 degrees (deg.).

When the maximum field of view of the photographing lens assembly is FOV, the following condition is satisfied: FOV=149.8 degrees.

When an axial distance between the object-side surface of the first lens element E1 and the image surface IMG is TL, and the focal length of the photographing lens assembly is f, the following condition is satisfied: TL/f=3.47.

When an entrance pupil diameter of the photographing lens assembly is EPD, and a maximum image height of the photographing lens assembly is ImgH, the following condition is satisfied: EPD/ImgH=0.30.

When the focal length of the photographing lens assembly is f, and an axial distance between the object-side surface of the first lens element E1 and the image-side surface of the seventh lens element E7 is TD, the following condition is satisfied: 10×f/TD=3.50.

When the focal length of the photographing lens assembly is f, and a focal length of the third lens element E3 is f3, the following condition is satisfied: |f/f3|=1.02.

When a focal length of the first lens element E1 is f1, and the focal length of the third lens element E3 is f3, the following condition is satisfied: |f1/f3|=1.24.

When the focal length of the first lens element E1 is f1, and a focal length of the seventh lens element E7 is f7, the following condition is satisfied: f1/f7=0.63.

When a focal length of the fourth lens element E4 is f4, and a focal length of the sixth lens element E6 is f6, the following condition is satisfied: f4/f6=−2.54.

When a focal length of the fifth lens element E5 is f5, and the focal length of the sixth lens element E6 is f6, the following condition is satisfied: |f6/f5|=0.37.

When a focal length of the photographing lens assembly is f, and a composite focal length of the third lens element E3 and the fourth lens element E4 is f34, the following condition is satisfied: |f/f34|=0.67.

When the focal length of the photographing lens assembly is f, the focal length of the first lens element E1 is f1, the focal length of the fourth lens element E4 is f4, and the focal length of the sixth lens element E6 is f6, the following condition is satisfied: (|f/f1|+|f/f6|)/|f/f4|=4.43.

When a curvature radius of the object-side surface of the first lens element E1 is R1, and a curvature radius of the image-side surface of the first lens element E1 is R2, the following condition is satisfied: |R1+R2|/|R1−R2|=0.07.

When the curvature radius of the object-side surface of the first lens element E1 is R1, and a curvature radius of the image-side surface of the second lens element E2 is R4, the following condition is satisfied: |(R1+R4)/(R1−R4)|=0.14.

When the curvature radius of the object-side surface of the first lens element E1 is R1, a curvature radius of the object-side surface of the sixth lens element E6 is R11, and the focal length of the photographing lens assembly is f, the following condition is satisfied: (|R1|+|R11|)/f=1.98.

When a curvature radius of the object-side surface of the third lens element E3 is R5, and a curvature radius of the image-side surface of the third lens element E3 is R6, the following condition is satisfied: (R5+R6)/(R5−R6)=0.46.

When a curvature radius of the object-side surface of the fifth lens element E5 is R9, and the curvature radius of the object-side surface of the sixth lens element E6 is R11, the following condition is satisfied: 100×|R11/R9|=16.83.

When the curvature radius of the object-side surface of the sixth lens element E6 is R11, a curvature radius of the image-side surface of the sixth lens element E6 is R12, and the focal length of the photographing lens assembly is f, the following condition is satisfied: (|R11|+|R12|)/f=1.84.

When a curvature radius of the object-side surface of the seventh lens element E7 is R13, and a curvature radius of the image-side surface of the seventh lens element E7 is R14, the following condition is satisfied: (R13+R14)/(R13−R14)=2.82.

When a sum of central thicknesses of all lens elements of the photographing lens assembly is ΣCT, and a sum of axial distances between each of all adjacent lens elements of the photographing lens assembly is ΣAT, the following condition is satisfied: ΣCT/ΣAT=4.50. In this embodiment, an axial distance between two adjacent lens elements is a distance in a paraxial region between two adjacent lens surfaces of the two adjacent lens elements. In this embodiment, ΣCT is a sum of central thicknesses of the first lens element E1, the second lens element E2, the third lens element E3, the fourth lens element E4, the fifth lens element E5, the sixth lens element E6 and the seventh lens element E7. In this embodiment, ΣAT is a sum of axial distances between the first lens element E1 and the second lens element E2, the second lens element E2 and the third lens element E3, the third lens element E3 and the fourth lens element E4, the fourth lens element E4 and the fifth lens element E5, the fifth lens element E5 and the sixth lens element E6, and the sixth lens element E6 and the seventh lens element E7.

When a central thickness of the sixth lens element E6 is CT6, and a central thickness of the seventh lens element E7 is CT7, the following condition is satisfied: CT7/CT6=0.54.

When a central thickness of the first lens element E1 is CT1, a central thickness of the second lens element E2 is CT2, a central thickness of the fourth lens element E4 is CT4, and a central thickness of the fifth lens element E5 is CT5, the following condition is satisfied: (CT2+CT5)/(CT1+CT4)=2.12.

When an axial distance between the first lens element E1 and the second lens element E2 is T12, an axial distance between the second lens element E2 and the third lens element E3 is T23, and the central thickness of the second lens element E2 is CT2, the following condition is satisfied: T12/(CT2+T23)=0.34.

When the axial distance between the first lens element E1 and the second lens element E2 is T12, the axial distance between the second lens element E2 and the third lens element E3 is T23, and the central thickness of the second lens element E2 is CT2, the following condition is satisfied: (T12+T23)/CT2=0.68.

When the axial distance between the first lens element E1 and the second lens element E2 is T12, and a central thickness of the third lens element E3 is CT3, the following condition is satisfied: T12/CT3=0.40.

When the axial distance between the first lens element E1 and the second lens element E2 is T12, and the central thickness of the seventh lens element E7 is CT7, the following condition is satisfied: T12/CT7=0.65.

When the central thickness of the fifth lens element E5 is CT5, and the central thickness of the sixth lens element E6 is CT6, and the following condition is satisfied: CT6/CT5=1.70.

When the axial distance between the first lens element E1 and the second lens element E2 is T12, the axial distance between the second lens element E2 and the third lens element E3 is T23, an axial distance between the third lens element E3 and the fourth lens element E4 is T34, and an axial distance between the fourth lens element E4 and the fifth lens element E5 is T45, the following condition is satisfied: (T23+T34)/(T12+T45)=0.64.

When an Abbe number of the second lens element E2 is V2, an Abbe number of the fourth lens element E4 is V4, and an Abbe number of the fifth lens element E5 is V5, the following condition is satisfied: (V2+V4)/V5=0.84.

When a displacement in parallel with the optical axis from an axial vertex on the object-side surface of the seventh lens element E7 to a maximum effective radius position on the object-side surface of the seventh lens element E7 is SAG7R1, and the central thickness of the seventh lens element E7 is CT7, the following condition is satisfied: SAG7R1/CT7=−1.30.

When a distance in parallel with the optical axis between a maximum effective radius position of the object-side surface of the sixth lens element E6 and a maximum effective radius position of the image-side surface of sixth first lens element E1 is ET6, and a distance in parallel with the optical axis between the maximum effective radius position of the object-side surface of the seventh lens element E7 and a maximum effective radius position of the image-side surface of the seventh lens element E7 is ET7, the following condition is satisfied: ET7/ET6=4.22.

When a maximum effective radius of the object-side surface of the sixth lens element E6 is Y6R1, and a maximum effective radius of the object-side surface of the seventh lens element E7 is Y7R1, the following condition is satisfied: Y7R1/Y6R1=1.14.

When a vertical distance between a critical point on the image-side surface of the seventh lens element E7 and the optical axis is Yc72, and a maximum effective radius of the image-side surface of the sixth lens element E6 is Y6R2, the following condition is satisfied: Yc72/Y6R2=0.84.

When a vertical distance between a critical point on the object-side surface of the first lens element E1 and the optical axis is Yc11, and a vertical distance between a critical point on the object-side surface of the sixth lens element E6 and the optical axis is Yc61, the following condition is satisfied: Yc61/Yc11=1.12.

When a maximum value of an absolute value of a distortion aberration on the image surface IMG at various fields of view is |DIST|max, the following condition is satisfied: |DIST|max=56.1%.

The detailed optical data of the 1st embodiment are shown in Table 1A and the aspheric surface data are shown in Table 1B below.

TABLE 1A

1st Embodiment f = 2.19 mm, Fno = 2.03, HFOV = 74.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.7083 | (ASP) | 0.457 | Plastic | 1.529 | 45.4 | −2.67 |
| 2 | | 3.1343 | (ASP) | 0.702 | | | | |
| 3 | Stop | Plano | | −0.300 | | | | |
| 4 | Lens 2 | 2.2330 | (ASP) | 0.936 | Plastic | 1.639 | 23.5 | 7.29 |
| 5 | | 3.5921 | (ASP) | 0.292 | | | | |
| 6 | Ape. Stop | Plano | | −0.054 | | | | |
| 7 | Lens 3 | 4.0932 | (ASP) | 1.005 | Plastic | 1.544 | 56.0 | 2.15 |
| 8 | | −1.4959 | (ASP) | −0.230 | | | | |
| 9 | Stop | Plano | | 0.338 | | | | |
| 10 | Lens 4 | −8.4403 | (ASP) | 0.300 | Plastic | 1.639 | 23.5 | −5.05 |
| 11 | | 5.2899 | (ASP) | 0.141 | | | | |
| 12 | Lens 5 | −9.7303 | (ASP) | 0.672 | Plastic | 1.544 | 56.0 | −5.31 |
| 13 | | 4.2070 | (ASP) | 0.111 | | | | |
| 14 | Stop | Plano | | 0.030 | | | | |
| 15 | Lens 6 | 1.6372 | (ASP) | 1.145 | Plastic | 1.544 | 56.0 | 1.99 |
| 16 | | −2.4016 | (ASP) | 0.112 | | | | |
| 17 | Lens 7 | 2.3992 | (ASP) | 0.620 | Plastic | 1.639 | 23.5 | −4.24 |
| 18 | | 1.1436 | (ASP) | 0.500 | | | | |
| 19 | Filter | Plano | | 0.210 | Glass | 1.517 | 64.2 | — |
| 20 | | Plano | | 0.626 | | | | |
| 21 | Image | Plano | | — | | | | |

Note:

Reference wavelength is 587.6 nm (d-line).

An effective radius of the stop S1 (Surface 3) is 1.306 mm.

An effective radius of the stop S2 (Surface 9) is 0.873 mm.

An effective radius of the stop S3 (Surface 14) is 1.876 mm.

TABLE 1B

| Aspheric Coefficients | | | | |
|---|---|---|---|---|
| Surface # | 1 | 2 | 4 | 5 |
| k= | 0.00000E+00 | 0.00000E+00 | 0.00000E+00 | 0.00000E+00 |
| A4= | 2.623401861E−01 | 2.143050630E−01 | 5.759128029E−02 | 7.639585534E−02 |
| A6= | −2.826883779E−01 | 7.818247344E−01 | −2.005148875E−01 | 4.448736610E−01 |
| A8= | 2.642491907E−01 | −6.595480688E+00 | 9.244961905E−01 | −7.576086351E+00 |
| A10= | −1.949943971E−01 | 2.799966034E+01 | −3.750843041E+00 | 8.714458215E+01 |
| A12= | 1.108917131E−01 | −7.985497033E+01 | 1.182835459E+01 | −6.941311901E+02 |
| A14= | −4.811299711E−02 | 1.620572509E+02 | −2.806966566E+01 | 3.908276280E+03 |
| A16= | 1.584440390E−02 | −2.391722748E+02 | 4.950917142E+01 | −1.575911436E+04 |
| A18= | −3.933784005E−03 | 2.587850206E+02 | −6.463832089E+01 | 4.580157813E+04 |
| A20= | 7.275464724E−04 | −2.048951416E+02 | 6.213927080E+01 | −9.578609649E+04 |
| A22= | −9.818094071E−05 | 1.172130392E+02 | −4.341833020E+01 | 1.423901752E+05 |
| A24= | 9.335548496E−06 | −4.712164080E+01 | 2.145471636E+01 | −1.463761572E+05 |
| A26= | −5.886919679E−07 | 1.262056657E+01 | −7.109075083E+00 | 9.864783155E+04 |
| A28= | 2.191328182E−08 | −2.020900698E+00 | 1.417298019E+00 | −3.910570411E+04 |
| A30= | −3.601582675E−10 | 1.462922683E−01 | −1.284963947E−01 | 6.892983840E+03 |

| Surface # | 7 | 8 | 10 | 11 |
|---|---|---|---|---|
| k= | 0.00000E+00 | 0.00000E+00 | 0.00000E+00 | 0.00000E+00 |
| A4= | −1.644750162E−02 | 3.211095417E−02 | −1.722884608E−01 | −1.576100744E−01 |
| A6= | 2.326585427E+00 | −3.947099420E−01 | 9.117841120E−02 | 2.693661059E−01 |
| A8= | −4.974855117E+01 | 2.599049511E+00 | −1.963391645E+00 | −1.490682473E+00 |
| A10= | 6.573509122E+02 | −1.181120237E+01 | 1.502138736E+01 | 5.170911011E+00 |
| A12= | −5.805156102E+03 | 2.812556903E+01 | −6.895656233E+01 | −1.035148098E+01 |
| A14= | 3.569204881E+04 | 2.451594277E+01 | 2.152071434E+02 | 9.407164325E+00 |
| A16= | −1.566651565E+05 | −4.652887703E+02 | −4.783552352E+02 | 7.946234485E+00 |
| A18= | 4.971263907E+05 | 1.834799211E+03 | 7.654713373E+02 | −3.797214740E+01 |
| A20= | −1.141960587E+06 | −4.169640338E+03 | −8.743435542E+02 | 5.846264696E+01 |
| A22= | 1.878728214E+06 | 6.142309154E+03 | 6.928954959E+02 | −5.311846795E+01 |
| A24= | −2.155074233E+06 | −5.962976123E+03 | −3.582872830E+02 | 3.091642720E+01 |
| A26= | 1.634326228E+06 | 3.690630337E+03 | 1.053018812E+02 | −1.137801410E+01 |
| A28= | −7.350461047E+05 | −1.321117260E+03 | −1.105516785E+01 | 2.422085028E+00 |
| A30= | 1.481207361E+05 | 2.081544975E+02 | −1.053919455E+00 | −2.278539822E−01 |

| Surface # | 12 | 13 | 15 | 16 |
|---|---|---|---|---|
| k= | 0.00000E+00 | 0.00000E+00 | −7.96754E−01 | 0.00000E+00 |
| A4= | −1.427746365E−01 | −5.633001748E−01 | −3.723769370E−01 | −7.040978898E−03 |
| A6= | 7.284722840E−01 | 8.692365322E−01 | 6.380111355E−01 | 3.205656295E−01 |
| A8= | −2.928258617E+00 | −1.158577849E+00 | −1.118758756E+00 | −7.413113832E−01 |
| A10= | 7.688721293E+00 | 3.763137203E−01 | 1.692794314E+00 | 1.343086173E+00 |
| A12= | −1.306332534E+01 | 2.163816520E+00 | −2.190903393E+00 | −1.854682600E+00 |
| A14= | 1.251742767E+01 | −5.439124475E+00 | 2.294809869E+00 | 1.817302370E+00 |
| A16= | −6.388331261E−01 | 7.242863962E+00 | −1.846782215E+00 | −1.251945328E+00 |
| A18= | −1.640020721E+01 | −6.439948286E+00 | 1.109114583E+00 | 6.113088800E−01 |
| A20= | 2.476880616E+01 | 4.045625408E+00 | −4.883129340E−01 | −2.124743698E−01 |
| A22= | −1.988002320E+01 | −1.812177431E+00 | 1.546457735E−01 | 5.222145391E−02 |
| A24= | 9.885393779E+00 | 5.676570593E−01 | −3.418676777E−02 | −8.870724155E−03 |
| A26= | −3.055390374E+00 | −1.181316455E−01 | 4.998036154E−03 | 9.910420652E−04 |
| A28= | 5.404122317E−01 | 1.464465720E−02 | −4.336898554E−04 | −6.554349043E−05 |
| A30= | −4.193317937E−02 | −8.161604735E−04 | 1.689551809E−05 | 1.945095549E−06 |

| Surface # | 17 | 18 |
|---|---|---|
| k= | 0.00000E+00 | −1.00785E+00 |
| A4= | −3.519994282E−01 | −3.392010880E−01 |
| A6= | 6.149612793E−01 | 2.593590285E−01 |
| A8= | −1.349692595E+00 | −1.574754794E−01 |
| A10= | 2.369514648E+00 | 5.797950933E−02 |
| A12= | −2.992325697E+00 | −5.408616736E−03 |
| A14= | 2.658645802E+00 | −6.245990380E−03 |
| A16= | −1.671399055E+00 | 3.802540825E−03 |
| A18= | 7.495400575E−01 | −1.162663313E−03 |
| A20= | −2.402223026E−01 | 2.279461732E−04 |
| A22= | 5.454532860E−02 | −3.023932672E−05 |
| A24= | −8.563300185E−03 | 2.714066448E−06 |
| A26= | 8.835719449E−04 | −1.584382007E−07 |
| A28= | −5.388644467E−05 | 5.441717240E−09 |
| A30= | 1.471400807E−06 | −8.356110665E−11 |

In Table 1A, the curvature radius, the thickness and the focal length are shown in millimeters (mm). Surface numbers 0-21 represent the surfaces sequentially arranged from the object side to the image side along the optical axis. In Table 1B, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
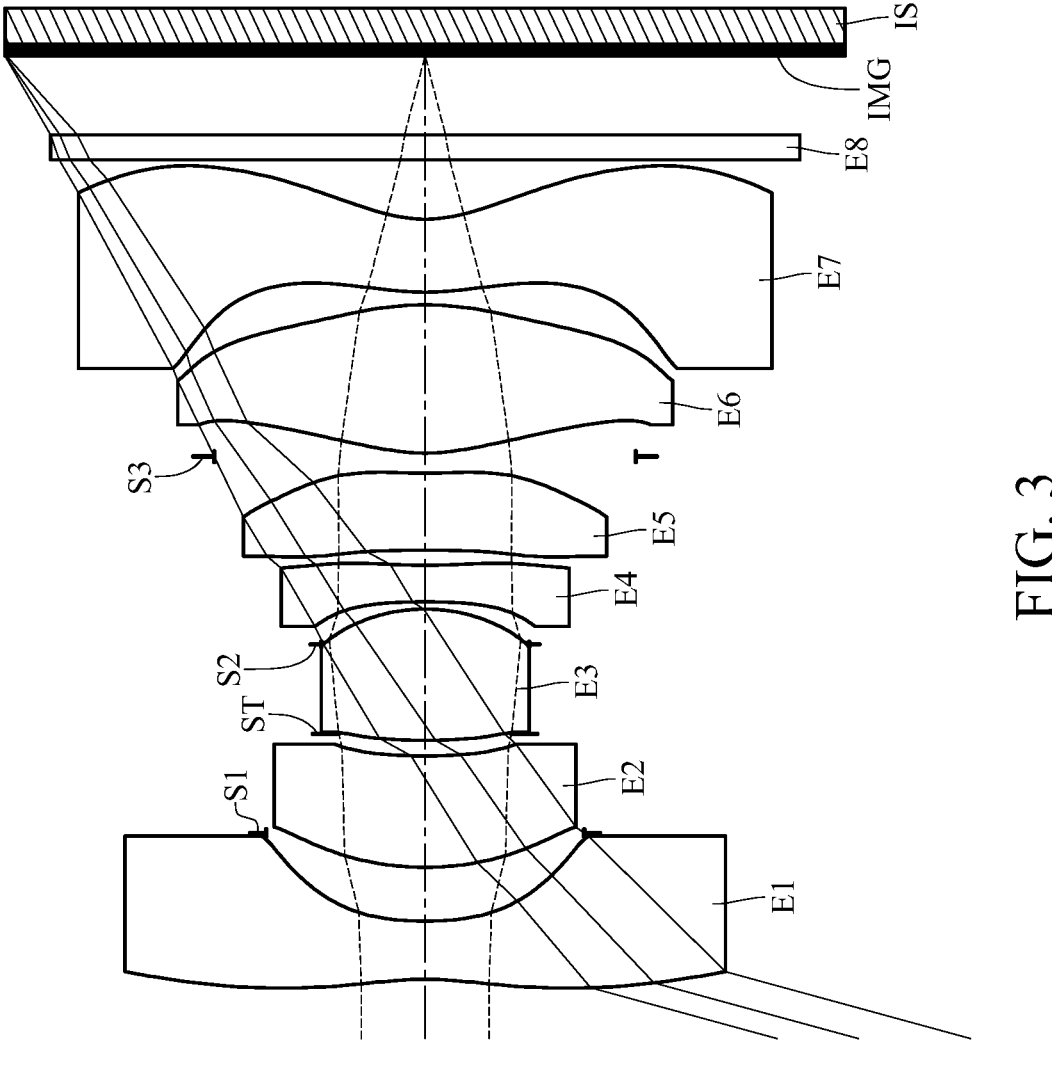
FIG. 3 is a schematic view of an image capturing unit according to the 2nd embodiment of the present disclosure.
Figure 4:
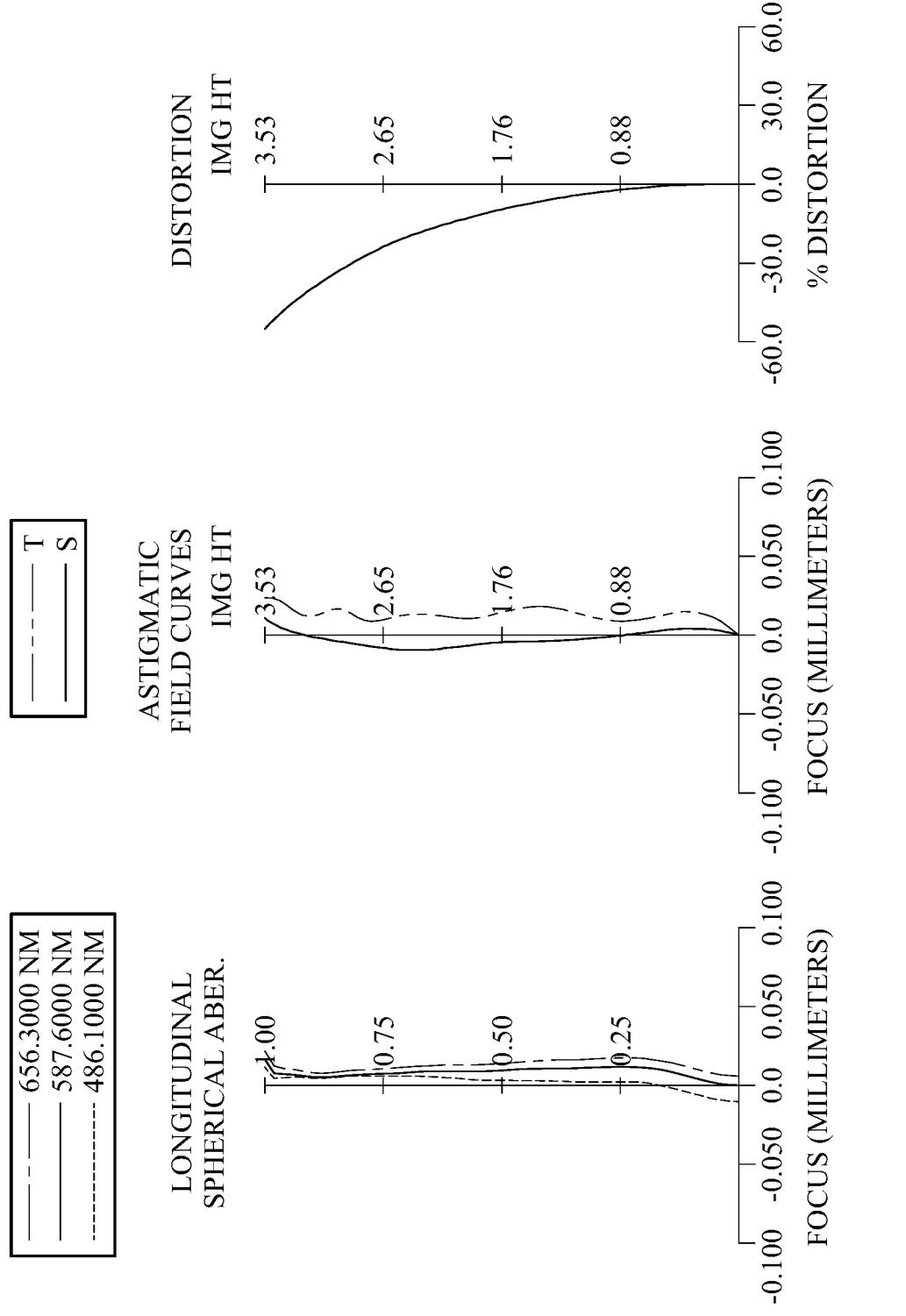
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the photographing lens assembly (its reference numeral is omitted) of the present disclosure and an image sensor IS. The photographing lens assembly includes, in order from an object side to an image side along an optical axis, a first lens element E1, a stop S1, a second lens element E2, an aperture stop ST, a third lens element E3, a stop S2, a fourth lens element E4, a fifth lens element E5, a stop S3, a sixth lens element E6, a seventh lens element E7, a filter E8 and an image surface IMG. The photographing lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has one critical point in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has one inflection point. The object-side surface of the fifth lens element E5 has two critical points in an off-axis region thereof. The image-side surface of the fifth lens element E5 has one critical point in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has three inflection points. The object-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has one inflection point. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the photographing lens assembly. The image sensor IS is disposed on or near the image surface IMG of the photographing lens assembly.

The detailed optical data of the 2nd embodiment are shown in Table 2A and the aspheric surface data are shown in Table 2B below.

TABLE 2A

| | 2nd Embodiment | | | | | | |
| | f = 2.15 mm, Fno = 2.00, HFOV = 74.7 deg. | | | | | | |
| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.7156 | (ASP) | 0.491 | Plastic | 1.545 | 56.1 | −2.58 |
| 2 | | 3.1098 | (ASP) | 0.739 | | | | |

TABLE 2A-continued

|  |  |  |  |  |  |  |  |  | Focal |
|---|---|---|---|---|---|---|---|---|---|

2nd Embodiment
f = 2.15 mm, Fno = 2.00, HFOV = 74.7 deg.

| Surface # |  | Curvature Radius |  | Thickness | Material | Index | Abbe # | Focal Length |
|---|---|---|---|---|---|---|---|---|
| 3 | Stop | Plano |  | −0.288 |  |  |  |  |
| 4 | Lens 2 | 2.4422 | (ASP) | 0.937 | Plastic | 1.614 | 25.6 | 7.06 |
| 5 |  | 4.7804 | (ASP) | 0.185 |  |  |  |  |
| 6 | Ape. Stop | Plano |  | −0.054 |  |  |  |  |
| 7 | Lens 3 | 4.7676 | (ASP) | 1.105 | Plastic | 1.545 | 56.1 | 2.17 |
| 8 |  | −1.4417 | (ASP) | −0.296 |  |  |  |  |
| 9 | Stop | Plano |  | 0.356 |  |  |  |  |
| 10 | Lens 4 | −6.4113 | (ASP) | 0.310 | Plastic | 1.639 | 23.5 | −4.48 |
| 11 |  | 5.2680 | (ASP) | 0.127 |  |  |  |  |
| 12 | Lens 5 | −13.9601 | (ASP) | 0.647 | Plastic | 1.545 | 56.1 | −5.90 |
| 13 |  | 4.2448 | (ASP) | 0.139 |  |  |  |  |
| 14 | Stop | Plano |  | 0.030 |  |  |  |  |
| 15 | Lens 6 | 1.5997 | (ASP) | 1.247 | Plastic | 1.545 | 56.1 | 2.03 |
| 16 |  | −2.5982 | (ASP) | 0.108 |  |  |  |  |
| 17 | Lens 7 | 2.2835 | (ASP) | 0.613 | Plastic | 1.639 | 23.5 | −4.24 |
| 18 |  | 1.1096 | (ASP) | 0.500 |  |  |  |  |
| 19 | Filter | Plano |  | 0.210 | Glass | 1.517 | 64.2 | — |
| 20 |  | Plano |  | 0.662 |  |  |  |  |
| 21 | Image | Plano |  | — |  |  |  |  |

Note:
Reference wavelength is 587.6 nm (d-line).
An effective radius of the stop S1 (Surface 3) is 1.337 mm.
An effective radius of the stop S2 (Surface 9) is 0.874 mm.
An effective radius of the stop S3 (Surface 14) is 1.771 mm.

TABLE 2B

Aspheric Coefficients

| Surface # | 1 | 2 | 4 | 5 |
|---|---|---|---|---|
| k= | 0.00000E+00 | 0.00000E+00 | 0.00000E+00 | 0.00000E+00 |
| A4= | 2.397738537E−01 | 2.737514573E−01 | 2.794321121E−02 | 1.194352576E−01 |
| A6= | −2.408283759E−01 | −1.660849436E−01 | −2.604988447E−02 | −2.598490643E−01 |
| A8= | 2.178702679E−01 | 1.182959346E−01 | −1.283879203E−01 | 5.734631379E+00 |
| A10= | −1.585558499E−01 | −1.608808136E+00 | 1.155870801E+00 | −7.841378929E+01 |
| A12= | 8.954007143E−02 | 9.464286494E+00 | −4.891981243E+00 | 6.968882741E+02 |
| A14= | −3.858048651E−02 | −2.915601569E+01 | 1.326922809E+01 | −4.183835846E+03 |
| A16= | 1.257228406E−02 | 5.690237580E+01 | −2.484767390E+01 | 1.743705136E+04 |
| A18= | −3.071739450E−03 | −7.558835687E+01 | 3.294783318E+01 | −5.126554178E+04 |
| A20= | 5.554089428E−04 | 7.019765819E+01 | −3.108949911E+01 | 1.068097098E+05 |
| A22= | −7.273858457E−05 | −4.565605174E+01 | 2.065852704E+01 | −1.564169816E+05 |
| A24= | 6.656437906E−06 | 2.038529879E+01 | −9.397969774E+00 | 1.570638202E+05 |
| A26= | −3.999113116E−07 | −5.949551386E+00 | 2.767798017E+00 | −1.027047607E+05 |
| A28= | 1.399051623E−08 | 1.021097593E+00 | −4.713525556E−01 | 3.929051923E+04 |
| A30= | −2.115744960E−10 | −7.804048970E−02 | 3.481286210E−02 | −6.654138824E+03 |

| Surface # | 7 | 8 | 10 | 11 |
|---|---|---|---|---|
| k= | 0.00000E+00 | 0.00000E+00 | 0.00000E+00 | 0.00000E+00 |
| A4= | 3.284767339E−02 | 1.271467026E−02 | −1.802096262E−01 | −2.100105589E−01 |
| A6= | 1.465329986E+00 | 1.844080545E−01 | 5.007704574E−01 | 6.209041547E−01 |
| A8= | −2.578170451E+01 | −3.678418028E+00 | −6.703316631E+00 | −3.172577742E+00 |
| A10= | 2.651152573E+02 | 2.682720352E+01 | 4.676003849E+01 | 1.106788799E+01 |
| A12= | −1.706080829E+03 | −1.193730661E+02 | −2.103510556E+02 | −2.590022406E+01 |
| A14= | 6.721487583E+03 | 3.669289375E+02 | 6.570484884E+02 | 4.116047114E+01 |
| A16= | −1.349338677E+04 | −8.474501626E+02 | −1.467659393E+03 | −4.199832753E+01 |
| A18= | −6.237878234E+03 | 1.566829599E+03 | 2.355683497E+03 | 2.092677077E+01 |
| A20= | 1.223273756E+05 | −2.386192987E+03 | −2.684200375E+03 | 8.076555259E+00 |
| A22= | −3.695574877E+05 | 2.918488785E+03 | 2.106016268E+03 | −2.302564983E+01 |
| A24= | 6.039725965E+05 | −2.675697104E+03 | −1.070137193E+03 | 1.904357207E+01 |
| A26= | −5.829304388E+05 | 1.674396879E+03 | 3.080972286E+02 | −8.579005376E+00 |
| A28= | 3.123730157E+05 | −6.253555596E+02 | −3.258574972E+01 | 2.111041816E+00 |
| A30= | −7.174423515E+04 | 1.040142432E+02 | −2.482417420E+00 | −2.230846209E−01 |

| Surface # | 12 | 13 | 15 | 16 |
|---|---|---|---|---|
| k= | 0.00000E+00 | 0.00000E+00 | −6.67543E−01 | 0.00000E+00 |
| A4= | −2.042985720E−01 | −5.922185024E−01 | −3.790981345E−01 | −3.489433293E−02 |
| A6= | 9.551163895E−01 | 1.181486218E+00 | 6.469526115E−01 | 3.097076645E−01 |
| A8= | −3.555666608E+00 | −2.381386866E+00 | −1.098814166E+00 | −6.285799919E−01 |

TABLE 2B-continued

| Aspheric Coefficients | | | |
|---|---|---|---|
| A10= | 9.609446311E+00 | 3.835835565E+00 | 1.574209115E+00 | 9.255771523E−01 |
| A12= | −1.937085929E+01 | −4.523533276E+00 | −1.814760233E+00 | −1.013498027E+00 |
| A14= | 3.010242968E+01 | 3.531388847E+00 | 1.624862843E+00 | 8.033230422E−01 |
| A16= | −3.582335097E+01 | −1.271015954E+00 | −1.104232382E+00 | −4.577318368E−01 |
| A18= | 3.204364878E+01 | −6.590443084E−01 | 5.613941390E−01 | 1.876138760E−01 |
| A20= | −2.113761125E+01 | 1.230560663E+00 | −2.107090814E−01 | −5.511134760E−02 |
| A22= | 1.004416619E+01 | −8.364621121E−01 | 5.728840597E−02 | 1.142565075E−02 |
| A24= | −3.313388655E+00 | 3.319918505E−01 | −1.092808659E−02 | −1.615438988E−03 |
| A26= | 7.112596753E−01 | −8.018803981E−02 | 1.381678336E−03 | 1.456761051E−04 |
| A28= | −8.761321974E−02 | 1.094529776E−02 | −1.035475151E−04 | −7.314267897E−06 |
| A30= | 4.533017134E−03 | −6.486218104E−04 | 3.464774861E−06 | 1.448607096E−07 |

| Surface # | 17 | 18 |
|---|---|---|
| k= | 0.00000E+00 | −9.99683E−01 |
| A4= | −2.932461334E−01 | −3.250994002E−01 |
| A6= | 3.782738282E−01 | 2.486676122E−01 |
| A8= | −6.799145771E−01 | −1.686066931E−01 |
| A10= | 1.089857836E+00 | 8.845967431E−02 |
| A12= | −1.332528100E+00 | −3.476273249E−02 |
| A14= | 1.182885975E+00 | 1.022569458E−02 |
| A16= | −7.598122595E−01 | −2.259388673E−03 |
| A18= | 3.546772220E−01 | 3.741029062E−04 |
| A20= | −1.201349648E−01 | −4.590901786E−05 |
| A22= | 2.915891740E−02 | 4.084926397E−06 |
| A24= | −4.930083937E−03 | −2.537645488E−07 |
| A26= | 5.500201655E−04 | 1.030706215E−08 |
| A28= | −3.631081028E−05 | −2.413924591E−10 |
| A30= | 1.072200096E−06 | 2.392061427E−12 |

In the 2nd embodiment, the equation of the aspheric surface profiles of the aforementioned lens elements is the same as the equation of the 1st embodiment. Also, the definitions of these parameters shown in Table 2C are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Schematic Parameters | | | |
|---|---|---|---|
| f [mm] | 2.15 | (|R11| + |R12|)/f | 1.96 |
| Fno | 2.00 | (R13 + R14)/(R13 − R14) | 2.89 |
| HFOV [deg.] | 74.7 | ΣCT/ΣAT | 5.11 |
| FOV [deg.] | 149.4 | CT7/CT6 | 0.49 |
| TL/f | 3.62 | (CT2 + CT5)/(CT1 + CT4) | 1.98 |
| EPD/ImgH | 0.30 | T12/(CT2 + T23) | 0.42 |
| 10 × f/TD | 3.35 | (T12 + T23)/CT2 | 0.62 |
| |f/f3| | 0.99 | T12/CT3 | 0.41 |
| |f1/f3| | 1.19 | T12/CT7 | 0.74 |
| f1/f7 | 0.61 | CT6/CT5 | 1.93 |
| f4/f6 | −2.21 | (T23 + T34)/(T12 + T45) | 0.33 |
| f6/f5 | 0.34 | (V2 + V4)/V5 | 0.87 |
| |f/f34| | 0.59 | SAG7R1/CT7 | −1.05 |
| (|f/f1| + |f/f6|)/|f/f4| | 3.94 | ET7/ET6 | 3.97 |
| |R1 + R2|/|R1 − R2| | 0.07 | Y7R1/Y6R1 | 1.12 |
| |(R1 + R4)/(R1 − R4)| | 0.28 | Yc72/Y6R2 | 0.96 |
| (|R1| + |R11|)/f | 2.01 | Yc61/Yc11 | 1.42 |
| (R5 + R6)/(R5 − R6) | 0.54 | |DIST|max | 55.1% |
| 100 × |R11/R9| | 11.46 | — | — |

3rd Embodiment

Figure 5:
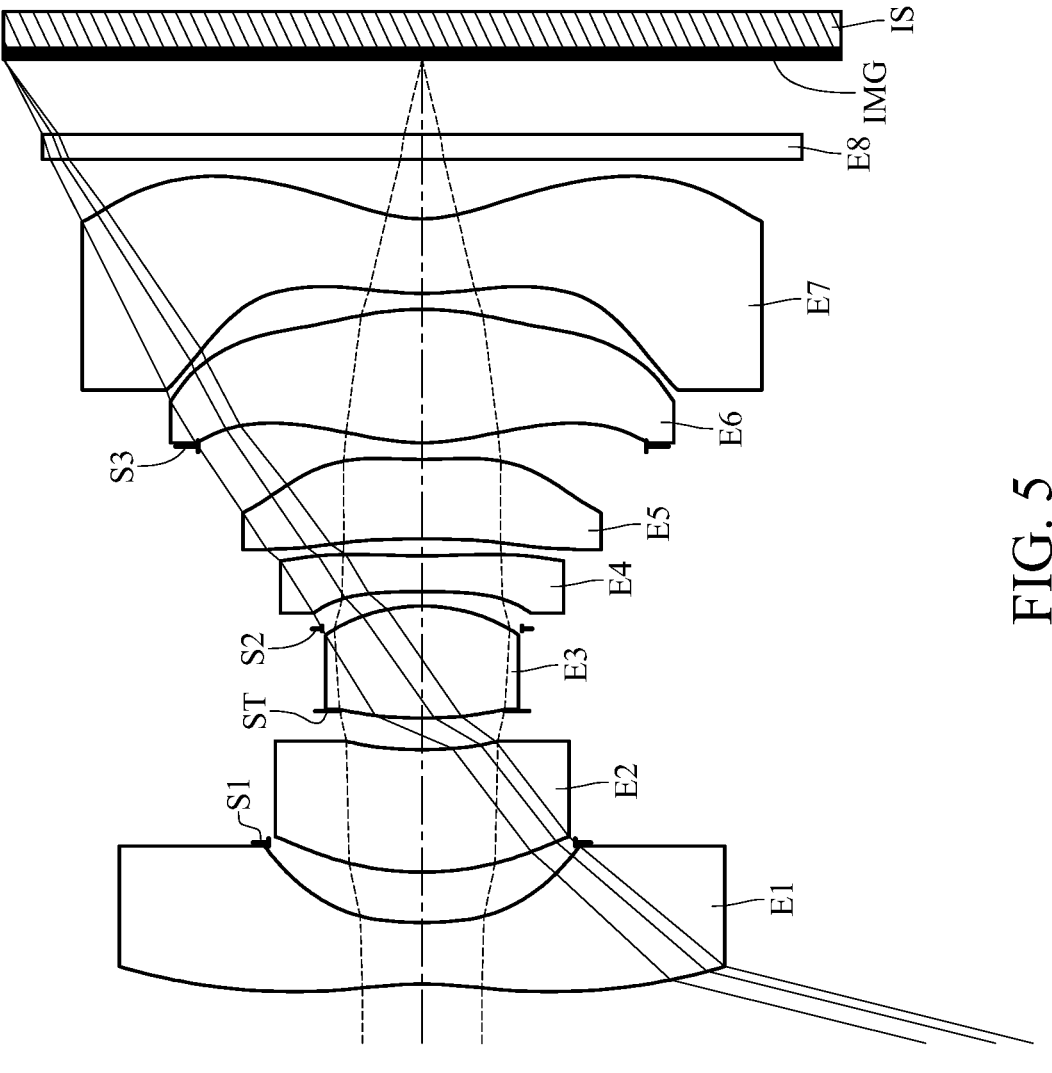
FIG. 5 is a schematic view of an image capturing unit according to the 3rd embodiment of the present disclosure.
Figure 6:
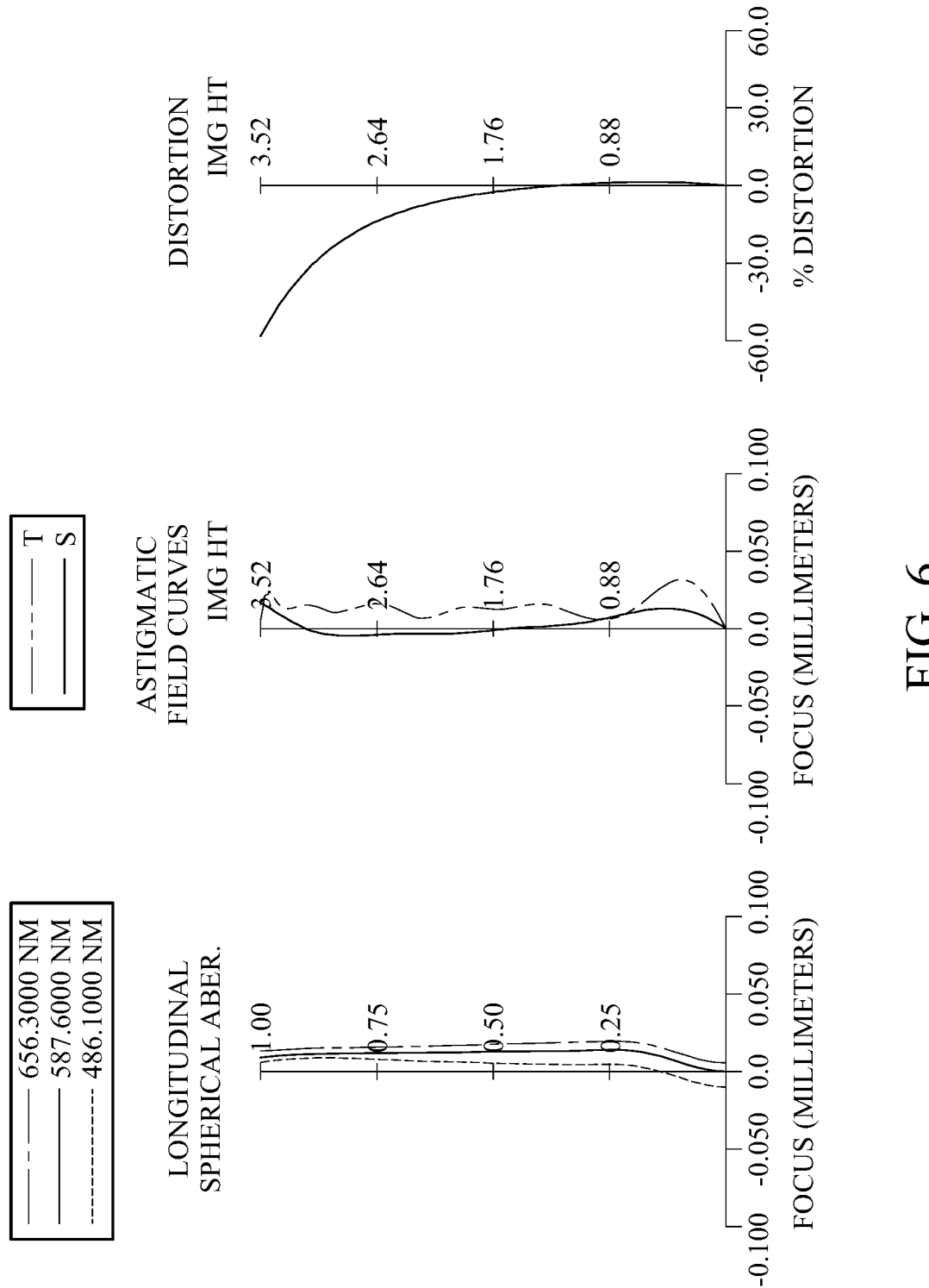
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the photographing lens assembly (its reference numeral is omitted) of the present disclosure and an image sensor IS. The photographing lens assembly includes, in order from an object side to an image side along an optical axis, a first lens element E1, a stop S1, a second lens element E2, an aperture stop ST, a third lens element E3, a stop S2, a fourth lens element E4, a fifth lens element E5, a stop S3, a sixth lens element E6, a seventh lens element E7, a filter E8 and an image surface IMG. The photographing lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has one critical point in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has three inflection points. The image-side surface of the fifth lens element E5 has one critical point in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has three inflection points. The object-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the photographing lens assembly. The image sensor IS is disposed on or near the image surface IMG of the photographing lens assembly.

The detailed optical data of the 3rd embodiment are shown in Table 3A and the aspheric surface data are shown in Table 3B below.

TABLE 3A

| Surface # | | Curvature Radius | | Thickness | Material | Index | Abbe # | Focal Length |
|---|---|---|---|---|---|---|---|---|
| | | | 3rd Embodiment | | | | | |
| | | f = 2.11 mm, Fno = 2.10, HFOV = 76.0 deg. | | | | | | |
| 0 | Object | Plano | | Infinity | | | | |
| 1 | Lens 1 | −2.7252 | (ASP) | 0.517 | Plastic | 1.544 | 56.0 | −2.83 |
| 2 | | 3.7766 | (ASP) | 0.674 | | | | |
| 3 | Stop | Plano | | −0.250 | | | | |
| 4 | Lens 2 | 2.7006 | (ASP) | 1.030 | Plastic | 1.639 | 23.5 | 12.59 |
| 5 | | 3.4616 | (ASP) | 0.325 | | | | |
| 6 | Ape. Stop | Plano | | −0.060 | | | | |
| 7 | Lens 3 | 3.5369 | (ASP) | 0.943 | Plastic | 1.544 | 56.0 | 2.10 |
| 8 | | −1.5249 | (ASP) | −0.190 | | | | |
| 9 | Stop | Plano | | 0.312 | | | | |
| 10 | Lens 4 | −9.4551 | (ASP) | 0.300 | Plastic | 1.639 | 23.5 | −5.61 |
| 11 | | 5.8360 | (ASP) | 0.145 | | | | |
| 12 | Lens 5 | −9.3903 | (ASP) | 0.667 | Plastic | 1.544 | 56.0 | −5.29 |
| 13 | | 4.2515 | (ASP) | 0.111 | | | | |
| 14 | Stop | Plano | | 0.030 | | | | |
| 15 | Lens 6 | 1.6898 | (ASP) | 1.123 | Plastic | 1.544 | 56.0 | 2.02 |
| 16 | | −2.3931 | (ASP) | 0.133 | | | | |
| 17 | Lens 7 | 2.3977 | (ASP) | 0.629 | Plastic | 1.639 | 23.5 | −4.41 |
| 18 | | 1.1625 | (ASP) | 0.500 | | | | |
| 19 | Filter | Plano | | 0.210 | Glass | 1.517 | 64.2 | — |
| 20 | | Plano | | 0.629 | | | | |
| 21 | Image | Plano | | — | | | | |

Note:

Reference wavelength is 587.6 nm (d-line).

An effective radius of the stop S1 (Surface 3) is 1.290 mm.

An effective radius of the stop S2 (Surface 9) is 0.840 mm.

An effective radius of the stop S3 (Surface 14) is 1.885 mm.

TABLE 3B

| Aspheric Coefficients | | | | |
|---|---|---|---|---|
| Surface # | 1 | 2 | 4 | 5 |
| k= | 0.00000E+00 | 0.00000E+00 | 0.00000E+00 | 0.00000E+00 |
| A4= | 2.522881453E−01 | 2.437122948E−01 | 7.084345281E−02 | 8.252854151E−02 |
| A6= | −2.465816138E−01 | 5.502661745E−01 | −2.876725541E−01 | −5.336030662E−02 |
| A8= | 2.057680680E−01 | −5.052453954E+00 | 1.380092478E+00 | 1.099157640E+00 |
| A10= | −1.325167239E−01 | 2.144090531E+01 | −5.925802960E+00 | −1.563711472E+01 |
| A12= | 6.405034745E−02 | −6.112739054E+01 | 1.960131409E+01 | 1.409858836E+02 |
| A14= | −2.282677349E−02 | 1.245753866E+02 | −4.797940380E+01 | −8.410536164E+02 |
| A16= | 5.879182044E−03 | −1.851993040E+02 | 8.592182016E+01 | 3.442365610E+03 |
| A18= | −1.052092261E−03 | 2.021158484E+02 | −1.122652437E+02 | −9.841019450E+03 |
| A20= | 1.183203069E−04 | −1.614160397E+02 | 1.065392475E+02 | 1.971286884E+04 |
| A22= | −5.341909186E−06 | 9.307277963E+01 | −7.251960791E+01 | −2.735908473E+04 |
| A24= | −5.692148051E−07 | −3.766804095E+01 | 3.447097217E+01 | 2.554728123E+04 |
| A26= | 1.116748073E−07 | 1.014131754E+01 | −1.085904030E+01 | −1.514149279E+04 |
| A28= | −7.500094431E−09 | −1.629739765E+00 | 2.036606221E+00 | 5.065002974E+03 |
| A30= | 1.937582976E−10 | 1.182025849E−01 | −1.721182869E−01 | −7.115851685E+02 |
| Surface # | 7 | 8 | 10 | 11 |
| k= | 0.00000E+00 | 0.00000E+00 | 0.00000E+00 | 0.00000E+00 |
| A4= | −1.516558240E−02 | 3.360631702E−02 | −1.809723711E−01 | −1.540292537E−01 |
| A6= | 2.200555438E+00 | −6.334738437E−01 | 1.323315737E−01 | 1.289896824E−01 |
| A8= | −4.783010917E+01 | 6.930355156E+00 | −2.380552188E+00 | −2.910804879E−01 |
| A10= | 6.522986689E+02 | −5.485231585E+01 | 1.897708938E+01 | −7.373327775E−01 |
| A12= | −6.011804112E+03 | 3.059081636E+02 | −9.244615601E+01 | 1.010973918E+01 |
| A14= | 3.891750785E+04 | −1.212859737E+03 | 3.009736325E+02 | −4.358065027E+01 |
| A16= | −1.811874732E+05 | 3.452954871E+03 | −6.768802864E+02 | 1.118301600E+02 |
| A18= | 6.135796673E+05 | −7.102856668E+03 | 1.056466258E+03 | −1.905399299E+02 |
| A20= | −1.511689295E+06 | 1.053108523E+04 | −1.126515458E+03 | 2.232404317E+02 |
| A22= | 2.677534308E+06 | −1.109799022E+04 | 7.834501850E+02 | −1.810134612E+02 |
| A24= | −3.315329521E+06 | 8.065896034E+03 | −3.140662312E+02 | 9.995390184E+01 |
| A26= | 2.717584809E+06 | −3.818803053E+03 | 4.164250021E+01 | −3.590371793E+01 |
| A28= | −1.321038623E+06 | 1.051507187E+03 | 1.580144653E+01 | 7.567299729E+00 |
| A30= | 2.872180657E+05 | −1.263890811E+02 | −5.174200800E+00 | −7.101565988E−01 |
| Surface # | 12 | 13 | 15 | 16 |
| k= | 0.00000E+00 | 0.00000E+00 | −7.80322E−01 | 0.00000E+00 |
| A4= | −1.334726534E−01 | −5.348321084E−01 | −3.365169112E−01 | 1.809790309E−02 |
| A6= | 5.538441167E−01 | 7.103016535E−01 | 4.823267005E−01 | 1.484077135E−01 |
| A8= | −2.069037523E+00 | −7.354160425E−01 | −7.066638837E−01 | −1.401041641E−01 |
| A10= | 5.506399930E+00 | −4.691227034E−01 | 8.130564029E−01 | −4.309922159E−02 |
| A12= | −9.553871262E+00 | 3.643452752E+00 | −6.975722722E−01 | 2.600535742E−01 |
| A14= | 7.915943985E+00 | −7.493363240E+00 | 4.406104506E−01 | −3.320872574E−01 |
| A16= | 6.396633643E+00 | 9.198718455E+00 | −2.139949794E−01 | 2.426216817E−01 |
| A18= | −2.779981010E+01 | −7.555928042E+00 | 8.936989499E−02 | −1.164364559E−01 |
| A20= | 3.892400053E+01 | 4.291057039E+00 | −3.514201573E−02 | 3.860817573E−02 |
| A22= | −3.178217023E+01 | −1.688395815E+00 | 1.215293954E−02 | −8.999372603E−03 |
| A24= | 1.643001363E+01 | 4.505658015E−01 | −3.168805659E−03 | 1.461837905E−03 |
| A26= | −5.315261645E+00 | −7.742906674E−02 | 5.472858983E−04 | −1.586465660E−04 |
| A28= | 9.859280457E−01 | 7.671169813E−03 | −5.475640476E−05 | 1.037101780E−05 |
| A30= | −8.023973769E−02 | −3.290481245E−04 | 2.390633427E−06 | −3.085938433E−07 |
| Surface # | | 17 | 18 | |
| k= | | 0.00000E+00 | −1.01219E+00 | |
| A4= | | −3.322260508E−01 | −3.376697386E−01 | |
| A6= | | 5.000197090E−01 | 2.697934101E−01 | |
| A8= | | −1.039684468E+00 | −1.940950562E−01 | |
| A10= | | 1.796523861E+00 | 1.094971168E−01 | |
| A12= | | −2.280885848E+00 | −4.524077613E−02 | |
| A14= | | 2.086039932E+00 | 1.316025430E−02 | |
| A16= | | −1.373617608E+00 | −2.594989283E−03 | |
| A18= | | 6.506712165E−01 | 3.180469917E−04 | |
| A20= | | −2.206673737E−01 | −1.633324281E−05 | |
| A22= | | 5.291615722E−02 | −1.583880694E−06 | |
| A24= | | −8.740772879E−03 | 3.745484867E−07 | |
| A26= | | 9.447216831E−04 | −3.190599894E−08 | |
| A28= | | −6.007854200E−05 | 1.362428465E−09 | |
| A30= | | 1.703105945E−06 | −2.416936698E−11 | |

In the 3rd embodiment, the equation of the aspheric surface profiles of the aforementioned lens elements is the same as the equation of the 1st embodiment. Also, the definitions of these parameters shown in Table 3C are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Schematic Parameters | | | |
|---|---|---|---|
| f [mm] | 2.11 | (|R11| + |R12|)/f | 1.94 |
| Fno | 2.10 | (R13 + R14)/(R13 − R14) | 2.88 |
| HFOV [deg.] | 76.0 | ΣCT/ΣAT | 4.23 |
| FOV [deg.] | 152.0 | CT7/CT6 | 0.56 |
| TL/f | 3.69 | (CT2 + CT5)/(CT1 + CT4) | 2.08 |
| EPD/ImgH | 0.28 | T12/(CT2 + T23) | 0.33 |
| 10 × f/TD | 3.27 | (T12 + T23)/CT2 | 0.67 |
| |f/f3| | 1.00 | T12/CT3 | 0.45 |
| |f1/f3| | 1.35 | T12/CT7 | 0.67 |
| f1/f7 | 0.64 | CT6/CT5 | 1.68 |
| f4/f6 | −2.78 | (T23 + T34)/(T12 + T45) | 0.68 |
| |f6/f5| | 0.38 | (V2 + V4)/V5 | 0.84 |
| |f/f34| | 0.71 | SAG7R1/CT7 | −1.29 |
| (|f/f1| + |f/f6|)/|f/f4| | 4.76 | ET7/ET6 | 4.07 |
| |R1 + R2|/|R1 − R2| | 0.16 | Y7R1/Y6R1 | 1.13 |
| |(R1 + R4)/(R1 − R4)| | 0.12 | Yc72/Y6R2 | 0.83 |
| (|R1| + |R11|)/f | 2.10 | Yc61/Yc11 | 1.17 |
| (R5 + R6)/(R5 − R6) | 0.40 | |DIST|max | 58.3% |
| 100 × |R11/R9| | 18.00 | — | — |

4th Embodiment

Figure 7:
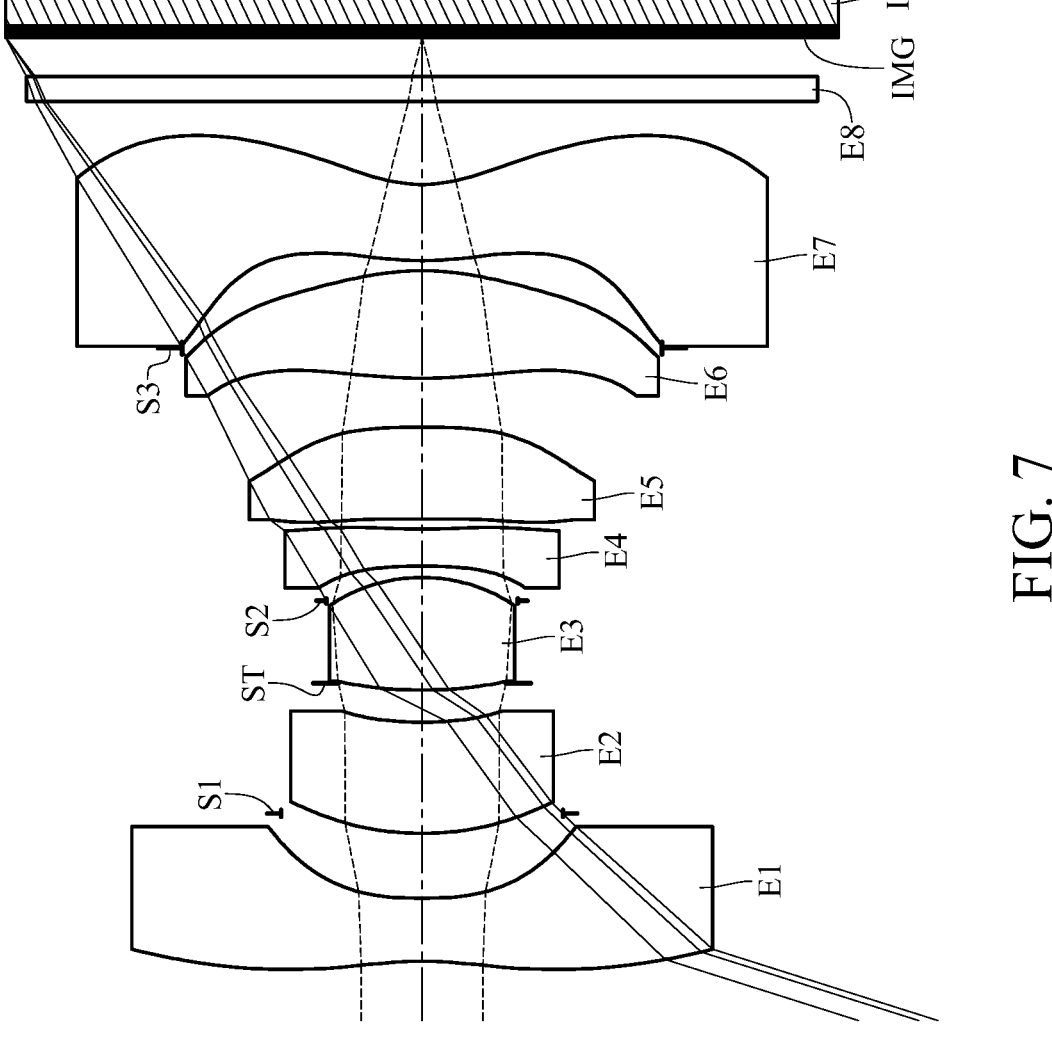
FIG. 7 is a schematic view of an image capturing unit according to the 4th embodiment of the present disclosure.
Figure 8:
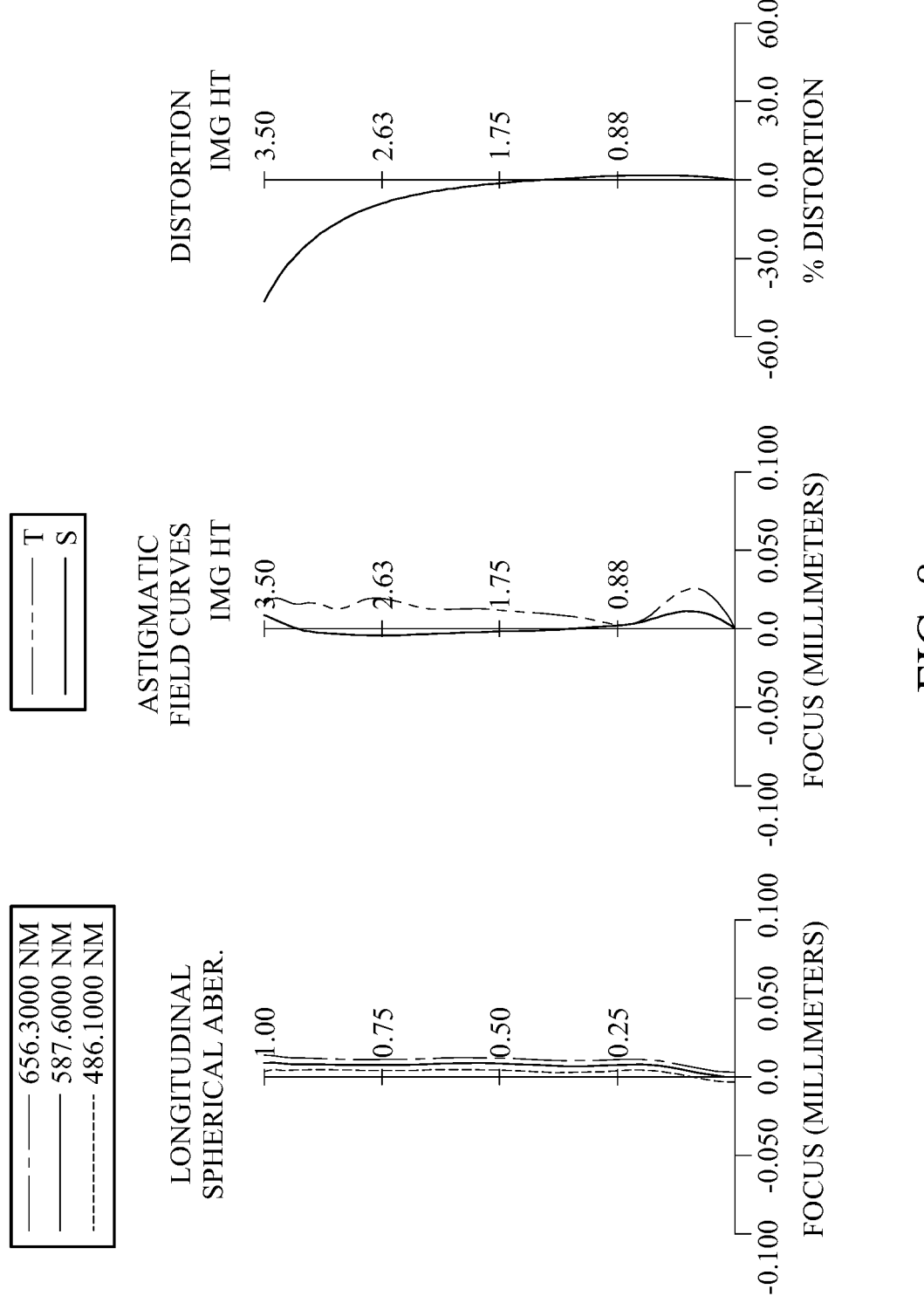
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the photographing lens assembly (its reference numeral is omitted) of the present disclosure and an image sensor IS. The photographing lens assembly includes, in order from an object side to an image side along an optical axis, a first lens element E1, a stop S1, a second lens element E2, an aperture stop ST, a third lens element E3, a stop S2, a fourth lens element E4, a fifth lens element E5, a sixth lens element E6, a stop S3, a seventh lens element E7, a filter E8 and an image surface IMG. The photographing lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has two critical points in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the photographing lens assembly. The image sensor IS is disposed on or near the image surface IMG of the photographing lens assembly.

The detailed optical data of the 4th embodiment are shown in Table 4A and the aspheric surface data are shown in Table 4B below.

TABLE 4A

| | | | | | | | Focal |
| Surface # | | Curvature Radius | | Thickness | Material | Index | Abbe # | Length |
|---|---|---|---|---|---|---|---|---|
| 0 | Object | Plano | | Infinity | | | | |
| 1 | Lens 1 | −2.7844 | (ASP) | 0.529 | Plastic | 1.515 | 56.4 | −3.01 |
| 2 | | 3.7219 | (ASP) | 0.714 | | | | |
| 3 | Stop | Plano | | −0.168 | | | | |
| 4 | Lens 2 | 2.5212 | (ASP) | 0.935 | Plastic | 1.639 | 23.5 | 14.41 |
| 5 | | 2.9707 | (ASP) | 0.330 | | | | |
| 6 | Ape. Stop | Plano | | −0.059 | | | | |
| 7 | Lens 3 | 3.6798 | (ASP) | 0.948 | Plastic | 1.544 | 56.0 | 1.98 |
| 8 | | −1.3858 | (ASP) | −0.195 | | | | |
| 9 | Stop | Plano | | 0.291 | | | | |
| 10 | Lens 4 | −4.7219 | (ASP) | 0.310 | Plastic | 1.614 | 25.6 | −3.88 |
| 11 | | 4.9288 | (ASP) | 0.085 | | | | |
| 12 | Lens 5 | 26.3432 | (ASP) | 0.773 | Plastic | 1.544 | 56.0 | 15.07 |
| 13 | | −11.7858 | (ASP) | 0.412 | | | | |
| 14 | Lens 6 | 4.0655 | (ASP) | 0.905 | Plastic | 1.544 | 56.0 | 2.87 |
| 15 | | −2.3392 | (ASP) | −0.652 | | | | |
| 16 | Stop | Plano | | 0.736 | | | | |
| 17 | Lens 7 | 2.4223 | (ASP) | 0.641 | Plastic | 1.639 | 23.5 | −4.20 |
| 18 | | 1.1414 | (ASP) | 0.700 | | | | |
| 19 | Filter | Plano | | 0.210 | Glass | 1.517 | 64.2 | — |
| 20 | | Plano | | 0.326 | | | | |
| 21 | Image | Plano | | — | | | | |

Note:
Reference wavelength is 587.6 nm (d-line).
An effective radius of the stop S1 (Surface 3) is 1.184 mm.
An effective radius of the stop S2 (Surface 9) is 0.804 mm.
An effective radius of the stop S3 (Surface 16) is 2.018 mm.

TABLE 4B

| | Aspheric Coefficients | | | |
| Surface # | 1 | 2 | 4 | 5 |
|---|---|---|---|---|
| k= | 0.00000E+00 | 0.00000E+00 | 0.00000E+00 | 0.00000E+00 |
| A4= | 2.288756394E−01 | 1.966559400E−01 | 5.937972288E−02 | 9.413032157E−02 |
| A6= | −2.185527975E−01 | 6.285048042E−01 | −3.038082686E−01 | −4.034706329E−01 |
| A8= | 1.901188735E−01 | −4.933553497E+00 | 1.958514753E+00 | 8.372756884E+00 |
| A10= | −1.347765424E−01 | 1.939452476E+01 | −1.021954302E+01 | −1.092507822E+02 |
| A12= | 7.531975487E−02 | −5.072301583E+01 | 3.921799520E+01 | 9.441191689E+02 |
| A14= | −3.262515130E−02 | 9.375025511E+01 | −1.097124047E+02 | −5.606618611E+03 |
| A16= | 1.084903276E−02 | −1.254470053E+02 | 2.246908615E+02 | 2.343222510E+04 |
| A18= | −2.745109545E−03 | 1.227081662E+02 | −3.380548381E+02 | −6.974576103E+04 |
| A20= | 5.220551774E−04 | −8.764984711E+01 | 3.725463383E+02 | 1.480131037E+05 |
| A22= | −7.317285260E−05 | 4.515151169E+01 | −2.968646717E+02 | −2.215652445E+05 |
| A24= | 7.316767773E−06 | −1.631139544E+01 | 1.663474788E+02 | 2.277986251E+05 |
| A26= | −4.930996514E−07 | 3.915756992E+00 | −6.212894331E+01 | −1.525694769E+05 |
| A28= | 2.004897139E−08 | −5.602626429E−01 | 1.387745291E+01 | 5.974463062E+04 |
| A30= | −3.711890899E−10 | 3.610676529E−02 | −1.401612227E+00 | −1.034446197E+04 |

| Surface # | 7 | 8 | 10 | 11 |
|---|---|---|---|---|
| k= | 0.00000E+00 | 0.00000E+00 | 0.00000E+00 | 0.00000E+00 |
| A4= | −2.727106108E−03 | 5.141304997E−02 | −1.840396404E−01 | −3.050281989E−01 |
| A6= | 1.391532945E+00 | −1.855909800E−01 | 5.387284683E−01 | 8.136091631E−01 |
| A8= | −2.826150090E+01 | 2.319503834E−01 | −6.893381572E+00 | −3.167880452E+00 |
| A10= | 3.648912078E+02 | 3.626349430E+00 | 5.402131898E+01 | 1.128033903E+01 |
| A12= | −3.231324791E+03 | −4.542876009E+01 | −2.939401981E+02 | −3.217788038E+01 |
| A14= | 2.032889429E+04 | 2.803601454E+02 | 1.130808526E+03 | 6.848018043E+01 |
| A16= | −9.277304350E+04 | −1.090816870E+03 | −3.109302227E+03 | −1.021741110E+02 |
| A18= | 3.098431895E+05 | 2.870417814E+03 | 6.152002957E+03 | 1.012961594E+02 |
| A20= | −7.558126902E+05 | −5.260239250E+03 | −8.756149782E+03 | −6.036473714E+01 |
| A22= | 1.328198958E+06 | 6.749276798E+03 | 8.868138646E+03 | 1.366998829E+01 |
| A24= | −1.632603363E+06 | −5.960297291E+03 | −6.223361196E+03 | 7.798434129E+00 |
| A26= | 1.327838133E+06 | 3.455054950E+03 | 2.869789105E+03 | −7.320554700E+00 |
| A28= | −6.397296215E+05 | −1.183382933E+03 | −7.800921480E+02 | 2.349832352E+00 |
| A30= | 1.376813381E+05 | 1.812987987E+02 | 9.444958333E+01 | −2.865835973E−01 |

| Surface # | 12 | 13 | 14 | 15 |
|---|---|---|---|---|
| k= | 0.00000E+00 | 0.00000E+00 | −1.27486E+00 | 0.00000E+00 |
| A4= | −2.560826665E−01 | −2.199923244E−01 | −1.039504025E−01 | −5.427424996E−02 |

TABLE 4B-continued

| A6= | 7.840609630E−01 | 1.775636251E−01 | 3.577530494E−01 | 7.932756459E−01 |
|---|---|---|---|---|
| A8= | −2.922972767E+00 | −2.705212595E−01 | −1.398642477E+00 | −2.629472436E+00 |
| A10= | 1.135561707E+01 | 3.828627862E−01 | 3.363497129E+00 | 5.149703265E+00 |
| A12= | −3.616974290E+01 | −1.892271058E−01 | −5.404125563E+00 | −6.634894021E+00 |
| A14= | 8.510635203E+01 | −5.015034206E−01 | 6.097562303E+00 | 5.942341159E+00 |
| A16= | −1.425148223E+02 | 1.278653809E+00 | −4.967414085E+00 | −3.820299016E+00 |
| A18= | 1.691069960E+02 | −1.477764671E+00 | 2.958044885E+00 | 1.789657222E+00 |
| A20= | −1.424014492E+02 | 1.042032770E+00 | −1.287192312E+00 | −6.115912088E−01 |
| A22= | 8.457239873E+01 | −4.757691023E−01 | 4.041022369E−01 | 1.506206528E−01 |
| A24= | −3.465652119E+01 | 1.400521510E−01 | −8.895126395E−02 | −2.598225665E−02 |
| A26= | 9.331045144E+00 | −2.521361309E−02 | 1.300320095E−02 | 2.972721699E−03 |
| A28= | −1.486152432E+00 | 2.436699967E−03 | −1.132057208E−03 | −2.022193308E−04 |
| A30= | 1.061244467E−01 | −8.913108827E−05 | 4.436431546E−05 | 6.178955411E−06 |

| Surface # | 17 | 18 |
|---|---|---|
| k= | 0.00000E+00 | −1.05879E+00 |
| A4= | −3.310037263E−01 | −2.569505888E−01 |
| A6= | 9.524867731E−01 | 7.984228823E−02 |
| A8= | −2.995719453E+00 | 4.957376485E−02 |
| A10= | 5.901372765E+00 | −8.324683929E−02 |
| A12= | −7.630552903E+00 | 5.640500169E−02 |
| A14= | 6.841527101E+00 | −2.421856436E−02 |
| A16= | −4.393944302E+00 | 7.249578250E−03 |
| A18= | 2.051103406E+00 | −1.563581374E−03 |
| A20= | −6.965188351E−01 | 2.449709601E−04 |
| A22= | 1.700104638E−01 | −2.764666315E−05 |
| A24= | −2.900349037E−02 | 2.189990309E−06 |
| A26= | 3.276632385E−03 | −1.155173531E−07 |
| A28= | −2.198760657E−04 | 3.642297750E−09 |
| A30= | 6.624849944E−06 | −5.191471828E−11 |

In the 4th embodiment, the equation of the aspheric surface profiles of the aforementioned lens elements is the same as the equation of the 1st embodiment. Also, the definitions of these parameters shown in Table 4C are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Schematic Parameters | | | |
|---|---|---|---|
| f [mm] | 2.07 | (|R11| + |R12|)/f | 3.09 |
| Fno | 2.02 | (R13 + R14)/(R13 − R14) | 2.78 |
| HFOV [deg.] | 72.4 | ΣCT/ΣAT | 3.37 |
| FOV [deg.] | 144.8 | CT7/CT6 | 0.71 |
| TL/f | 3.75 | (CT2 + CT5)/(CT1 + CT4) | 2.04 |
| EPD/ImgH | 0.29 | T12/(CT2 + T23) | 0.45 |
| 10 × f/TD | 3.17 | (T12 + T23)/CT2 | 0.87 |
| |f/f3| | 1.05 | T12/CT3 | 0.58 |
| |f1/f3| | 1.52 | T12/CT7 | 0.85 |
| f1/f7 | 0.72 | CT6/CT5 | 1.17 |
| f4/f6 | −1.35 | (T23 + T34)/(T12 + T45) | 0.58 |
| |f6/f5| | 0.19 | (V2 + V4)/V5 | 0.88 |
| |f/f34| | 0.61 | SAG7R1/CT7 | −1.12 |
| (|f/f1| + |f/f6|)/|f/f4| | 2.64 | ET7/ET6 | 4.41 |
| |R1 + R2|/|R1 − R2| | 0.14 | Y7R1/Y6R1 | 1.12 |
| |(R1 + R4)/(R1 − R4)| | 0.03 | Yc72/Y6R2 | 0.94 |
| (|R1| + |R11|)/f | 3.31 | Yc61/Yc11 | 0.93 |
| (R5 + R6)/(R5 − R6) | 0.45 | |DIST|max | 46.5% |
| 100 × |R11/R9| | 15.43 | — | — |

5th Embodiment

Figure 9:
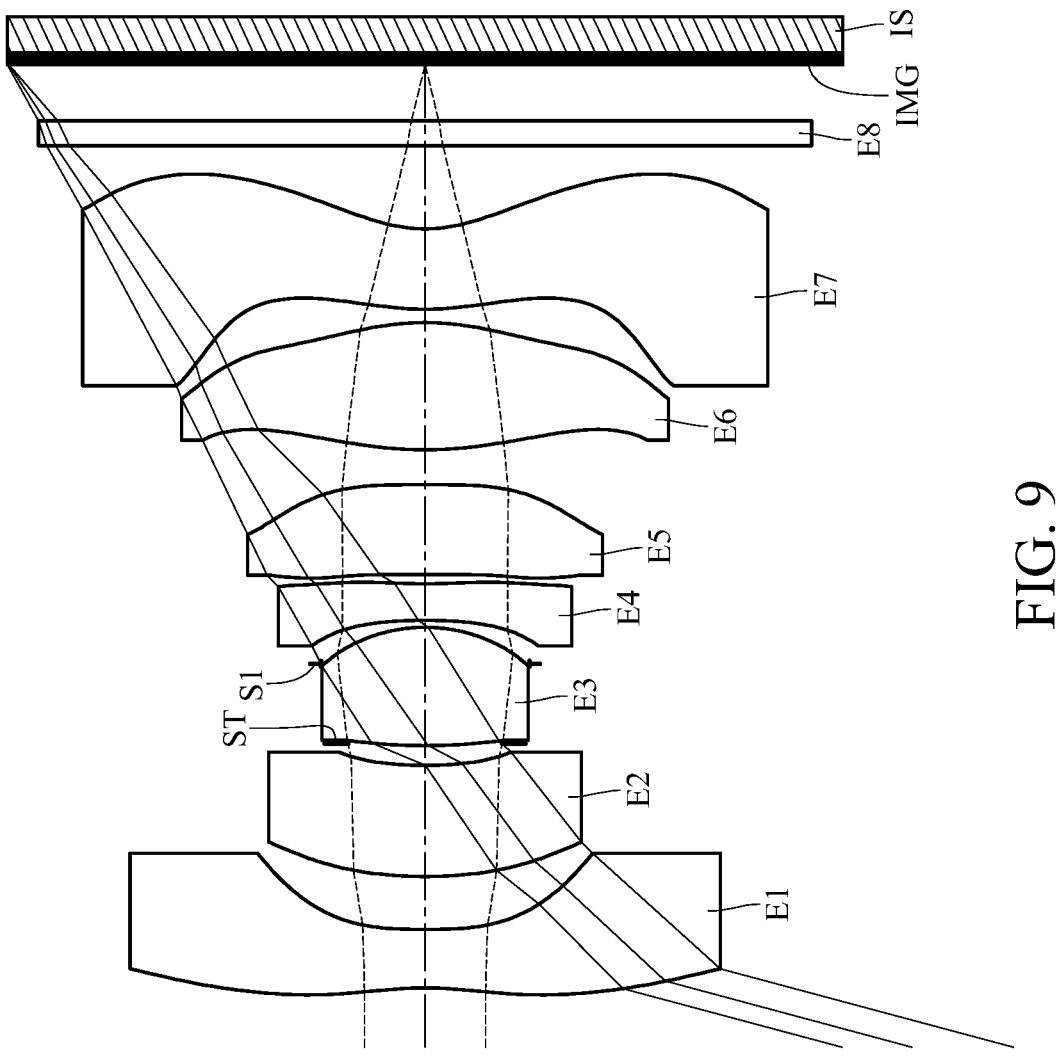
FIG. 9 is a schematic view of an image capturing unit according to the 5th embodiment of the present disclosure.
Figure 10:
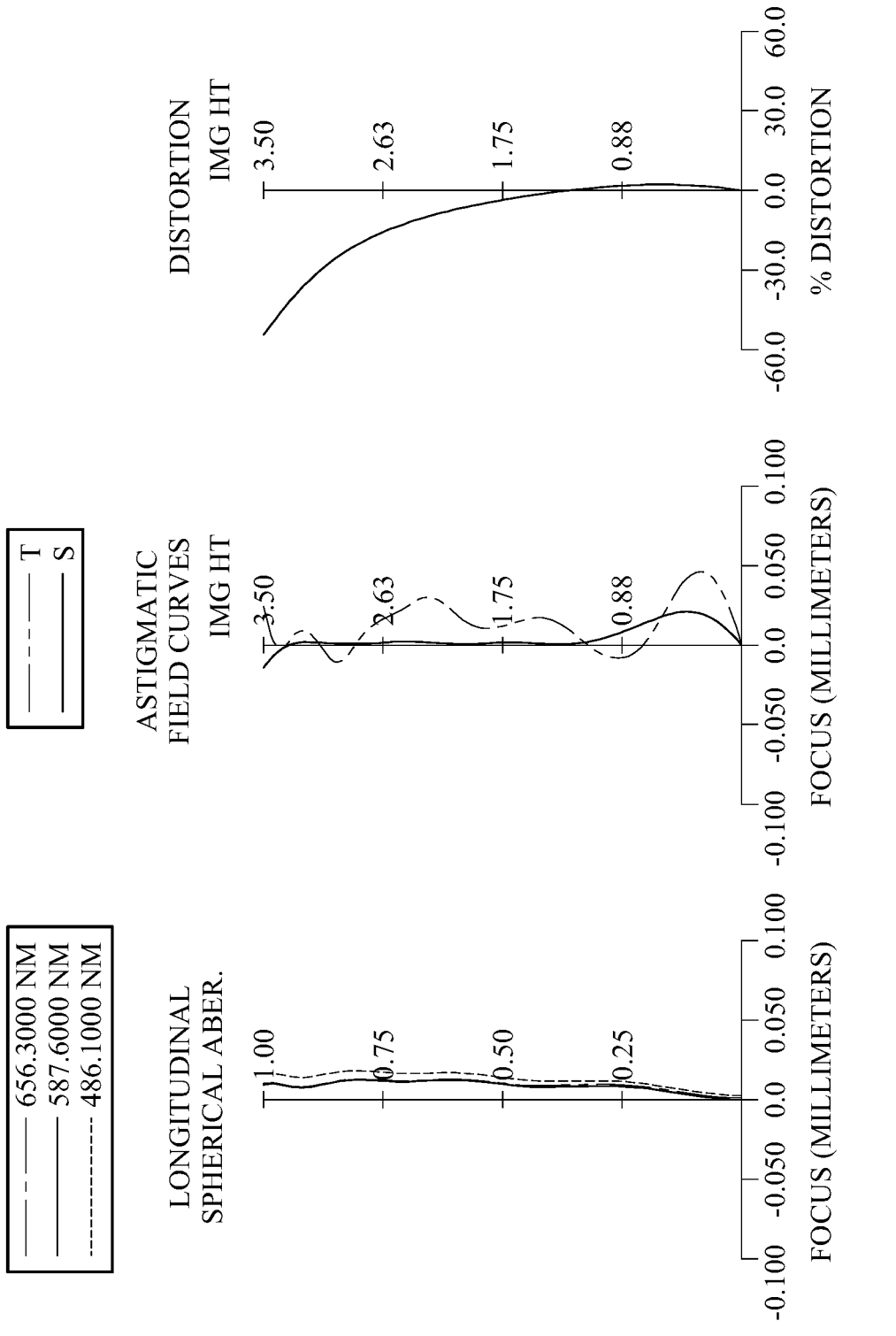
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the photographing lens assembly (its reference numeral is omitted) of the present disclosure and an image sensor IS. The photographing lens assembly includes, in order from an object side to an image side along an optical axis, a first lens element E1, a second lens element E2, an aperture stop ST, a third lens element E3, a stop S1, a fourth lens element E4, a fifth lens element E5, a sixth lens element E6, a seventh lens element E7, a filter E8 and an image surface IMG. The photographing lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points.

The object-side surface of the first lens element E1 has one critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has one inflection point. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of glass material and has the object-side surface and the image-side surface being both aspheric. The object-side surface of the fifth lens element E5 has three inflection points. The image-side surface of the fifth lens element E5 has three inflection points. The object-side surface of the fifth lens element E5 has two critical points in an off-axis region thereof. The image-side surface of the fifth lens element E5 has one critical point in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has three inflection points. The object-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the photographing lens assembly. The image sensor IS is disposed on or near the image surface IMG of the photographing lens assembly.

The detailed optical data of the 5th embodiment are shown in Table 5A and the aspheric surface data are shown in Table 5B below.

TABLE 5A

5th Embodiment
f = 2.06 mm, Fno = 2.03, HFOV = 75.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.7697 | (ASP) | 0.493 | Plastic | 1.544 | 56.0 | −3.69 |
| 2 | | 7.7715 | (ASP) | 0.444 | | | | |
| 3 | Lens 2 | 3.9940 | (ASP) | 0.935 | Plastic | 1.650 | 21.8 | −68.86 |
| 4 | | 3.3286 | (ASP) | 0.181 | | | | |
| 5 | Ape. Stop | Plano | | −0.014 | | | | |
| 6 | Lens 3 | 5.2229 | (ASP) | 0.995 | Plastic | 1.544 | 56.0 | 2.07 |
| 7 | | −1.3369 | (ASP) | −0.307 | | | | |
| 8 | Stop | Plano | | 0.364 | | | | |
| 9 | Lens 4 | −5.1078 | (ASP) | 0.310 | Plastic | 1.587 | 28.3 | −4.24 |
| 10 | | 4.9764 | (ASP) | 0.079 | | | | |
| 11 | Lens 5 | 41.7785 | (ASP) | 0.753 | Glass | 1.534 | 55.5 | 83.11 |
| 12 | | 716.4250 | (ASP) | 0.294 | | | | |
| 13 | Lens 6 | 2.8402 | (ASP) | 1.071 | Plastic | 1.544 | 56.0 | 2.58 |
| 14 | | −2.3992 | (ASP) | 0.113 | | | | |
| 15 | Lens 7 | 2.2934 | (ASP) | 0.676 | Plastic | 1.680 | 18.2 | −4.69 |
| 16 | | 1.1744 | (ASP) | 0.700 | | | | |
| 17 | Filter | Plano | | 0.210 | Glass | 1.517 | 64.2 | — |
| 18 | | Plano | | 0.470 | | | | |
| 19 | Image | Plano | | — | | | | |

Note:
Reference wavelength is 587.6 nm (d-line).
An effective radius of the stop S1 (Surface 8) is 0.877 mm.

TABLE 5B

Aspheric Coefficients

| Surface # | 1 | 2 | 3 | 4 |
|---|---|---|---|---|
| k= | 0.00000E+00 | 0.00000E+00 | 0.00000E+00 | 0.00000E+00 |
| A4= | 2.542114848E−01 | 2.030328394E−01 | 1.228180510E−01 | 4.398633241E−02 |
| A6= | −2.434353135E−01 | 1.127733704E+00 | −5.211877781E−01 | 3.539957675E+00 |
| A8= | 2.080938171E−01 | −8.910641070E+00 | 2.132817437E+00 | −9.199479803E+01 |
| A10= | −1.449813266E−01 | 3.776905873E+01 | −6.193169659E+00 | 1.394839218E+03 |
| A12= | 8.060858866E−02 | −1.068273414E+02 | 1.276964730E+01 | −1.348951104E+04 |
| A14= | −3.548302087E−02 | 2.120290935E+02 | −1.937778889E+01 | 8.769416245E+04 |
| A16= | 1.225848247E−02 | −3.016992177E+02 | 2.233691911E+01 | −3.954640550E+05 |
| A18= | −3.275800412E−03 | 3.105436565E+02 | −1.990951496E+01 | 1.258086331E+06 |

TABLE 5B-continued

| | | | | |
|---|---|---|---|---|
| A20= | 6.635338197E−04 | −2.310496386E+02 | 1.368005473E+01 | −2.835697304E+06 |
| A22= | −9.918177971E−05 | 1.228153705E+02 | −7.064144817E+00 | 4.489571685E+06 |
| A24= | 1.053445060E−05 | −4.540407850E+01 | 2.618691673E+00 | −4.868184698E+06 |
| A26= | −7.487105039E−07 | 1.107606720E+01 | −6.497696803E−01 | 3.432050588E+06 |
| A28= | 3.182168180E−08 | −1.601220193E+00 | 9.569973982E−02 | −1.412674798E+06 |
| A30= | −6.101378668E−10 | 1.038153953E−01 | −6.281797608E−03 | 2.567932890E+05 |

| Surface # | 6 | 7 | 9 | 10 |
|---|---|---|---|---|
| k= | 0.00000E+00 | 0.00000E+00 | 0.00000E+00 | 0.00000E+00 |
| A4= | −2.314324897E−02 | 7.075453367E−02 | −1.755017158E−01 | −3.079723014E−01 |
| A6= | 2.990497682E+00 | −5.182586502E−01 | 4.348010829E−01 | 9.337554791E−01 |
| A8= | −7.307140248E+01 | 2.380308393E+00 | −5.932089735E+00 | −5.619415734E+00 |
| A10= | 1.061203450E+03 | −1.027122181E+00 | 5.339350107E+01 | 2.690278270E+01 |
| A12= | −1.008965699E+04 | −5.392872309E+01 | −3.030137515E+02 | −8.725452869E+01 |
| A14= | 6.587940031E+04 | 3.385994393E+02 | 1.152728302E+03 | 1.967095058E+02 |
| A16= | −3.042220960E+05 | −1.143034374E+03 | −3.078911937E+03 | −3.159177573E+02 |
| A18= | 1.009399500E+06 | 2.541336907E+03 | 5.912517021E+03 | 3.670692023E+02 |
| A20= | −2.416145554E+06 | −3.936759413E+03 | −8.214227205E+03 | −3.104058730E+02 |
| A22= | 4.137172369E+06 | 4.289831798E+03 | 8.180887270E+03 | 1.899028856E+02 |
| A24= | −4.943061245E+06 | −3.221664978E+03 | −5.685785845E+03 | −8.216476496E+01 |
| A26= | 3.913037663E+06 | 1.579895658E+03 | 2.612710312E+03 | 2.391207018E+01 |
| A28= | −1.842401750E+06 | −4.515982434E+02 | −7.114674816E+02 | −4.207779941E+00 |
| A30= | 3.896654648E+05 | 5.638349155E+01 | 8.669618922E+01 | 3.387041904E−01 |

| Surface # | 11 | 12 | 13 | 14 |
|---|---|---|---|---|
| k= | 0.00000E+00 | 0.00000E+00 | −4.40883E−01 | 0.00000E+00 |
| A4= | −2.466136820E−01 | −2.402091705E−01 | −1.506111183E−01 | −1.206030943E−01 |
| A6= | 1.095608855E+00 | 2.957200253E−01 | 4.257284116E−01 | 8.682941505E−01 |
| A8= | −6.381076702E+00 | −7.028591944E−01 | −1.188520243E+00 | −2.196463318E+00 |
| A10= | 2.703809497E+01 | 1.620968975E+00 | 2.336583500E+00 | 3.610809682E+00 |
| A12= | −7.750440303E+01 | −3.075425108E+00 | −3.233351226E+00 | −4.107224945E+00 |
| A14= | 1.557368028E+02 | 4.598460717E+00 | 3.201849039E+00 | 3.328825417E+00 |
| A16= | −2.238116116E+02 | −5.243007073E+00 | −2.297707801E+00 | −1.954813947E+00 |
| A18= | 2.321045038E+02 | 4.453030035E+00 | 1.200224373E+00 | 8.364237823E−01 |
| A20= | −1.737847010E+02 | −2.764812304E+00 | −4.544011098E−01 | −2.596448596E−01 |
| A22= | 9.301613188E+01 | 1.229180469E+00 | 1.228616576E−01 | 5.759476041E−02 |
| A24= | −3.469903444E+01 | −3.795003780E−01 | −2.302799405E−02 | −8.857001025E−03 |
| A26= | 8.567759948E+00 | 7.714168050E−02 | 2.830094091E−03 | 8.926928234E−04 |
| A28= | −1.257990605E+00 | −9.279397426E−03 | −2.041166319E−04 | −5.274485088E−05 |
| A30= | 8.309467379E−02 | 5.005019870E−04 | 6.509904884E−06 | 1.375398170E−06 |

| Surface # | 15 | 16 |
|---|---|---|
| k= | 0.00000E+00 | −1.05530E+00 |
| A4= | −3.412353390E−01 | −2.196740218E−01 |
| A6= | 9.591171799E−01 | 9.975151021E−02 |
| A8= | −2.464327502E+00 | −3.339158798E−02 |
| A10= | 4.156481123E+00 | 4.579334419E−03 |
| A12= | −4.780435496E+00 | 2.707400911E−03 |
| A14= | 3.875158983E+00 | −2.186177025E−03 |
| A16= | −2.257458626E+00 | 8.118728891E−04 |
| A18= | 9.530402091E−01 | −1.894687416E−04 |
| A20= | −2.912863764E−01 | 2.950866217E−05 |
| A22= | 6.370371687E−02 | −3.084879642E−06 |
| A24= | −9.705175698E−03 | 2.107645942E−07 |
| A26= | 9.772764340E−04 | −8.793521580E−09 |
| A28= | −5.841635820E−05 | 1.925429379E−10 |
| A30= | 1.568501704E−06 | −1.452109948E−12 |

In the 5th embodiment, the equation of the aspheric surface profiles of the aforementioned lens elements is the same as the equation of the 1st embodiment. Also, the definitions of these parameters shown in Table 5C are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Schematic Parameters | | | |
|---|---|---|---|
| f[mm] | 2.06 | (|R11| + |R12|)/f | 2.54 |
| Fno | 2.03 | (R13 + R14)/(R13 − R14) | 3.10 |
| HFOV [deg.] | 75.0 | ΣCT/ΣAT | 4.53 |
| FOV [deg.] | 150.0 | CT7/CT6 | 0.63 |
| TL/f | 3.76 | (CT2 + CT5)/(CT1 + CT4) | 2.10 |
| EPD/ImgH | 0.29 | T12/(CT2 + T23) | 0.40 |
| 10 × f/TD | 3.23 | (T12 + T23)/CT2 | 0.65 |
| |f/f3| | 1.00 | T12/CT3 | 0.45 |
| |f1/f3| | 1.79 | T12/CT7 | 0.66 |
| f1/f7 | 0.79 | CT6/CT5 | 1.42 |
| f4/f6 | −1.65 | (T23 + T34)/(T12 + T45) | 0.43 |
| |f6/f5| | 0.03 | (V2 + V4)/V5 | 0.90 |
| |f/f34| | 0.58 | SAG7R1/CT7 | −0.95 |
| (|f/f1| + |f/f6|)/|f/f4| | 2.80 | ET7/ET6 | 4.25 |
| |R1 + R2|/|R1 − R2| | 0.47 | Y7R1/Y6R1 | 1.12 |
| |(R1 + R4)/(R1 − R4)| | 0.09 | Yc72/Y6R2 | 0.95 |
| (|R1| + |R11|)/f | 2.72 | Yc61/Yc11 | 1.48 |
| (R5 + R6)/(R5 − R6) | 0.59 | |DIST|max | 54.5% |
| 100 × |R11/R9| | 6.80 | — | — |

6th Embodiment

Figure 11:
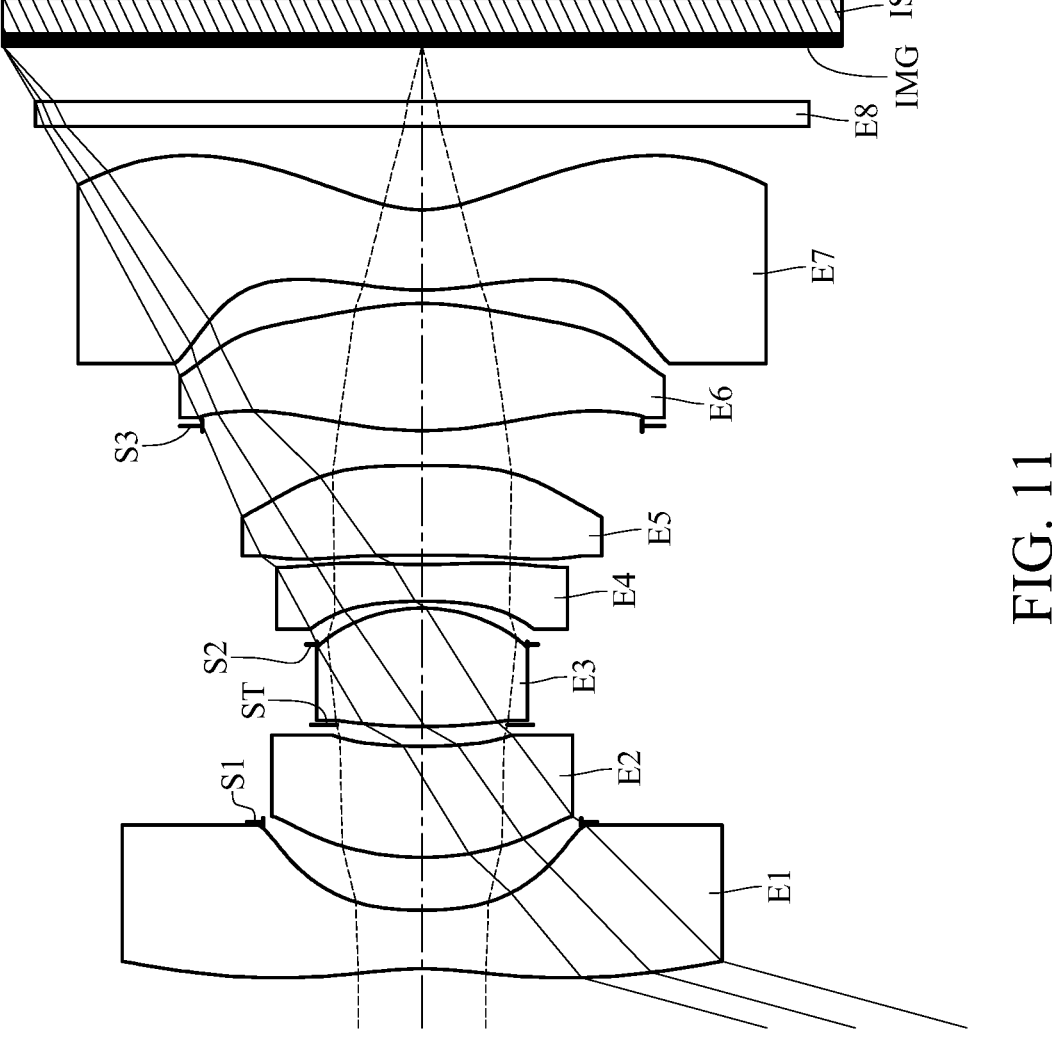
FIG. 11 is a schematic view of an image capturing unit according to the 6th embodiment of the present disclosure.
Figure 12:
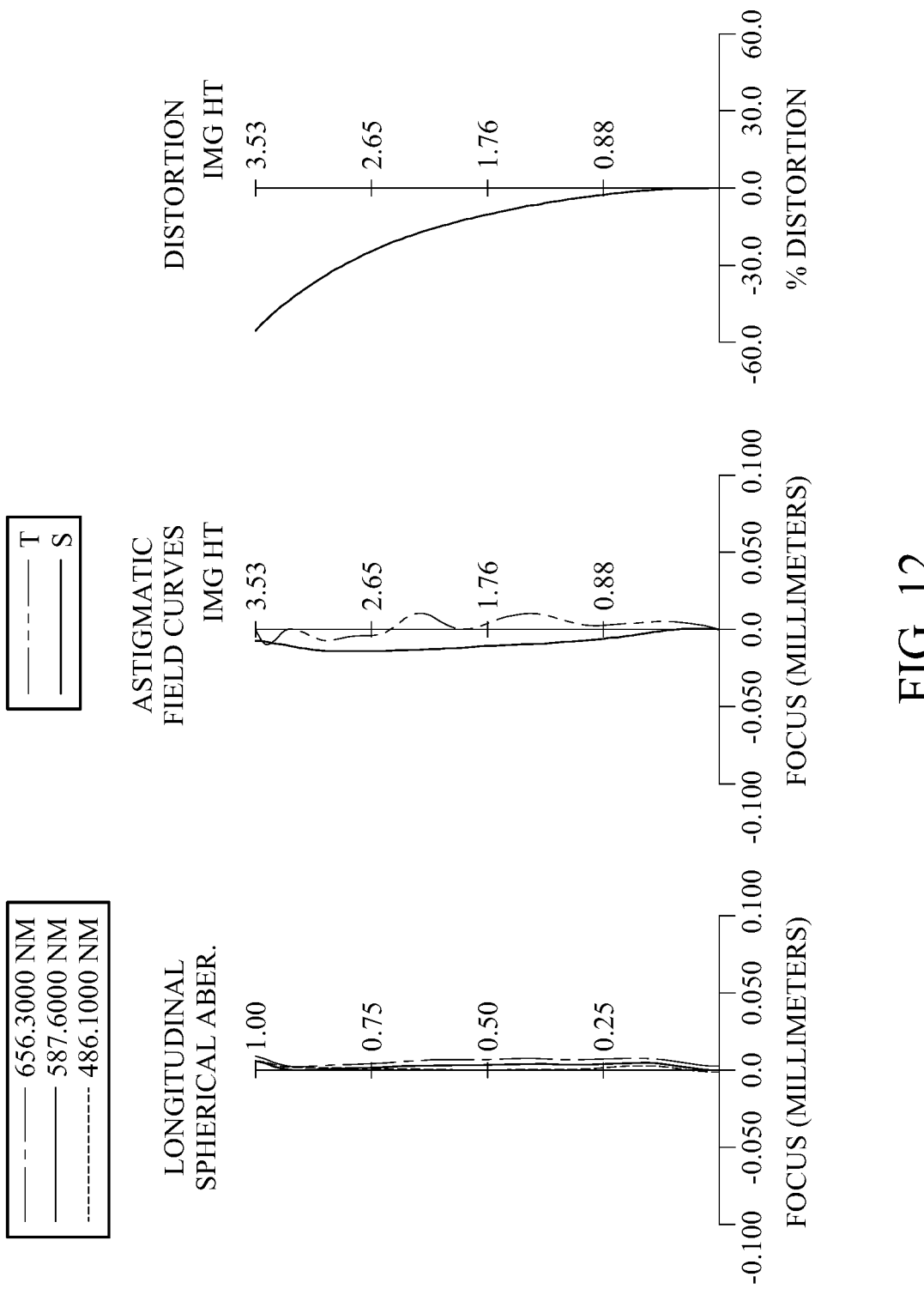
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the photographing lens assembly (its reference numeral is omitted) of the present disclosure and an image sensor IS. The photographing lens assembly includes, in order from an object side to an image side along an optical axis, a first lens element E1, a stop S1, a second lens element E2, an aperture stop ST, a third lens element E3, a stop S2, a fourth lens element E4, a fifth lens element E5, a stop S3, a sixth lens element E6, a seventh lens element E7, a filter E8 and an image surface IMG. The photographing lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has two critical points in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has two critical points in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has three inflection points. The object-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the photographing lens assembly. The image sensor IS is disposed on or near the image surface IMG of the photographing lens assembly.

The detailed optical data of the 6th embodiment are shown in Table 6A and the aspheric surface data are shown in Table 6B below.

TABLE 6A

6th Embodiment
f = 2.16 mm, Fno = 2.02, HFOV = 74.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.7622 | (ASP) | 0.493 | Plastic | 1.545 | 56.1 | −2.68 |
| 2 | | 3.2865 | (ASP) | 0.740 | | | | |
| 3 | Stop | Plano | | −0.296 | | | | |
| 4 | Lens 2 | 2.5297 | (ASP) | 0.935 | Plastic | 1.614 | 25.6 | 7.18 |
| 5 | | 5.1046 | (ASP) | 0.181 | | | | |
| 6 | Ape. Stop | Plano | | −0.014 | | | | |
| 7 | Lens 3 | 6.0661 | (ASP) | 0.995 | Plastic | 1.545 | 56.1 | 2.15 |
| 8 | | −1.3706 | (ASP) | −0.307 | | | | |
| 9 | Stop | Plano | | 0.364 | | | | |
| 10 | Lens 4 | −4.2913 | (ASP) | 0.310 | Plastic | 1.639 | 23.5 | −3.58 |
| 11 | | 5.0328 | (ASP) | 0.079 | | | | |
| 12 | Lens 5 | 47.2220 | (ASP) | 0.753 | Plastic | 1.545 | 56.1 | 35.56 |
| 13 | | −32.6849 | (ASP) | 0.335 | | | | |
| 14 | Stop | Plano | | −0.041 | | | | |
| 15 | Lens 6 | 2.9096 | (ASP) | 1.071 | Plastic | 1.545 | 56.1 | 2.68 |
| 16 | | −2.5572 | (ASP) | 0.113 | | | | |
| 17 | Lens 7 | 2.2812 | (ASP) | 0.676 | Plastic | 1.639 | 23.5 | −4.24 |
| 18 | | 1.0951 | (ASP) | 0.700 | | | | |
| 19 | Filter | Plano | | 0.210 | Glass | 1.517 | 64.2 | — |
| 20 | | Plano | | 0.467 | | | | |
| 21 | Image | Plano | | — | | | | |

Note:
Reference wavelength is 587.6 nm (d-line).
An effective radius of the stop S1 (Surface 3) is 1.337 mm.
An effective radius of the stop S2 (Surface 9) is 0.884 mm.
An effective radius of the stop S3 (Surface 14) is 1.849 mm.

TABLE 6B

Aspheric Coefficients

| Surface # | 1 | 2 | 4 | 5 |
|---|---|---|---|---|
| k= | 0.00000E+00 | 0.00000E+00 | 0.00000E+00 | 0.00000E+00 |
| A4= | 2.246454706E−01 | 2.503325671E−01 | 3.019664991E−02 | 1.098923417E−01 |
| A6= | −2.149233881E−01 | −1.659193993E−03 | 1.150101036E−02 | −3.626024886E−01 |
| A8= | 1.864844910E−01 | −1.147657666E+00 | −4.682359081E−01 | 8.845612647E+00 |
| A10= | −1.308813898E−01 | 5.326610515E+00 | 3.244834450E+00 | −1.258528305E+02 |
| A12= | 7.175429779E−02 | −1.565624109E+01 | −1.319896980E+01 | 1.149378555E+03 |
| A14= | −3.022437629E−02 | 3.284607926E+01 | 3.593381337E+01 | −7.068242733E+03 |
| A16= | 9.696448040E−03 | −5.011957843E+01 | −6.864690424E+01 | 3.021205097E+04 |
| A18= | −2.348787615E−03 | 5.560977237E+01 | 9.399743978E+01 | −9.131738268E+04 |
| A20= | 4.240094201E−04 | −4.448042784E+01 | −9.280761870E+01 | 1.960560579E+05 |
| A22= | −5.583269773E−05 | 2.519901227E+01 | 6.554043666E+01 | −2.964118430E+05 |
| A24= | 5.174994651E−06 | −9.794688712E+00 | −3.228033047E+01 | 3.076565152E+05 |
| A26= | −3.175059443E−07 | 2.466931563E+00 | 1.052499276E+01 | −2.080820910E+05 |
| A28= | 1.146302264E−08 | −3.598661095E−01 | −2.039849638E+00 | 8.234388888E+04 |
| A30= | −1.817715447E−10 | 2.288241808E−02 | 1.777490448E−01 | −1.442093353E+04 |

| Surface # | 7 | 8 | 10 | 11 |
|---|---|---|---|---|
| k= | 0.00000E+00 | 0.00000E+00 | 0.00000E+00 | 0.00000E+00 |
| A4= | 1.467528008E−02 | 5.879233614E−02 | −1.556774590E−01 | −3.341247053E−01 |
| A6= | 1.868236958E+00 | 1.254099367E−01 | 2.960555385E−01 | 8.278928014E−01 |
| A8= | −4.203513217E+01 | −3.743170920E+00 | −2.483147376E+00 | −1.821149675E+00 |
| A10= | 5.689953278E+02 | 3.117548724E+01 | 1.035993990E+01 | 1.344597894E+00 |
| A12= | −5.084515400E+03 | −1.779957959E+02 | −3.002857337E+01 | 6.949048670E+00 |
| A14= | 3.140407171E+04 | 7.512238603E+02 | 6.734625517E+01 | −3.088093858E+01 |
| A16= | −1.378895722E+05 | −2.359450500E+03 | −1.261368452E+02 | 6.862416455E+01 |
| A18= | 4.366335888E+05 | 5.480106314E+03 | 2.056751794E+02 | −1.006127490E+02 |
| A20= | −9.995720365E+05 | −9.311874947E+03 | −2.854668352E+02 | 1.032030801E+02 |
| A22= | 1.637735046E+06 | 1.137309222E+04 | 3.146404175E+02 | −7.465351371E+01 |
| A24= | −1.870345520E+06 | −9.683779925E+03 | −2.537731670E+02 | 3.736727495E+01 |
| A26= | 1.411960102E+06 | 5.440639031E+03 | 1.371410192E+02 | −1.232586107E+01 |
| A28= | −6.321260551E+05 | −1.808394528E+03 | −4.376060199E+01 | 2.411418377E+00 |
| A30= | 1.267990278E+05 | 2.687767046E+02 | 6.183187782E+00 | −2.120251658E−01 |

| Surface # | 12 | 13 | 15 | 16 |
|---|---|---|---|---|
| k= | 0.00000E+00 | 0.00000E+00 | −2.80203E−02 | 0.00000E+00 |
| A4= | −2.746401179E−01 | −2.211199579E−01 | −5.199861758E−02 | 6.952454671E−02 |

TABLE 6B-continued

| A6= | 6.761588626E−01 | 1.243239431E−01 | −4.221855939E−02 | −3.468205090E−02 |
|---|---|---|---|---|
| A8= | −1.047747460E+00 | −1.531271427E−01 | 9.228986259E−02 | 2.428654954E−01 |
| A10= | 7.462411170E−01 | 6.086028592E−01 | −6.587952477E−02 | −7.051288520E−01 |
| A12= | 8.615864995E−01 | −1.771507977E+00 | −2.197905392E−02 | 1.187572452E+00 |
| A14= | −2.754842587E+00 | 3.311039465E+00 | 8.411869015E−02 | −1.328919434E+00 |
| A16= | 3.075203382E+00 | −4.207680432E+00 | −7.994066020E−02 | 1.031522509E+00 |
| A18= | −1.758958275E+00 | 3.769435755E+00 | 4.303311197E−02 | −5.664125979E−01 |
| A20= | 3.940971280E+00 | −2.410776857E+00 | −1.425746705E−02 | 2.214549769E−01 |
| A22= | 1.154084531E−01 | 1.094348309E+00 | 2.698478155E−03 | −6.124985294E−02 |
| A24= | −9.717041324E−02 | −3.439427448E−01 | −1.638391593E−04 | 1.170735981E−02 |
| A26= | 2.171472873E−02 | 7.101828021E−02 | −4.174348331E−05 | −1.470609511E−03 |
| A28= | −7.853341728E−04 | −8.646477374E−03 | 9.500819562E−06 | 1.091790172E−04 |
| A30= | −2.304957877E−04 | 4.692945951E−04 | −6.073336446E−07 | −3.627946510E−06 |

| Surface # | 17 | 18 |
|---|---|---|
| k= | 0.00000E+00 | −1.07167E+00 |
| A4= | −2.114706092E−01 | −3.328686077E−01 |
| A6= | 8.303852783E−02 | 2.710927849E−01 |
| A8= | 5.584911615E−02 | −1.892509797E−01 |
| A10= | −1.898956054E−01 | 1.044794352E−01 |
| A12= | 2.429981736E−01 | −4.516757138E−02 |
| A14= | −1.972174703E−01 | 1.524852806E−02 |
| A16= | 1.056197051E−01 | −3.988280819E−03 |
| A18= | −3.587527622E−02 | 7.976994973E−04 |
| A20= | 6.598270089E−03 | −1.199266020E−04 |
| A22= | −9.073910598E−05 | 1.324057961E−05 |
| A24= | −2.523989225E−04 | −1.036781189E−06 |
| A26= | 5.794283609E−05 | 5.432778420E−08 |
| A28= | −5.717363299E−06 | −1.704244471E−09 |
| A30= | 2.212856079E−07 | 2.414950204E−11 |

In the 6th embodiment, the equation of the aspheric surface profiles of the aforementioned lens elements is the same as the equation of the 1st embodiment. Also, the definitions of these parameters shown in Table 6C are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

Schematic Parameters

| f [mm] | 2.16 | (|R11| + |R12|)/f | 2.53 |
|---|---|---|---|
| Fno | 2.02 | (R13 + R14)/(R13 − R14) | 2.85 |
| HFOV [deg.] | 74.7 | ΣCT/ΣAT | 4.53 |
| FOV [deg.] | 149.4 | CT7/CT6 | 0.63 |
| TL/f | 3.59 | (CT2 + CT5)/(CT1 + CT4) | 2.10 |
| EPD/ImgH | 0.30 | T12/(CT2 + T23) | 0.40 |
| 10 × f/TD | 3.39 | (T12 + T23)/CT2 | 0.65 |
| |f/f3| | 1.01 | T12/CT3 | 0.45 |
| |f1/f3| | 1.24 | T12/CT7 | 0.66 |
| f1/f7 | 0.63 | CT6/CT5 | 1.42 |
| f4/f6 | −1.33 | (T23 + T34)/(T12 + T45) | 0.43 |
| |f6/f5| | 0.08 | (V2 + V4)/V5 | 0.87 |
| |f/f34| | 0.48 | SAG7R1/CT7 | −0.92 |
| (|f/f1| + |f/f6|)/|f/f4| | 2.67 | ET7/ET6 | 4.34 |
| |R1 + R2|/|R1 − R2| | 0.09 | Y7R1/Y6R1 | 1.11 |
| |(R1 + R4)/(R1 − R4)| | 0.30 | Yc72/Y6R2 | 0.97 |
| (|R1| + |R11|)/f | 2.62 | Yc61/Yc11 | 1.20 |
| (R5 + R6)/(R5 − R6) | 0.63 | |DIST|max | 55.4% |
| 100 × |R11/R9| | 6.16 | — | — |

7th Embodiment

Figure 13:
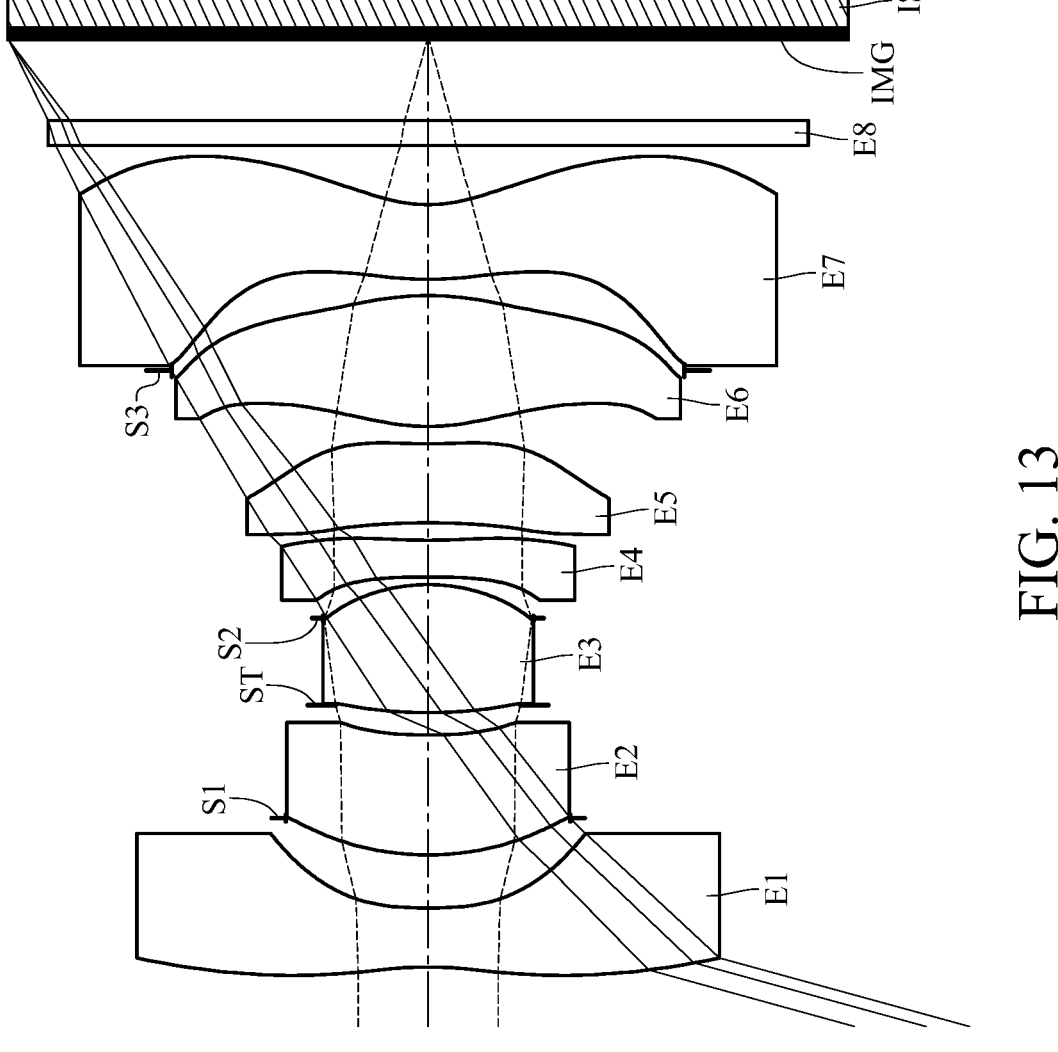
FIG. 13 is a schematic view of an image capturing unit according to the 7th embodiment of the present disclosure.
Figure 14:
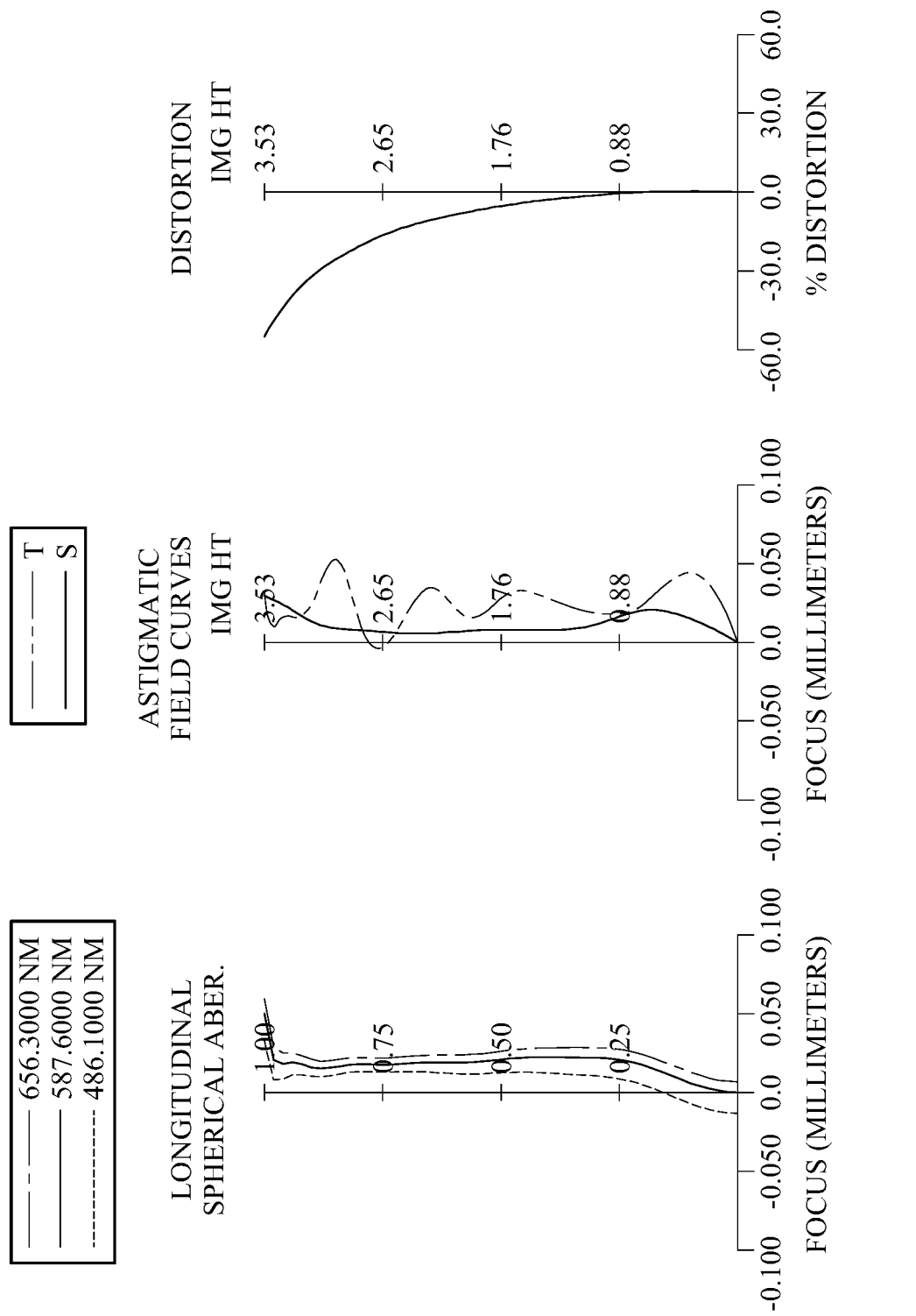
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the photographing lens assembly (its reference numeral is omitted) of the present disclosure and an image sensor IS. The photographing lens assembly includes, in order from an object side to an image side along an optical axis, a first lens element E1, a stop S1, a second lens element E2, an aperture stop ST, a third lens element E3, a stop S2, a fourth lens element E4, a fifth lens element E5, a sixth lens element E6, a stop S3, a seventh lens element E7, a filter E8 and an image surface IMG. The photographing lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has one inflection point. The image-side surface of the fourth lens element E4 has one critical point in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has four inflection points. The image-side surface of the fifth lens element E5 has one critical point in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has three inflection points. The object-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the photographing lens assembly. The image sensor IS is disposed on or near the image surface IMG of the photographing lens assembly.

The detailed optical data of the 7th embodiment are shown in Table 7A and the aspheric surface data are shown in Table 7B below.

TABLE 7A

|  |  |  |  |  |  |  |  |  |
|---|---|---|---|---|---|---|---|---|
| 7th Embodiment f = 2.15 mm, Fno = 1.83, HFOV = 74.7 deg. | | | | | | | | |
| Surface # | | Curvature Radius | | Thickness | Material | Index | Abbe # | Focal Length |
| 0 | Object | Plano | | Infinity | | | | |
| 1 | Lens 1 | −2.6993 | (ASP) | 0.496 | Plastic | 1.530 | 55.8 | −2.91 |
| 2 | | 3.8273 | (ASP) | 0.758 | | | | |
| 3 | Stop | Plano | | −0.310 | | | | |
| 4 | Lens 2 | 2.4993 | (ASP) | 1.007 | Plastic | 1.639 | 23.5 | 9.70 |
| 5 | | 3.5326 | (ASP) | 0.253 | | | | |
| 6 | Ape. Stop | Plano | | −0.063 | | | | |
| 7 | Lens 3 | 4.3472 | (ASP) | 1.077 | Plastic | 1.544 | 56.0 | 2.19 |
| 8 | | −1.4997 | (ASP) | −0.284 | | | | |
| 9 | Stop | Plano | | 0.347 | | | | |
| 10 | Lens 4 | −9.2311 | (ASP) | 0.311 | Plastic | 1.639 | 23.5 | −5.43 |
| 11 | | 5.6341 | (ASP) | 0.145 | | | | |
| 12 | Lens 5 | −8.3101 | (ASP) | 0.666 | Plastic | 1.544 | 56.0 | −5.03 |
| 13 | | 4.1913 | (ASP) | 0.145 | | | | |
| 14 | Lens 6 | 1.6072 | (ASP) | 1.102 | Plastic | 1.544 | 56.0 | 1.98 |
| 15 | | −2.4640 | (ASP) | −0.630 | | | | |
| 16 | Stop | Plano | | 0.766 | | | | |
| 17 | Lens 7 | 2.3533 | (ASP) | 0.629 | Plastic | 1.614 | 25.6 | −4.47 |
| 18 | | 1.1377 | (ASP) | 0.500 | | | | |
| 19 | Filter | Plano | | 0.210 | Glass | 1.517 | 64.2 | — |
| 20 | | Plano | | 0.678 | | | | |
| 21 | Image | Plano | | — | | | | |

Note:

Reference wavelength is 587.6 nm (d-line).

An effective radius of the stop S1 (Surface 3) is 1.196 mm.

An effective radius of the stop S2 (Surface 9) is 0.883 mm.

An effective radius of the stop S3 (Surface 16) is 2.154 mm.

TABLE 7B

| Aspheric Coefficients | | | | |
|---|---|---|---|---|
| Surface # | 1 | 2 | 4 | 5 |
| k= | 0.00000E+00 | 0.00000E+00 | 0.00000E+00 | 0.00000E+00 |
| A4= | 2.436297749E−01 | 2.862670129E−01 | 4.339088089E−02 | 1.045260138E−01 |
| A6= | −2.289717580E−01 | −1.899515862E−01 | −5.162675973E−02 | −1.252311640E−01 |
| A8= | 1.802902679E−01 | 1.792039621E−01 | 1.153171350E−01 | 1.235106226E+00 |
| A10= | −1.036113776E−01 | −1.164600879E+00 | −1.299626166E+00 | −4.122477252E+00 |
| A12= | 3.911985660E−02 | 4.891507736E+00 | 9.021730229E+00 | −3.804632476E+01 |
| A14= | −7.016254663E−03 | −1.135128065E+01 | −3.539591563E+01 | 5.425974377E+02 |
| A16= | −1.415678081E−03 | 1.651148516E+01 | 8.827278374E+01 | −3.212695202E+03 |
| A18= | 1.392743623E−03 | −1.583227140E+01 | −1.488272647E+02 | 1.151774006E+04 |
| A20= | −4.747595151E−04 | 1.001842643E+01 | 1.742612729E+02 | −2.722501994E+04 |
| A22= | 9.757021659E−05 | −3.963979468E+00 | −1.422368005E+02 | 4.340910799E+04 |
| A24= | −1.301094846E−05 | 8.001144106E−01 | 7.950346307E+01 | −4.623554726E+04 |
| A26= | 1.106595076E−06 | 1.231619568E−02 | −2.903322683E+01 | 3.150624978E+04 |
| A28= | −5.478726506E−08 | −3.965710717E−02 | 6.243064688E+00 | −1.240299357E+04 |
| A30= | 1.205046705E−09 | 5.653499932E−03 | −5.995920567E−01 | 2.141634063E+03 |
| Surface # | 7 | 8 | 10 | 11 |
| k= | 0.00000E+00 | 0.00000E+00 | 0.00000E+00 | 0.00000E+00 |
| A4= | 4.015786092E−02 | 2.772637426E−02 | −1.575825508E−01 | −1.349257898E−01 |
| A6= | −1.401646975E−03 | −2.290398651E−01 | 7.003590439E−02 | 1.187367205E−01 |
| A8= | 9.571283308E+00 | −4.179203493E−03 | −2.594533109E+00 | −9.957003287E−01 |
| A10= | −2.328286094E+02 | 1.141616772E+01 | 2.320033465E+01 | 4.563717382E+00 |
| A12= | 2.778651226E+03 | −1.027396629E+02 | −1.202019075E+02 | −1.254305663E+01 |
| A14= | −2.040545341E+04 | 5.235032946E+02 | 4.222757320E+02 | 2.275319923E+01 |
| A16= | 9.992779289E+04 | −1.805883437E+03 | −1.069826578E+03 | −2.857247650E+01 |
| A18= | −3.385850156E+05 | 4.425962822E+03 | 1.999046414E+03 | 2.672643582E+01 |
| A20= | 8.051319622E+05 | −7.791922808E+03 | −2.757162762E+03 | −2.069481832E+01 |
| A22= | −1.339546947E+06 | 9.769543240E+03 | 2.762536715E+03 | 1.409070487E+01 |
| A24= | 1.525767757E+06 | −8.494225374E+03 | −1.944752630E+03 | −7.852029238E+00 |
| A26= | −1.132207623E+06 | 4.855946109E+03 | 9.066333351E+02 | 3.086766081E+00 |
| A28= | 4.924236073E+05 | −1.637971936E+03 | −2.499723807E+02 | −7.226542223E−01 |
| A30= | −9.507386076E+04 | 2.465201245E+02 | 3.071055852E+01 | 7.447751929E−02 |
| Surface # | 12 | 13 | 14 | 15 |
| k= | 0.00000E+00 | 0.00000E+00 | −7.66017E−01 | 0.00000E+00 |
| A4= | −1.116365598E−01 | −5.452819729E−01 | −3.512365229E−01 | −5.168897000E−02 |
| A6= | 4.588062140E−01 | 9.264562607E−01 | 6.148891487E−01 | 5.672828225E−01 |
| A8= | −1.632566369E+00 | −2.140095602E+00 | −1.302353185E+00 | −1.411013217E+00 |
| A10= | 2.581693611E+00 | 4.725138916E+00 | 2.419761308E+00 | 2.415223261E+00 |
| A12= | 3.390767047E+00 | −8.882572832E+00 | −3.549197694E+00 | −2.988888387E+00 |
| A14= | −2.782212918E+01 | 1.324470483E+01 | 3.905599922E+00 | 2.667555170E+00 |
| A16= | 7.108800165E+01 | −1.496916399E+01 | −3.164591840E+00 | −1.723224325E+00 |
| A18= | −1.071931316E+02 | 1.251733113E+01 | 1.875853057E+00 | 8.086572222E−01 |
| A20= | 1.060574662E+02 | −7.612819862E+00 | −8.078401306E−01 | −2.750014298E−01 |
| A22= | −7.089371245E+01 | 3.301017479E+00 | 2.491584921E−01 | 6.694588823E−02 |
| A24= | 3.183585119E+01 | −9.893247248E−01 | −5.351158172E−02 | −1.135371445E−02 |
| A26= | −9.228693272E+00 | 1.940271009E−01 | 7.588371782E−03 | 1.272523642E−03 |
| A28= | 1.563656229E+00 | −2.234000242E−02 | −6.379629409E−04 | −8.464533966E−05 |
| A30= | −1.178221628E−01 | 1.142176044E−03 | 2.406100588E−05 | 2.528786214E−06 |
| Surface # | | 17 | | 18 |
| k= | | 0.00000E+00 | | −1.00258E+00 |
| A4= | | −3.662615010E−01 | | −3.564558188E−01 |
| A6= | | 6.475423138E−01 | | 3.362637604E−01 |
| A8= | | −1.195600564E+00 | | −2.872301032E−01 |
| A10= | | 1.701064540E+00 | | 1.896366916E−01 |
| A12= | | −1.788908692E+00 | | −9.341004948E−02 |
| A14= | | 1.373961020E+00 | | 3.410779160E−02 |
| A16= | | −7.712798886E−01 | | −9.216594264E−03 |
| A18= | | 3.169764975E−01 | | 1.836653452E−03 |
| A20= | | −9.504296272E−02 | | −2.677053525E−04 |
| A22= | | 2.052638833E−02 | | 2.808155525E−05 |
| A24= | | −3.105855579E−03 | | −2.057943566E−06 |
| A26= | | 3.121203262E−04 | | 9.978564236E−08 |
| A28= | | −1.869241026E−05 | | −2.871487784E−09 |
| A30= | | 5.043753572E−07 | | 3.707573517E−11 |

In the 7th embodiment, the equation of the aspheric surface profiles of the aforementioned lens elements is the same as the equation of the 1st embodiment. Also, the definitions of these parameters shown in Table 7C are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Schematic Parameters | | | |
|---|---|---|---|
| f [mm] | 2.15 | (|R11| + |R12|)/f | 1.89 |
| Fno | 1.83 | (R13 + R14)/(R13 − R14) | 2.87 |
| HFOV [deg.] | 74.7 | ΣCT/ΣAT | 4.69 |
| FOV [deg.] | 149.4 | CT7/CT6 | 0.57 |
| TL/f | 3.63 | (CT2 + CT5)/(CT1 + CT4) | 2.07 |
| EPD/ImgH | 0.33 | T12/(CT2 + T23) | 0.37 |
| 10 × f/TD | 3.35 | (T12 + T23)/CT2 | 0.63 |
| |f/f3| | 0.98 | T12/CT3 | 0.42 |
| |f1/f3| | 1.33 | T12/CT7 | 0.71 |
| f1/f7 | 0.65 | CT6/CT5 | 1.65 |
| f4/f6 | −2.75 | (T23 + T34)/(T12 + T45) | 0.43 |
| |f6/f5| | 0.39 | (V2 + V4)/V5 | 0.84 |
| |f/f34| | 0.65 | SAG7R1/CT7 | −1.15 |
| (|f/f1| + |f/f6|)/|f/f4| | 4.62 | ET7/ET6 | 4.22 |
| |R1 + R2|/|R1 − R2| | 0.17 | Y7R1/Y6R1 | 1.13 |
| |(R1 + R4)/(R1 − R4)| | 0.13 | Yc72/Y6R2 | 0.89 |
| (|R1| + |R11|)/f | 2.00 | Yc61/Yc11 | 1.25 |
| (R5 + R6)/(R5 − R6) | 0.49 | |DIST|max | 55.1% |
| 100 × |R11/R9| | 19.34 | — | — |

8th Embodiment

Figure 15:
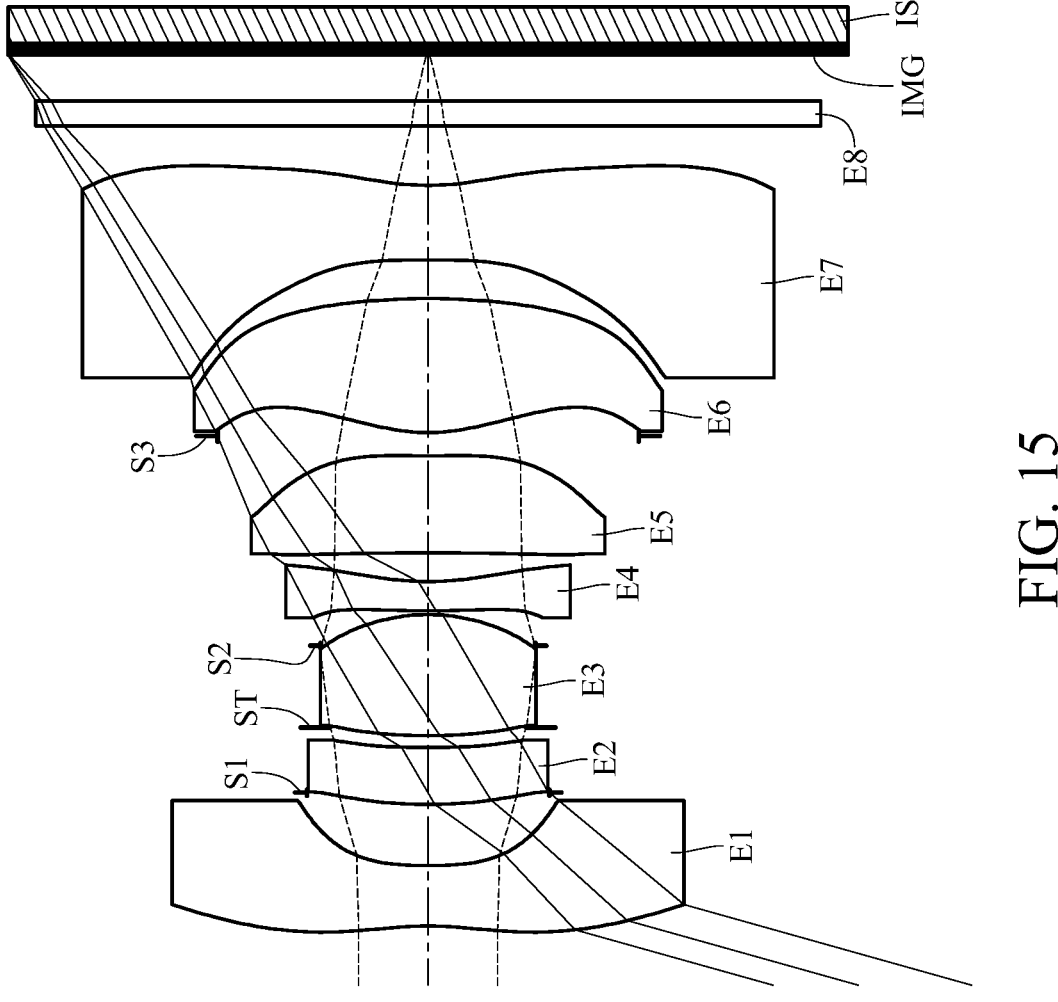
FIG. 15 is a schematic view of an image capturing unit according to the 8th embodiment of the present disclosure.
Figure 16:
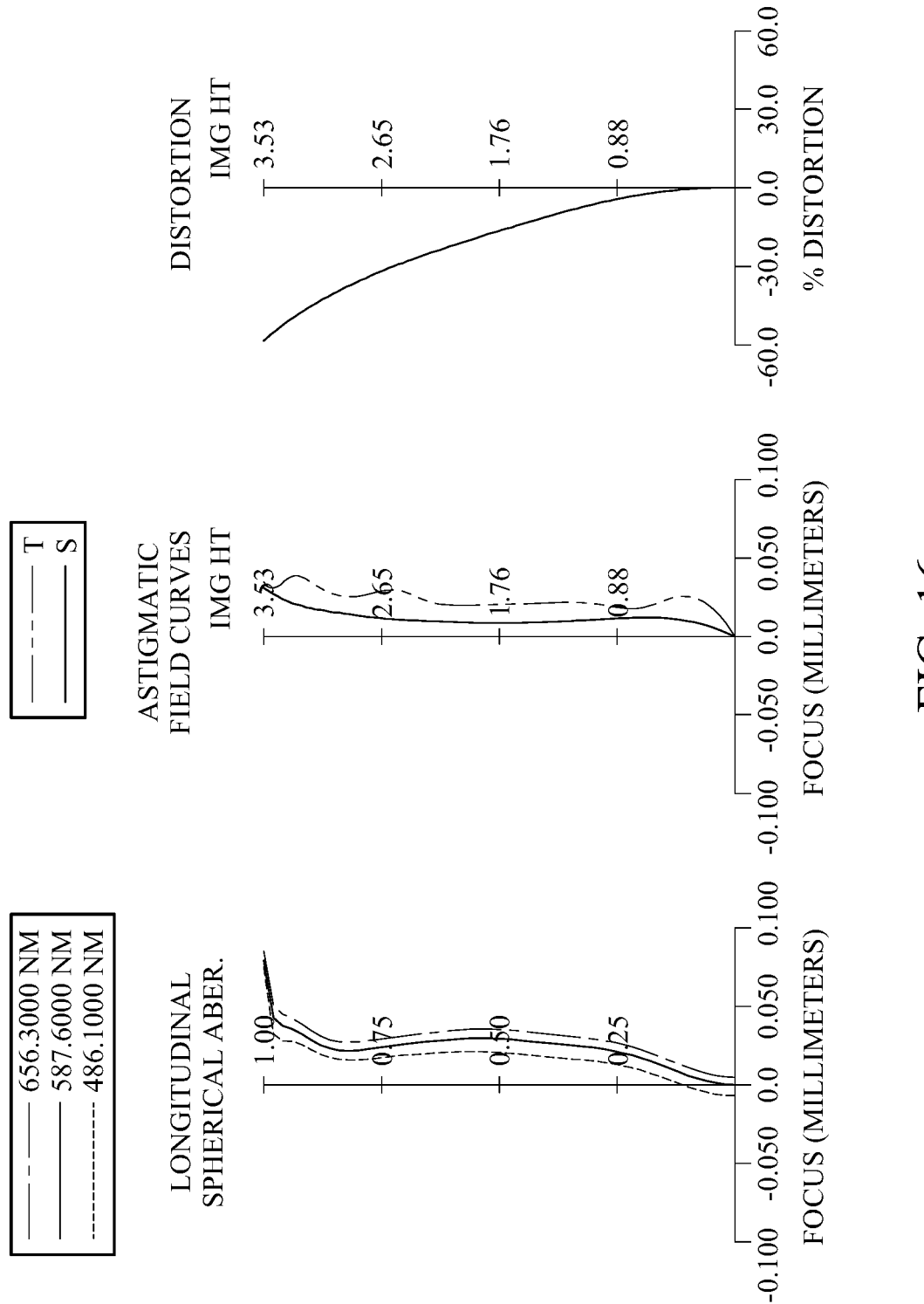
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the photographing lens assembly (its reference numeral is omitted) of the present disclosure and an image sensor IS. The photographing lens assembly includes, in order from an object side to an image side along an optical axis, a first lens element E1, a stop S1, a second lens element E2, an aperture stop ST, a third lens element E3, a stop S2, a fourth lens element E4, a fifth lens element E5, a stop S3, a sixth lens element E6, a seventh lens element E7, a filter E8 and an image surface IMG. The photographing lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point. The object-side surface of the fourth lens element E4 has one critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has two critical points in an off-axis region thereof. The image-side surface of the fifth lens element E5 has one critical point in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The image-side surface of the seventh lens element E7 has one critical point in an off-axis region thereof.

The filter E8 is made of glass material and located between the seventh lens element E7 and the image surface IMG, and will not affect the focal length of the photographing lens assembly. The image sensor IS is disposed on or near the image surface IMG of the photographing lens assembly.

The detailed optical data of the 8th embodiment are shown in Table 8A and the aspheric surface data are shown in Table 8B below.

TABLE 8A

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.7598 | (ASP) | 0.508 | Plastic | 1.544 | 56.0 | −2.94 |
| 2 | | 4.0434 | (ASP) | 0.615 | | | | |
| 3 | Stop | Plano | | −0.100 | | | | |
| 4 | Lens 2 | 4.1012 | (ASP) | 0.478 | Plastic | 1.639 | 23.5 | 13.19 |
| 5 | | 7.6290 | (ASP) | 0.168 | | | | |
| 6 | Ape. Stop | Plano | | −0.066 | | | | |
| 7 | Lens 3 | 5.6063 | (ASP) | 1.018 | Plastic | 1.544 | 56.0 | 2.28 |
| 8 | | −1.4930 | (ASP) | −0.263 | | | | |
| 9 | Stop | Plano | | 0.293 | | | | |
| 10 | Lens 4 | 6.1745 | (ASP) | 0.247 | Plastic | 1.639 | 23.5 | −5.28 |
| 11 | | 2.1464 | (ASP) | 0.242 | | | | |
| 12 | Lens 5 | 1381.4247 | (ASP) | 0.817 | Plastic | 1.544 | 56.0 | −19.00 |
| 13 | | 10.2556 | (ASP) | 0.166 | | | | |
| 14 | Stop | Plano | | 0.030 | | | | |
| 15 | Lens 6 | 1.5267 | (ASP) | 1.128 | Plastic | 1.544 | 56.0 | 2.29 |
| 16 | | −4.9882 | (ASP) | 0.325 | | | | |
| 17 | Lens 7 | −14.0714 | (ASP) | 0.626 | Plastic | 1.639 | 23.5 | −2.69 |
| 18 | | 1.9911 | (ASP) | 0.500 | | | | |
| 19 | Filter | Plano | | 0.210 | Glass | 1.517 | 64.2 | — |
| 20 | | Plano | | 0.386 | | | | |
| 21 | Image | Plano | | — | | | | |

Note:
Reference wavelength is 587.6 nm (d-line).
An effective radius of the stop S1 (Surface 3) is 1.018 mm.
An effective radius of the stop S2 (Surface 9) is 0.902 mm.
An effective radius of the stop S3 (Surface 14) is 1.771 mm.

TABLE 8B

Aspheric Coefficients

| Surface # | 1 | 2 | 4 | 5 |
|---|---|---|---|---|
| k= | 0.00000E+00 | 0.00000E+00 | −5.92231E+00 | 6.28726E+01 |
| A4= | 2.645111943E−01 | 3.707054166E−01 | 5.876153954E−02 | 9.300353986E−02 |
| A6= | −2.480237017E−01 | −2.587659096E−01 | −1.115296298E−01 | −1.866203664E−01 |
| A8= | 2.178277342E−01 | 9.297308812E−01 | 2.001331290E−01 | 8.381612449E−01 |
| A10= | −1.560028147E−01 | −5.231044549E+00 | −3.438355770E−01 | −4.957433485E+00 |
| A12= | 8.626038434E−02 | 2.001334319E+01 | 1.509731561E−01 | 1.716350311E+01 |
| A14= | −3.589392517E−02 | −4.758395904E+01 | 4.365230500E−01 | −3.581131020E+01 |
| A16= | 1.104795043E−02 | 7.242557731E+01 | −7.986186987E−01 | 4.500124885E+01 |
| A18= | −2.463624230E−03 | −7.088832198E+01 | 5.394180187E−01 | −3.144216155E+01 |
| A20= | 3.852712086E−04 | 4.316544741E+01 | −1.373196174E−01 | 9.433764219E+00 |
| A22= | −3.993677013E−05 | −1.485310021E+01 | — | — |
| A24= | 2.458180439E−06 | 2.196121467E+00 | — | — |
| A26= | −6.787713102E−08 | — | — | — |

| Surface # | 7 | 8 | 10 | 11 |
|---|---|---|---|---|
| k= | 1.99871E+01 | −1.34053E+00 | 1.86704E+01 | −6.26812E+00 |
| A4= | 6.633696601E−02 | 1.181693512E−01 | −1.181634321E−01 | −2.015220529E−01 |
| A6= | 4.474086587E−01 | −4.738447771E−01 | 7.349061289E−02 | 6.542260114E−01 |
| A8= | −5.979818937E+00 | 7.170206358E−01 | −7.746172065E−01 | −2.012013578E+00 |
| A10= | 3.969759218E+01 | −4.505984732E−01 | 2.491573940E+00 | 4.541118615E+00 |
| A12= | −1.719374436E+02 | −6.379696207E−01 | −4.801925883E+00 | −7.492476453E+00 |
| A14= | 5.022799376E+02 | 1.524529224E+00 | 5.722068708E+00 | 9.001186280E+00 |
| A16= | −9.991704422E+02 | −1.195108623E+00 | −4.157885532E+00 | −7.752756414E+00 |
| A18= | 1.338972267E+03 | 3.444069266E−01 | 1.677573007E+00 | 4.648126474E+00 |
| A20= | −1.162022916E+03 | — | −2.846833395E−01 | −1.837429006E+00 |
| A22= | 5.929664734E+02 | — | — | 4.297177095E−01 |
| A24= | −1.357971240E+02 | — | — | −4.497595362E−02 |

| Surface # | 12 | 13 | 15 | 16 |
|---|---|---|---|---|
| k= | 0.00000E+00 | 0.00000E+00 | −1.17014E+01 | 0.00000E+00 |
| A4= | −7.302092886E−02 | −3.590581087E−01 | 1.048305388E−01 | 6.309338706E−02 |
| A6= | 2.198015138E−01 | 3.809240389E−01 | −4.113166804E−01 | −8.817417334E−02 |
| A8= | −5.164608293E−01 | −3.156966886E−01 | 9.069503689E−01 | −1.150874518E−02 |
| A10= | 9.079119400E−01 | −2.464572219E−01 | −1.506050269E+00 | 1.920280336E−01 |
| A12= | −1.157617558E+00 | 1.523797676E+00 | 1.842123270E+00 | −3.505312718E−01 |

TABLE 8B-continued

| | Aspheric Coefficients | | | |
|---|---|---|---|---|
| A14= | 9.950196197E−01 | −3.025684363E+00 | −1.652491890E+00 | 3.860699295E−01 |
| A16= | −4.748600174E−01 | 3.692621973E+00 | 1.081867480E+00 | −2.906535350E−01 |
| A18= | 1.220938089E−02 | −3.040532934E+00 | −5.126602261E−01 | 1.528644703E−01 |
| A20= | 1.334562048E−01 | 1.720527763E+00 | 1.729682124E−01 | −5.591639593E−02 |
| A22= | −8.144960201E−02 | −6.595249484E−01 | −4.028594144E−02 | 1.390215414E−02 |
| A24= | 2.159380115E−02 | 1.634239100E−01 | 6.119081843E−03 | −2.234669803E−03 |
| A26= | −2.259532269E−03 | −2.356577444E−02 | −5.415609925E−04 | 2.089756655E−04 |
| A28= | — | 1.497151452E−03 | 2.098948254E−05 | −8.617044172E−06 |

| Surface # | 17 | 18 |
|---|---|---|
| k= | −3.03185E+01 | −1.30605E+00 |
| A4= | −1.614304910E−01 | −2.132951586E−01 |
| A6= | 9.458536644E−02 | 1.403999776E−01 |
| A8= | −3.105362975E−01 | −8.176774056E−02 |
| A10= | 8.338085585E−01 | 4.586035936E−02 |
| A12= | −1.321510871E+00 | −2.205945880E−02 |
| A14= | 1.406838842E+00 | 8.204960322E−03 |
| A16= | −1.059179766E+00 | −2.271652978E−03 |
| A18= | 5.729196451E−01 | 4.630972250E−04 |
| A20= | −2.226364182E−01 | −6.900127299E−05 |
| A22= | 6.140082745E−02 | 7.409457231E−06 |
| A24= | −1.169194584E−02 | −5.575873073E−07 |
| A26= | 1.457793421E−03 | 2.787672891E−08 |
| A28= | −1.068614410E−04 | −8.308499833E−10 |
| A30= | 3.484879334E−06 | 1.116015525E−11 |

In the 8th embodiment, the equation of the aspheric surface profiles of the aforementioned lens elements is the same as the equation of the 1st embodiment. Also, the definitions of these parameters shown in Table 8C are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

| | Schematic Parameters | | |
|---|---|---|---|
| f [mm] | 2.38 | (\|R11\| + \|R12\|)/f | 2.74 |
| Fno | 2.04 | (R13 + R14)/(R13 − R14) | 0.75 |
| HFOV [deg.] | 74.3 | ΣCT/ΣAT | 3.42 |
| FOV [deg.] | 148.6 | CT7/CT6 | 0.55 |
| TL/f | 3.08 | (CT2 + CT5)/(CT1 + CT4) | 1.72 |
| EPD/ImgH | 0.33 | T12/(CT2 + T23) | 0.89 |
| 10 × f/TD | 3.82 | (T12 + T23)/CT2 | 1.29 |
| \|f/f3\| | 1.04 | T12/CT3 | 0.51 |
| \|f1/f3\| | 1.29 | T12/CT7 | 0.82 |
| f1/f7 | 1.09 | CT6/CT5 | 1.38 |
| f4/f6 | −2.31 | (T23 + T34)/(T12 + T45) | 0.17 |
| \|f6/f5\| | 0.12 | (V2 + V4)/V5 | 0.84 |
| \|f/f34\| | 0.67 | SAG7R1/CT7 | −1.59 |
| (\|f/f1\| + \|f/f6\|)/\|f/f4\| | 4.10 | ET7/ET6 | 4.63 |
| \|R1 + R2\|/\|R1 − R2\| | 0.19 | Y7R1/Y6R1 | 1.12 |
| \|(R1 + R4)/(R1 − R4)\| | 0.47 | Yc72/Y6R2 | 0.99 |
| (\|R1\| + \|R11\|)/f | 1.80 | Yc61/Yc11 | 1.42 |
| (R5 + R6)/(R5 − R6) | 0.58 | \|DIST\|max | 58.4% |
| 100 × \|R11/R9\| | 0.11 | — | — |

9th Embodiment

Figure 17:
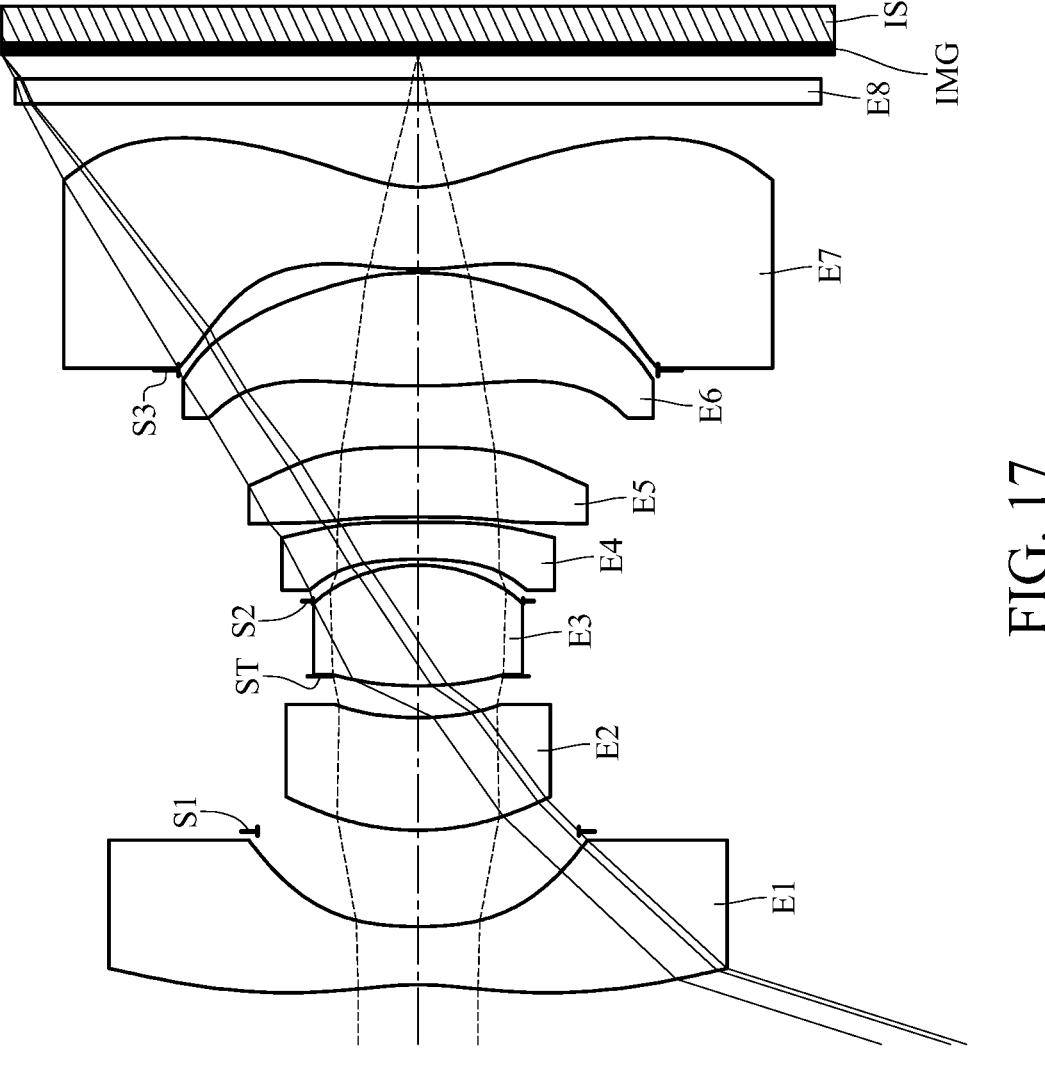
FIG. 17 is a schematic view of an image capturing unit according to the 9th embodiment of the present disclosure.
Figure 18:
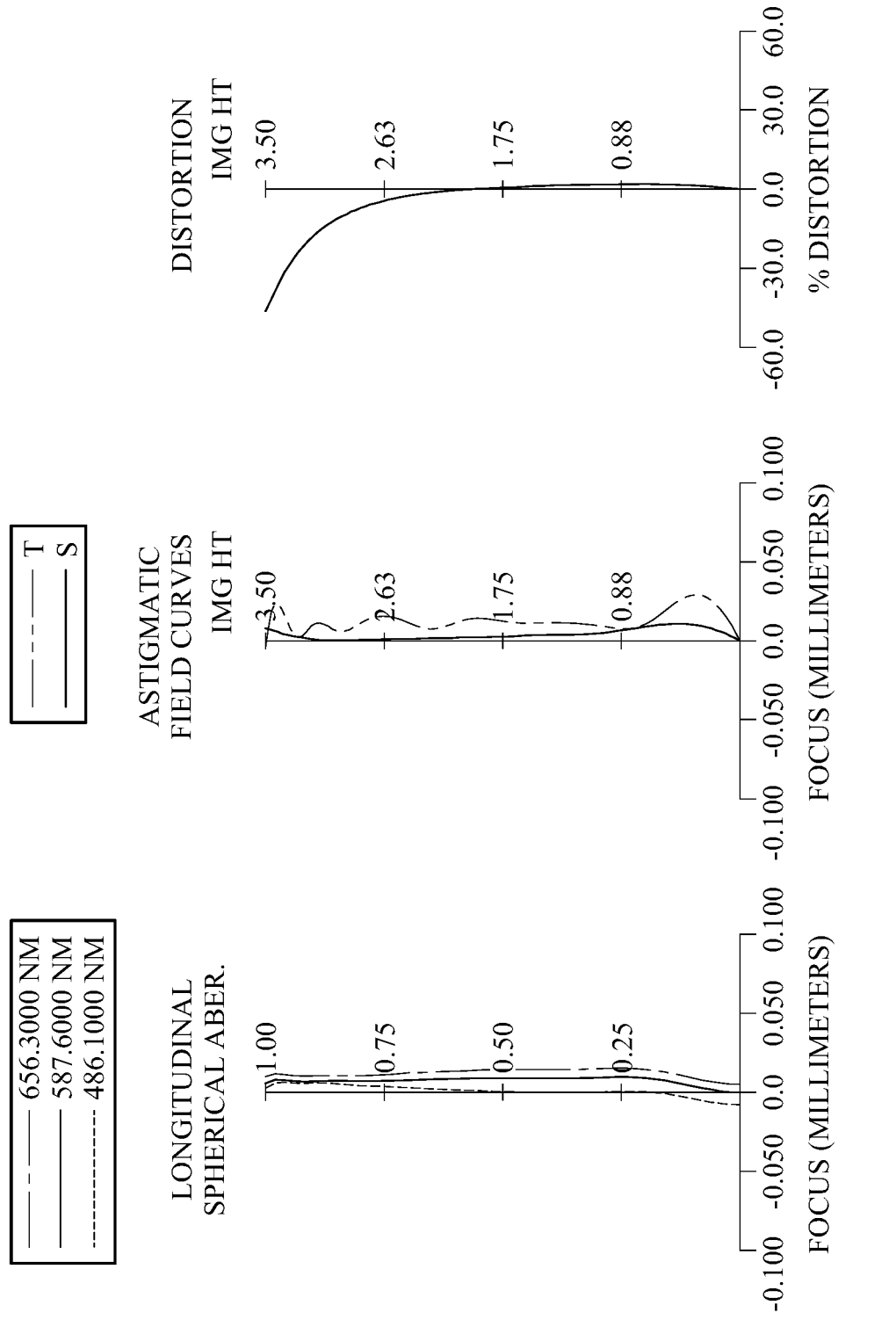
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the photographing lens assembly (its reference numeral is omitted) of the present disclosure and an image sensor IS. The photographing lens assembly includes, in order from an object side to an image side along an optical axis, a first lens element E1, a stop S1, a second lens element E2, an aperture stop ST, a third lens element E3, a stop S2, a fourth lens element E4, a fifth lens element E5, a sixth lens element E6, a stop S3, a seventh lens element E7, a filter E8 and an image surface IMG. The photographing lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has two inflection points. The object-side surface of the fourth lens element E4 has three critical points in an off-axis region thereof. The image-side surface of the fourth lens element E4 has two critical points in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has three inflection points.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the photographing lens assembly. The image sensor IS is disposed on or near the image surface IMG of the photographing lens assembly.

The detailed optical data of the 9th embodiment are shown in Table 9A and the aspheric surface data are shown in Table 9B below.

TABLE 9A

|  |  |  |  |  |  |  |  |  | Focal |
| Surface # |  | Curvature Radius |  | Thickness | Material | Index | Abbe # | Length |
| --- | --- | --- | --- | --- | --- | --- | --- | --- | --- |
| 0 | Object | Plano |  | Infinity |  |  |  |  |
| 1 | Lens 1 | −2.7959 | (ASP) | 0.491 | Plastic | 1.511 | 56.8 | −3.05 |
| 2 |  | 3.7268 | (ASP) | 0.801 |  |  |  |  |
| 3 | Stop | Plano |  | 0.009 |  |  |  |  |
| 4 | Lens 2 | 2.2556 | (ASP) | 0.947 | Plastic | 1.639 | 23.5 | 13.04 |
| 5 |  | 2.5871 | (ASP) | 0.348 |  |  |  |  |
| 6 | Ape. Stop | Plano |  | −0.081 |  |  |  |  |
| 7 | Lens 3 | 2.9661 | (ASP) | 1.016 | Plastic | 1.544 | 56.0 | 1.94 |
| 8 |  | −1.4418 | (ASP) | −0.302 |  |  |  |  |
| 9 | Stop | Plano |  | 0.352 |  |  |  |  |
| 10 | Lens 4 | −3.5686 | (ASP) | 0.310 | Plastic | 1.642 | 22.5 | −5.77 |
| 11 |  | −100.0000 | (ASP) | 0.046 |  |  |  |  |
| 12 | Lens 5 | −58.5085 | (ASP) | 0.586 | Plastic | 1.511 | 56.8 | 2104.02 |
| 13 |  | −55.6761 | (ASP) | 0.517 |  |  |  |  |
| 14 | Lens 6 | 5.6382 | (ASP) | 0.954 | Glass | 1.523 | 58.7 | 3.12 |
| 15 |  | −2.1652 | (ASP) | −0.821 |  |  |  |  |
| 16 | Stop | Plano |  | 0.851 |  |  |  |  |
| 17 | Lens 7 | 2.7518 | (ASP) | 0.689 | Plastic | 1.614 | 25.6 | −3.91 |
| 18 |  | 1.1595 | (ASP) | 0.700 |  |  |  |  |
| 19 | Filter | Plano |  | 0.210 | Glass | 1.517 | 64.2 | — |
| 20 |  | Plano |  | 0.206 |  |  |  |  |
| 21 | Image | Plano |  | — |  |  |  |  |

9th Embodiment
f = 2.07 mm, Fno = 2.06, HFOV = 72.4 deg.

Note:

Reference wavelength is 587.6 nm (d-line).

An effective radius of the stop S1 (Surface 3) is 1.350 mm.

An effective radius of the stop S2 (Surface 9) is 0.883 mm.

An effective radius of the stop S3 (Surface 16) is 2.017 mm.

TABLE 9B

| Aspheric Coefficients | | | |
|---|---|---|---|
| Surface # | 1 | 2 | 4 | 5 |

| | 1 | 2 | 4 | 5 |
|---|---|---|---|---|
| k= | 0.00000E+00 | 0.00000E+00 | 0.00000E+00 | 0.00000E+00 |
| A4= | 2.277311377E−01 | 1.945487340E−01 | 2.920631061E−02 | 8.201873170E−02 |
| A6= | −1.990576025E−01 | 3.459400271E−01 | −1.362766339E−01 | −3.722182971E−01 |
| A8= | 1.470017920E−01 | −2.451165291E+00 | 6.310306144E−01 | 7.188073407E+00 |
| A10= | −8.204811529E−02 | 7.818229316E+00 | −2.551916183E+00 | −9.150673918E+01 |
| A12= | 3.290912687E−02 | −1.650540808E+01 | 7.967910784E+00 | 7.752213772E+02 |
| A14= | −8.803427609E−03 | 2.478255287E+01 | −1.897929532E+01 | −4.507536145E+03 |
| A16= | 1.239228574E−03 | −2.716589958E+01 | 3.420564804E+01 | 1.839158926E+04 |
| A18= | 7.375852847E−05 | 2.194838197E+01 | −4.629983180E+01 | −5.331590229E+04 |
| A20= | −7.969172483E−05 | −1.304579762E+01 | 4.654705887E+01 | 1.100393665E+05 |
| A22= | 1.928595896E−05 | 5.628100847E+00 | −3.413311878E+01 | −1.600925213E+05 |
| A24= | −2.639052553E−06 | −1.711889736E+00 | 1.770709124E+01 | 1.599460014E+05 |
| A26= | 2.195989639E−07 | 3.475249291E−01 | −6.154367645E+00 | −1.041091218E+05 |
| A28= | −1.040513732E−08 | −4.219206994E−02 | 1.286636847E+00 | 3.962779779E+04 |
| A30= | 2.164471769E−10 | 2.313235337E−03 | −1.225278488E−01 | −6.670486743E+03 |

| Surface # | 7 | 8 | 10 | 11 |
|---|---|---|---|---|
| k= | 0.00000E+00 | 0.00000E+00 | 0.00000E+00 | 0.00000E+00 |
| A4= | 1.794868105E−02 | 1.063966005E−01 | −4.183106283E−02 | −1.963745311E−01 |
| A6= | 7.205855200E−01 | −1.575097469E+00 | −1.148225996E+00 | 8.182896250E−02 |
| A8= | −1.261908176E+01 | 1.166643619E+01 | 4.424905368E+00 | 8.122212081E−01 |
| A10= | 1.432037789E+02 | −6.265683762E+01 | −4.169356223E−01 | −2.072795628E−01 |
| A12= | −1.157728714E+03 | 2.454052178E+02 | −1.128082491E+02 | −1.913412158E+01 |
| A14= | 6.944772784E+03 | −6.981480815E+02 | 7.400561252E+02 | 8.793060469E+01 |
| A16= | −3.153401912E+04 | 1.428515627E+03 | −2.687900128E+03 | −2.075023817E+02 |
| A18= | 1.084891130E+05 | −2.048605452E+03 | 6.445618208E+03 | 3.144018726E+02 |
| A20= | −2.791314416E+05 | 1.925608789E+03 | −1.070080416E+04 | −3.291159300E+02 |
| A22= | 5.241545818E+05 | −9.516904577E+02 | 1.238186858E+04 | 2.431755883E+02 |
| A24= | −6.917678968E+05 | −9.516148143E+01 | −9.795457827E+03 | −1.252569968E+02 |
| A26= | 6.036585089E+05 | 4.538556268E+02 | 5.042430430E+03 | 4.286055614E+01 |
| A28= | −3.107649542E+05 | −2.597905364E+02 | −1.518430949E+03 | −8.742044997E+00 |
| A30= | 7.103622197E+04 | 5.240144293E+01 | 2.024186803E+02 | 8.017022906E−01 |

| Surface # | 12 | 13 | 14 | 15 |
|---|---|---|---|---|
| k= | 0.00000E+00 | 0.00000E+00 | −2.88858E+00 | 0.00000E+00 |
| A4= | −2.996739316E−01 | −2.161939068E−01 | −6.275548145E−02 | −3.470174232E−02 |
| A6= | 5.823391560E−01 | 1.311400979E−01 | 3.390000158E−01 | 7.386048499E−01 |
| A8= | −4.112171211E−01 | −1.574613973E−01 | −1.747164622E+00 | −2.872431735E+00 |
| A10= | 4.070110806E+00 | 9.247044629E−01 | 4.845682969E+00 | 6.247513432E+00 |
| A12= | −3.123798556E+01 | −3.459269664E+00 | −8.689973137E+00 | −8.711725984E+00 |
| A14= | 1.069769683E+02 | 7.763191963E+00 | 1.078853770E+01 | 8.332864442E+00 |
| A16= | −2.150256020E+02 | −1.156415430E+01 | −9.574052968E+00 | −5.663472968E+00 |
| A18= | 2.832047203E+02 | 1.197942314E+01 | 6.154949948E+00 | 2.777906735E+00 |
| A20= | −2.560563755E+02 | −8.747799811E+00 | −2.867699885E+00 | −9.850343222E−01 |
| A22= | 1.610493082E+02 | 4.472099792E+00 | 9.570987585E−01 | 2.497920181E−01 |
| A24= | −6.956200520E+01 | −1.560321846E+00 | −2.226877788E−01 | −4.411147313E−02 |
| A26= | 1.973288027E+01 | 3.526561933E−01 | 3.425722356E−02 | 5.147200232E−03 |
| A28= | −3.316304686E+00 | −4.638461990E−02 | −3.127961038E−03 | −3.564260065E−04 |
| A30= | 2.504194999E−01 | 2.687885158E−03 | 1.282177243E−04 | 1.108362954E−05 |

| Surface # | 17 | 18 |
|---|---|---|
| k= | 0.00000E+00 | −1.04554E+00 |
| A4= | −3.209492955E−01 | −2.712825355E−01 |
| A6= | 8.549980506E−01 | 1.118614318E−01 |
| A8= | −2.890144779E+00 | 1.084443066E−02 |
| A10= | 5.963096392E+00 | −5.354819138E−02 |
| A12= | −7.871467305E+00 | 4.109958504E−02 |
| A14= | 7.077190798E+00 | −1.863285249E−02 |
| A16= | −4.493280625E+00 | 5.752628118E−03 |
| A18= | 2.048662566E+00 | −1.263285691E−03 |
| A20= | −6.728481846E−01 | 1.997499178E−04 |
| A22= | 1.576588344E−01 | −2.260064405E−05 |
| A24= | −2.568869092E−02 | 1.785458659E−06 |
| A26= | 2.763819340E−03 | −9.352433266E−08 |
| A28= | −1.764437167E−04 | 2.917882848E−09 |
| A30= | 5.060196633E−06 | −4.102894920E−11 |

In the 9th embodiment, the equation of the aspheric surface profiles of the aforementioned lens elements is the same as the equation of the 1st embodiment. Also, the definitions of these parameters shown in Table 9C are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

| Schematic Parameters | | | |
|---|---|---|---|
| f [mm] | 2.07 | (\|R11\| + \|R12\|)/f | 3.77 |
| Fno | 2.06 | (R13 + R14)/(R13 − R14) | 2.46 |
| HFOV [deg.] | 72.4 | ΣCT/ΣAT | 2.90 |
| FOV [deg.] | 144.8 | CT7/CT6 | 0.72 |
| TL/f | 3.78 | (CT2 + CT5)/(CT1 + CT4) | 1.91 |
| EPD/ImgH | 0.29 | T12/(CT2 + T23) | 0.67 |
| 10 × f/TD | 3.08 | (T12 + T23)/CT2 | 1.14 |
| \|f/f3\| | 1.07 | T12/CT3 | 0.80 |
| \|f1/f3\| | 1.57 | T12/CT7 | 1.18 |
| f1/f7 | 0.78 | CT6/CT5 | 1.63 |
| f4/f6 | −1.85 | (T23 + T34)/(T12 + T45) | 0.37 |
| \|f6/f5\| | 0.00 | (V2 + V4)/V5 | 0.81 |
| \|f/f34\| | 0.76 | SAG7R1/CT7 | −1.21 |
| (\|f/f1\| + \|f/f6\|)/\|f/f4\| | 3.74 | ET7/ET6 | 4.87 |
| \|R1 + R2\|/\|R1 − R2\| | 0.14 | Y7R1/Y6R1 | 1.14 |
| \|(R1 + R4)/(R1 − R4)\| | 0.04 | Yc72/Y6R2 | 1.00 |
| (\|R1\| + \|R11\|)/f | 4.08 | Yc61/Yc11 | 0.85 |
| (R5 + R6)/(R5 − R6) | 0.35 | \|DIST\|max | 46.4% |
| 100 × \|R11/R9\| | 9.64 | — | — |

10th Embodiment

Figure 19:
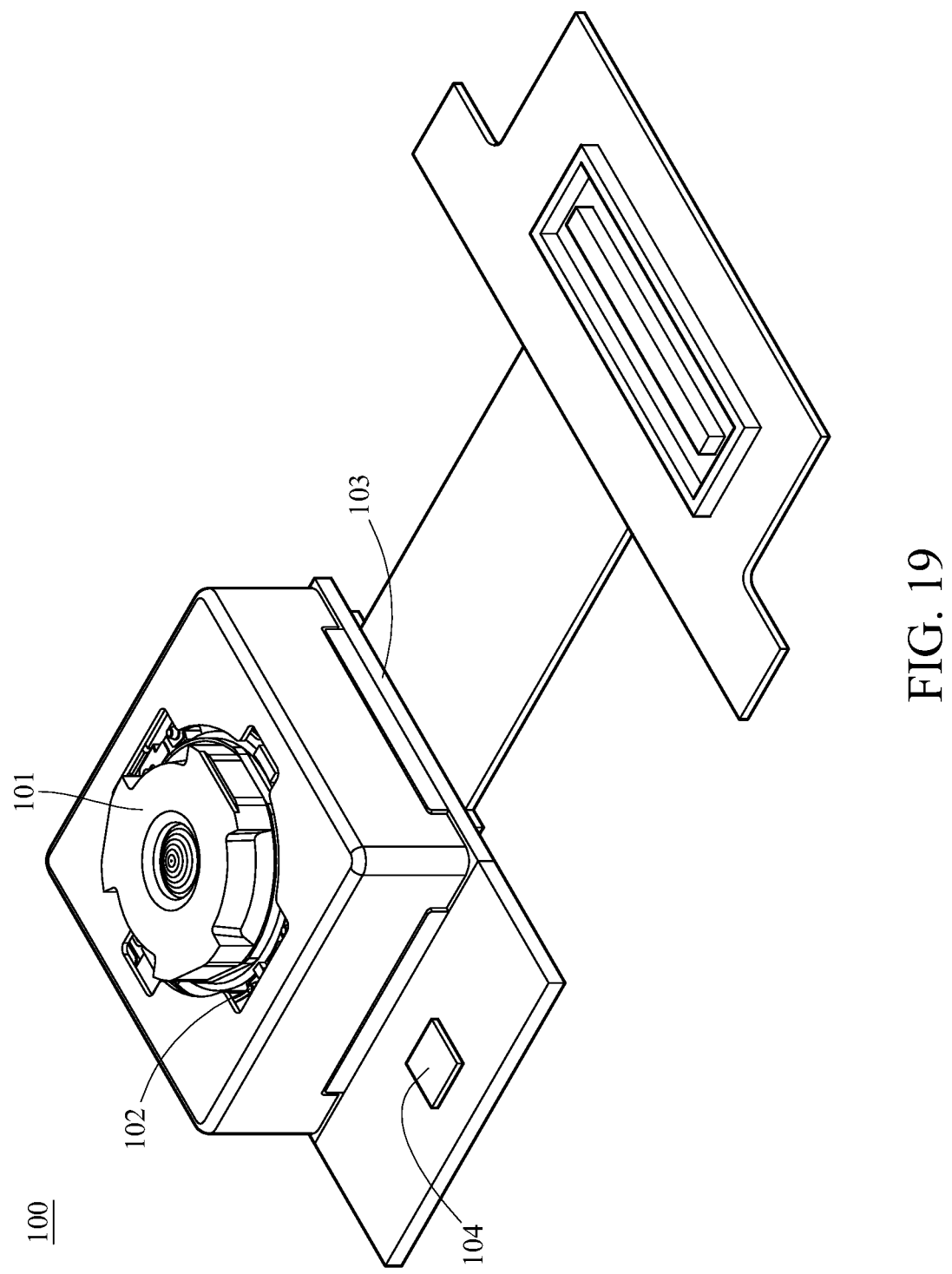
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 100 is a camera module including a lens unit 101, a driving device 102, an image sensor 103 and an image stabilizer 104. The lens unit 101 includes the photographing lens assembly disclosed in the 1st embodiment, a barrel and a holder member (their reference numerals are omitted) for holding the photographing lens assembly. However, the lens unit 101 may alternatively be provided with the photographing lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the photographing lens assembly to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

11th Embodiment

Figure 20:
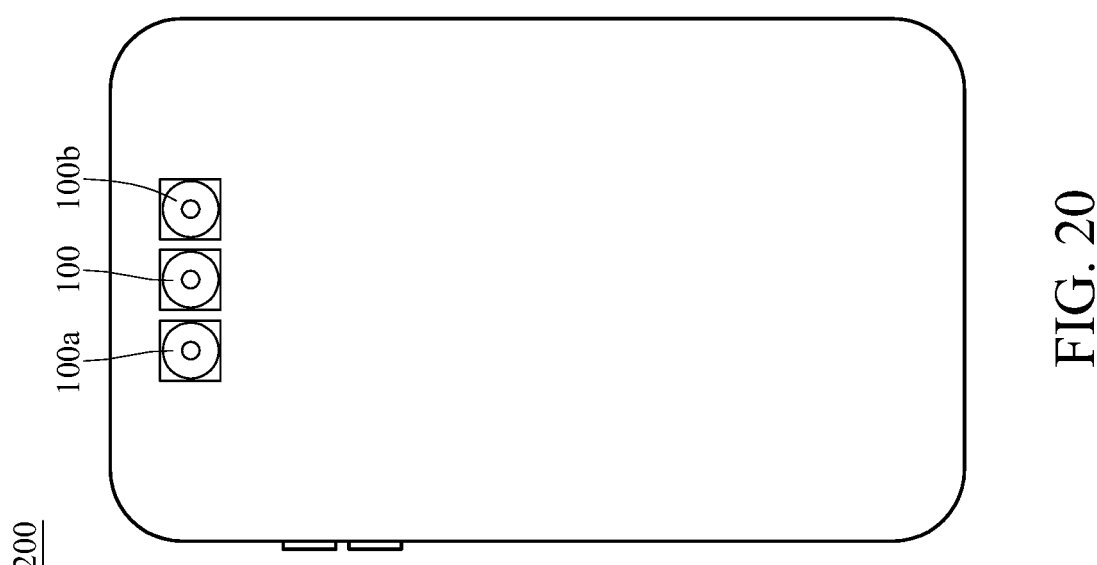
FIG. 20 is a perspective view of an electronic device according to the 11th embodiment of the present disclosure.
Figure 21:
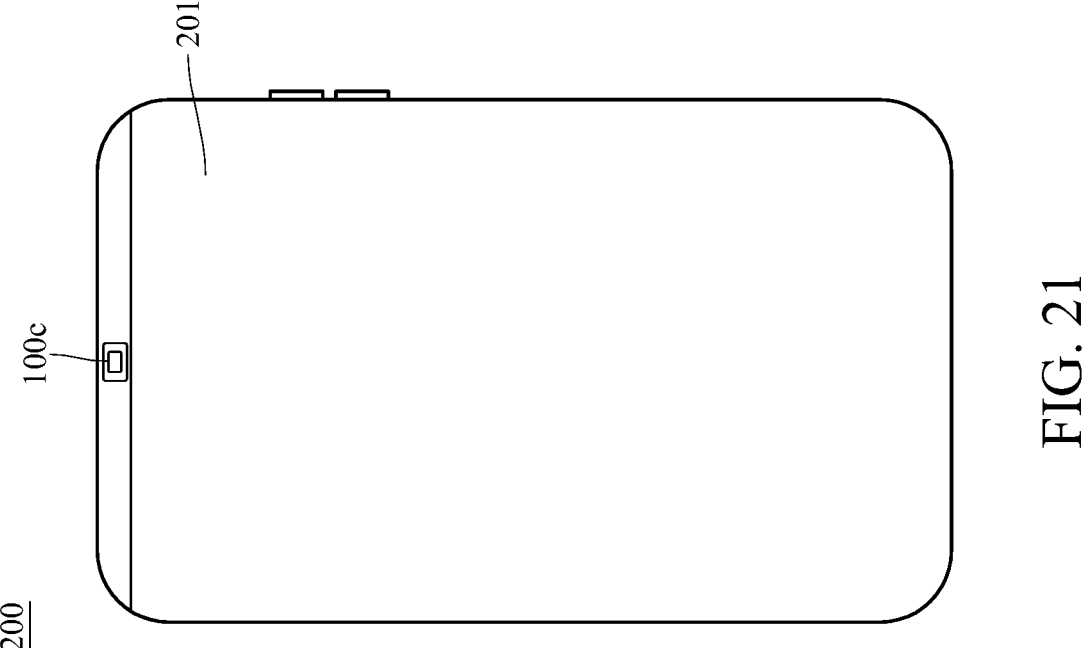
FIG. 21 is another perspective view of the electronic device in FIG. 20.

FIG. 20 is a perspective view of an electronic device according to the 11th embodiment of the present disclosure. FIG. 21 is another perspective view of the electronic device in FIG. 20.

In this embodiment, an electronic device 200 is a smartphone including the image capturing unit 100 disclosed in the 10th embodiment, an image capturing unit 100a, an image capturing unit 100b, an image capturing unit 100c and a display unit 201. As shown in FIG. 20, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 21, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the photographing lens assembly of the present disclosure and can have a configuration similar to that of the image capturing unit 100. In detail, each of the image capturing units 100a, 100b and 100c can include a lens unit, a driving device, an image sensor and an image stabilizer, and each of the lens unit can include a photographing lens assembly such as the photographing lens assembly of the present disclosure, a barrel and a holder member for holding the photographing lens assembly.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 21, the image capturing unit 100c can have a non-circular opening, and the lens barrel or the lens elements in the image capturing unit 100c can have one or more trimmed edges at outer diameter positions thereof for corresponding to the non-circular opening. Therefore, it is favorable for further reducing the length of the image capturing unit 100c along single axis, thereby reducing the overall size of the lens, increasing the area ratio of the display unit 201 with respect to the electronic device 200, reducing the thickness of the electronic device 200, and achieving compactness of the overall module. In this embodiment, the electronic device 200 includes multiple image capturing units 100, 100a, 100b and 100c, but the present disclosure is not limited to the number and arrangement of image capturing units.

12th Embodiment

Figure 22:
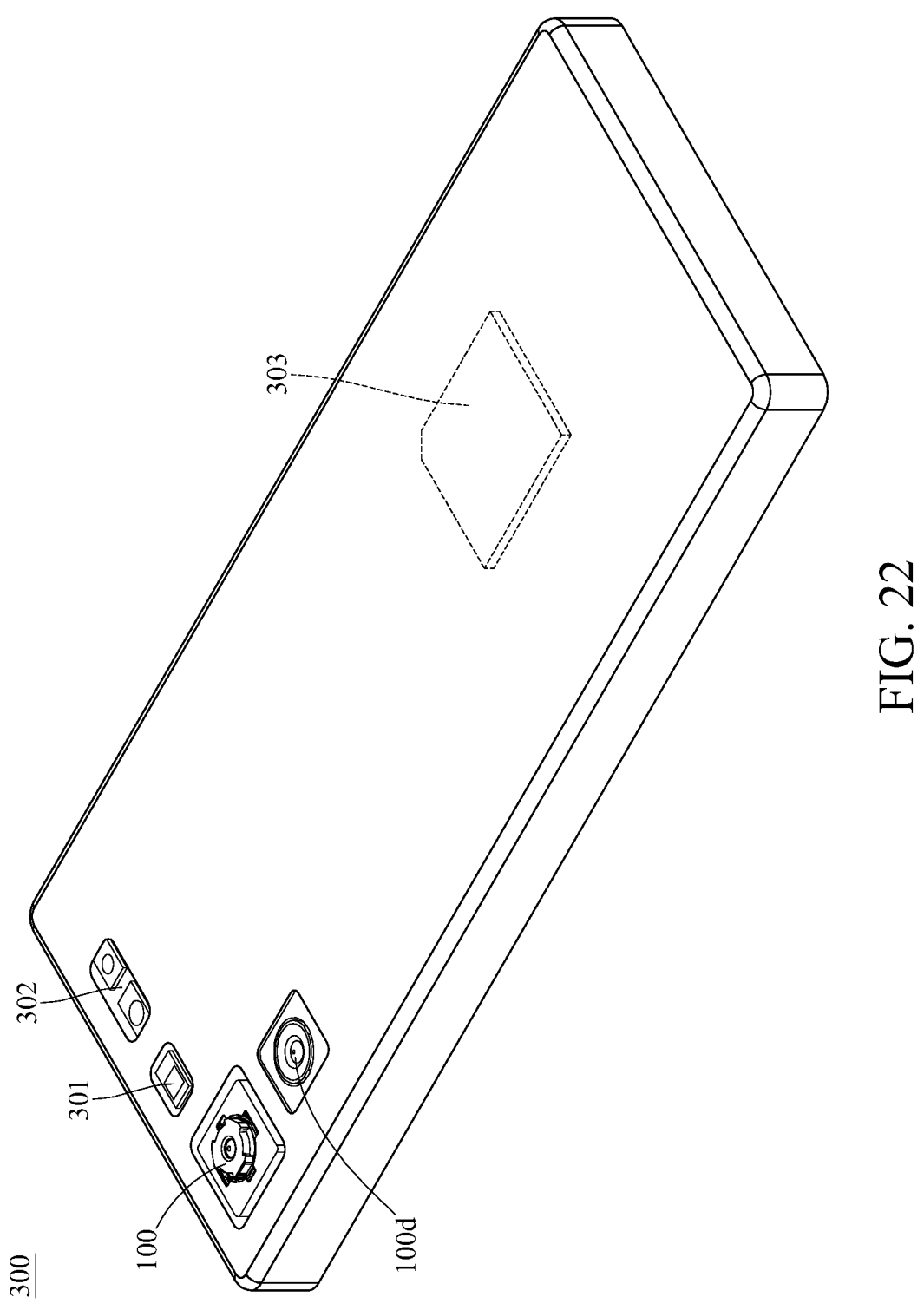
FIG. 22 is a perspective view of an electronic device according to the 12th embodiment of the present disclosure.

FIG. 22 is a perspective view of an electronic device according to the 12th embodiment of the present disclosure.

Figure 23:
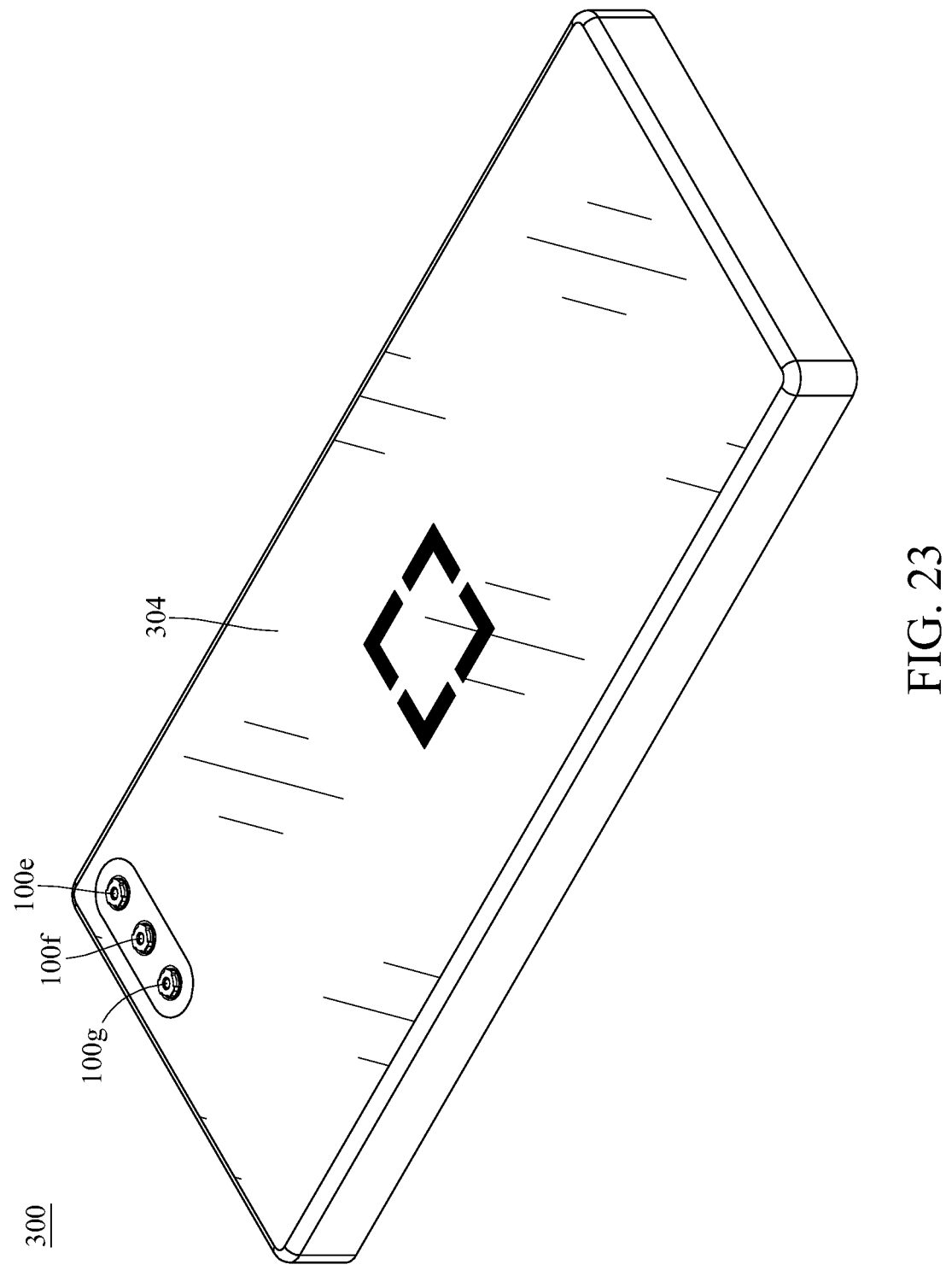
FIG. 23 is another perspective view of the electronic device in FIG. 22.
Figure 24:
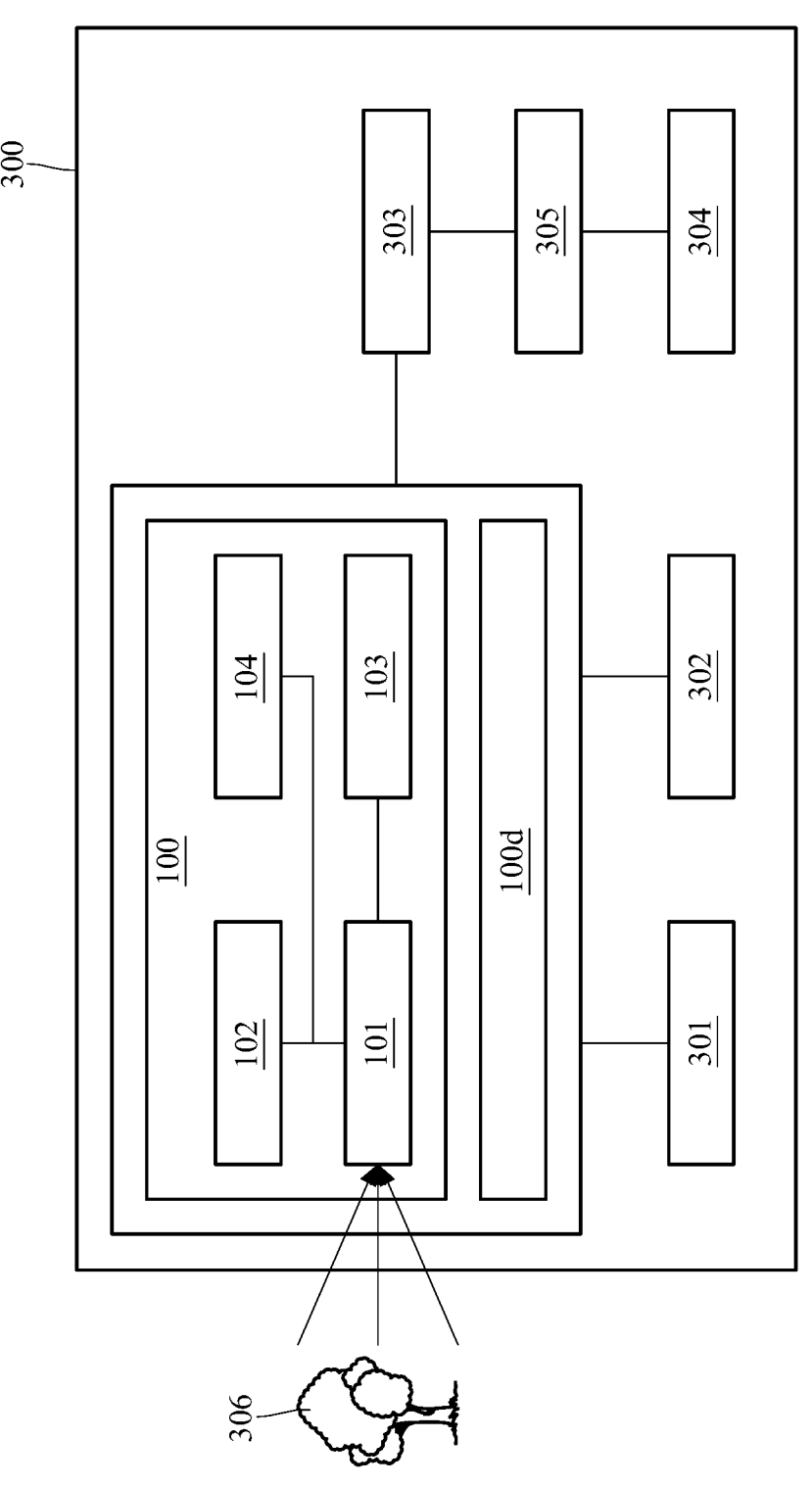
FIG. 24 is a block diagram of the electronic device in FIG. 22.

FIG. 23 is another perspective view of the electronic device in FIG. 22. FIG. 24 is a block diagram of the electronic device in FIG. 22.

In this embodiment, an electronic device 300 is a smartphone including the image capturing unit 100 disclosed in the 10th embodiment, an image capturing unit 100*d*, an image capturing unit 100*e*, an image capturing unit 100*f*, an image capturing unit 100*g*, a flash module 301, a focus assist module 302, an image signal processor 303, a display module 304 and an image software processor 305. The image capturing unit 100 and the image capturing unit 100*d* are disposed on the same side of the electronic device 300. The focus assist module 302 can be a laser rangefinder or a ToF (time of flight) module, but the present disclosure is not limited thereto. The image capturing unit 100*e*, the image capturing unit 100*f*, the image capturing unit 100*g* and the display module 304 are disposed on the opposite side of the electronic device 300, and the display module 304 can be a user interface, such that the image capturing units 100*e*, 100*f*, 100*g* can be front-facing cameras of the electronic device 300 for taking selfies, but the present disclosure is not limited thereto. Furthermore, each of the image capturing units 100*d*, 100*e*, 100*f* and 100*g* can include the photographing lens assembly of the present disclosure and can have a configuration similar to that of the image capturing unit 100. In detail, each of the image capturing units 100*d*, 100*e*, 100*f* and 100*g* can include a lens unit, a driving device, an image sensor and an image stabilizer, and each of the lens unit can include a photographing lens assembly such as the photographing lens assembly of the present disclosure, a barrel and a holder member for holding the photographing lens assembly.

The image capturing unit 100 is a wide-angle image capturing unit, the image capturing unit 100*d* is an ultra-wide-angle image capturing unit, the image capturing unit 100*e* is a wide-angle image capturing unit, the image capturing unit 100*f* is an ultra-wide-angle image capturing unit, and the image capturing unit 100*g* is a ToF image capturing unit. In this embodiment, the image capturing units 100 and 100*d* have different fields of view, such that the electronic device 300 can have various magnification ratios so as to meet the requirement of optical zoom functionality. In addition, the image capturing unit 100*g* can determine depth information of the imaged object. In this embodiment, the electronic device 300 includes multiple image capturing units 100, 100*d*, 100*e*, 100*f* and 100*g*, but the present disclosure is not limited to the number and arrangement of image capturing units.

When a user captures images of an object 306, the light rays converge in the image capturing unit 100 or the image capturing unit 100*d* to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100*e*, 100*f* or 100*g* to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

13th Embodiment

Figure 25:
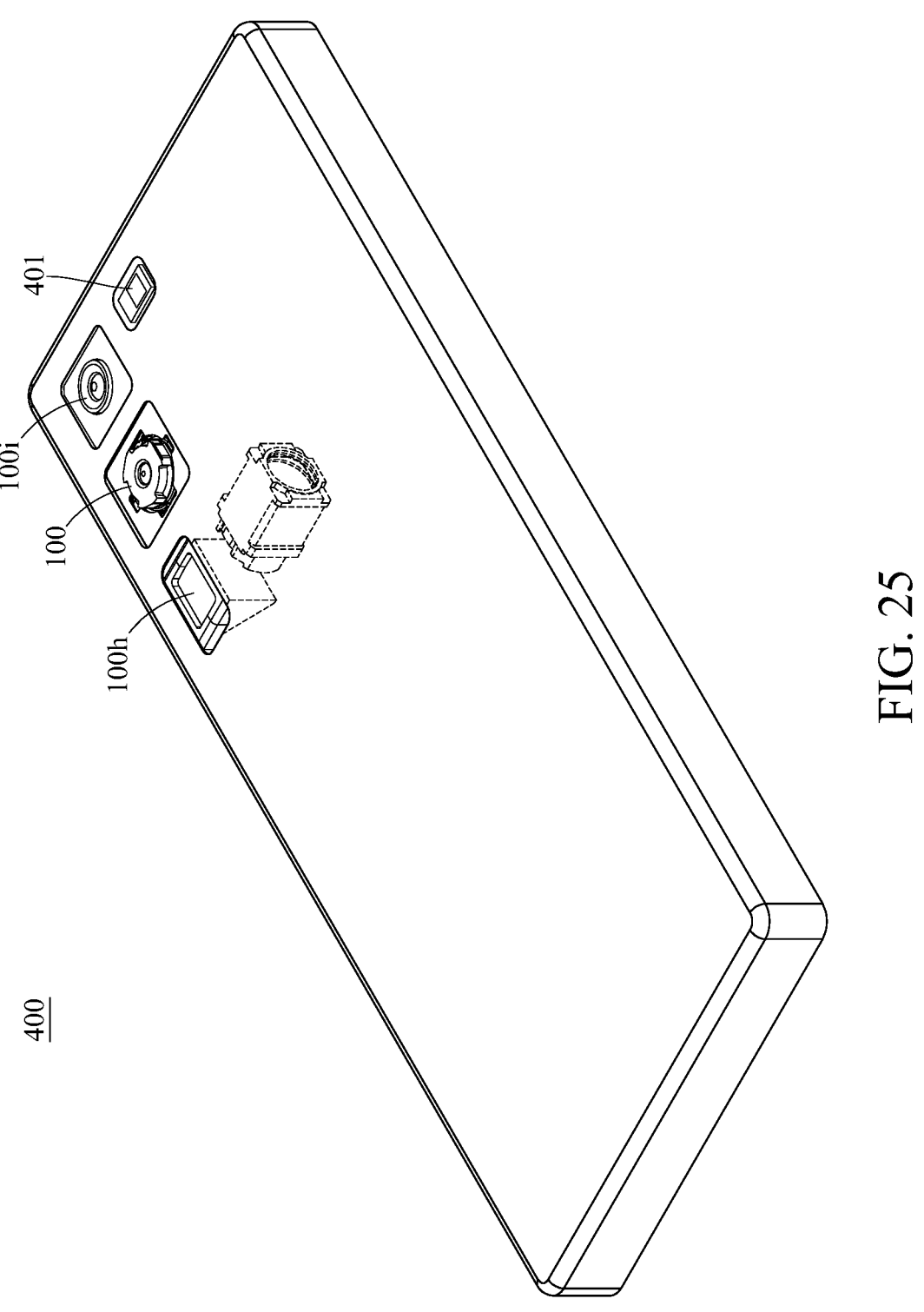
FIG. 25 is a perspective view of an electronic device according to the 13th embodiment of the present disclosure.

FIG. 25 is a perspective view of an electronic device according to the 13th embodiment of the present disclosure.

In this embodiment, an electronic device 400 is a smartphone including the image capturing unit 100 disclosed in the 10th embodiment, an image capturing unit 100*h*, an image capturing unit 100*i*, a flash module 401, a focus assist module, an image signal processor, a display module and an image software processor (not shown). The image capturing unit 100, the image capturing unit 100*h* and the image capturing unit 100*i* are disposed on the same side of the electronic device 400, while the display module is disposed on the opposite side of the electronic device 400. Furthermore, each of the image capturing units 100*h* and 100*i* can include the photographing lens assembly of the present disclosure and can have a configuration similar to that of the image capturing unit 100, and the details in this regard will not be provided again.

The image capturing unit 100 is a wide-angle image capturing unit, the image capturing unit 100*h* is a telephoto image capturing unit, and the image capturing unit 100*i* is an ultra-wide-angle image capturing unit. In this embodiment, the image capturing units 100, 100*h* and 100*i* have different fields of view, such that the electronic device 400 can have various magnification ratios so as to meet the requirement of optical zoom functionality. Moreover, the image capturing unit 100*h* can be a telephoto image capturing unit having a light-folding element configuration, such that the total track length of the image capturing unit 100*h* is not limited by the thickness of the electronic device 400. Moreover, the light-folding element configuration of the image capturing unit 100*h* can be similar to, for example, one of the structures shown in FIG. 29 to FIG. 31, which can be referred to foregoing descriptions corresponding to FIG. 29 to FIG. 31, and the details in this regard will not be provided again. In this embodiment, the electronic device 400 includes multiple image capturing units 100, 100*h* and 100*i*, but the present disclosure is not limited to the number and arrangement of image capturing units. When a user captures images of an object, light rays converge in the image capturing unit 100, 100*h* or 100*i* to generate images, and the flash module 401 is activated for light supplement. Further, the subsequent processes are performed in a manner similar to the abovementioned embodiment, so the details in this regard will not be provided again.

14th Embodiment

Figure 26:
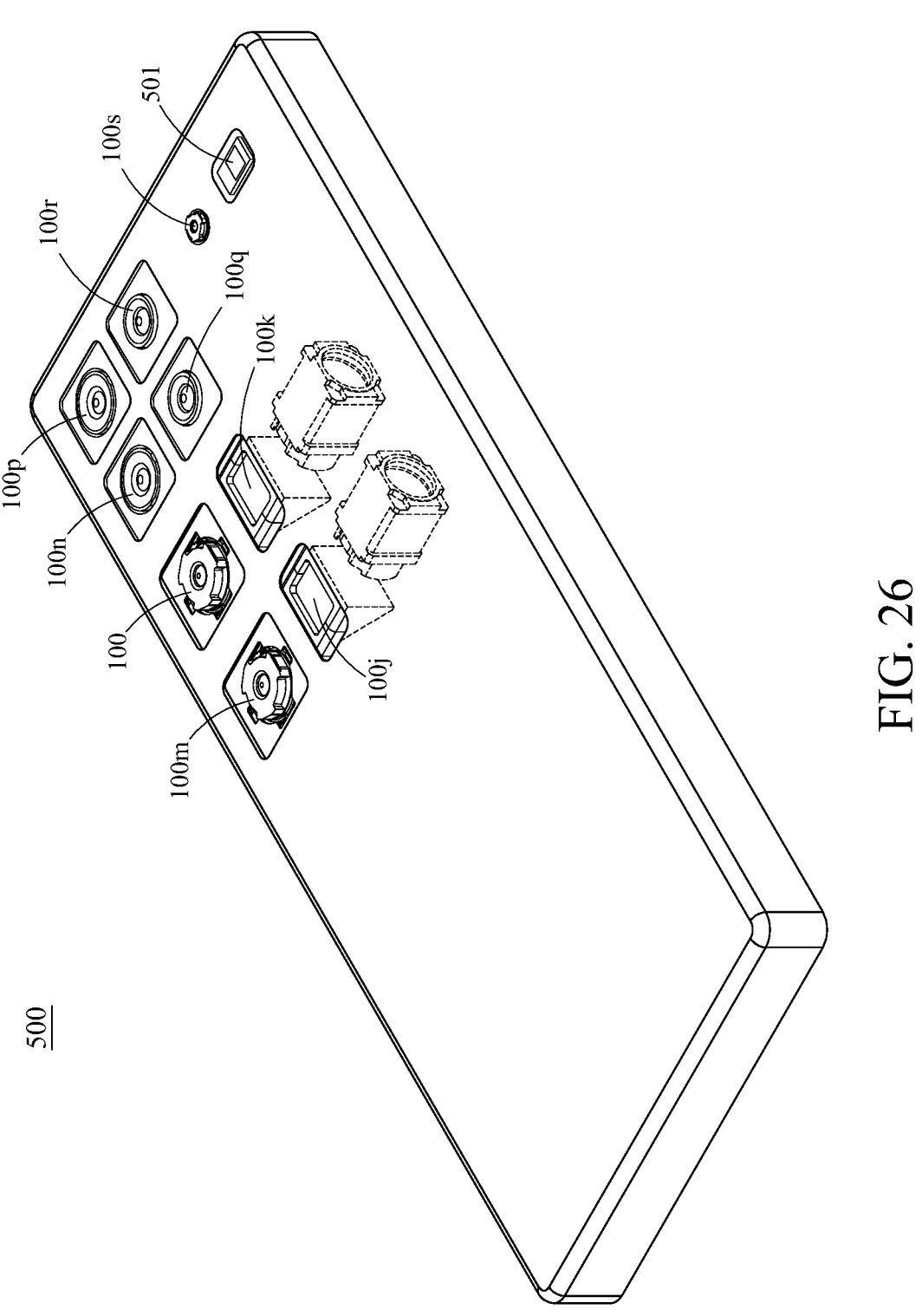
FIG. 26 is a perspective view of an electronic device according to the 14th embodiment of the present disclosure.

FIG. 26 is a perspective view of an electronic device according to the 14th embodiment of the present disclosure.

In this embodiment, an electronic device 500 is a smartphone including the image capturing unit 100 disclosed in the 10th embodiment, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, an image capturing unit 100*s*, a flash module 501, a focus assist module, an image signal processor, a display module and an image software processor (not shown). The image capturing units 100, 100*j*, 100*k*, 100*m*, 100*n*, 100*p*, 100*q*, 100*r* and 100*s* are disposed on the same side of the electronic device 500, while the display module is disposed on the opposite side of the electronic device 500. Furthermore, each of the image capturing units 100*j*, 100*k*, 100*m*, 100*n*, 100*p*, 100*q*, 100*r* and 100*s* can include the photographing lens assembly of the present disclosure and can have a configuration similar to that of the image capturing unit 100, and the details in this regard will not be provided again.

The image capturing unit 100 is a wide-angle image capturing unit, the image capturing unit 100*j* is a telephoto image capturing unit, the image capturing unit 100*k* is a telephoto image capturing unit, the image capturing unit 100*m* is a wide-angle image capturing unit, the image capturing unit 100*n* is an ultra-wide-angle image capturing unit, the image capturing unit 100*p* is an ultra-wide-angle image capturing unit, the image capturing unit 100*q* is a telephoto image capturing unit, the image capturing unit 100*r* is a telephoto image capturing unit, and the image capturing unit 100*s* is a ToF image capturing unit. In this embodiment, the image capturing units 100, 100*j*, 100*k*, 100*m*, 100*n*, 100*p*, 100*q* and 100*r* have different fields of view, such that the electronic device 500 can have various magnification ratios so as to meet the requirement of optical zoom functionality. Moreover, each of the image capturing units 100*j* and 100*k* can be a telephoto image capturing unit having a light-folding element configuration. Moreover, the light-folding element configuration of each of the image capturing unit 100*j* and 100*k* can be similar to, for example, one of the structures shown in FIG. 29 to FIG. 31, which can be referred to foregoing descriptions corresponding to FIG. 29 to FIG. 31, and the details in this regard will not be provided again. In addition, the image capturing unit 100*s* can determine depth information of the imaged object. In this embodiment, the electronic device 500 includes multiple image capturing units 100, 100*j*, 100*k*, 100*m*, 100*n*, 100*p*, 100*q*, 100*r* and 100*s*, but the present disclosure is not limited to the number and arrangement of image capturing units. When a user captures images of an object, the light rays converge in the image capturing unit 100, 100*j*, 100*k*, 100*m*, 100*n*, 100*p*, 100*q*, 100*r* or 100*s* to generate images, and the flash module 501 is activated for light supplement. Further, the subsequent processes are performed in a manner similar to the abovementioned embodiments, and the details in this regard will not be provided again.

The smartphone in several embodiments is only exemplary for showing the image capturing unit of the present disclosure installed in an electronic device, and the present disclosure is not limited thereto. The image capturing unit can be optionally applied to optical systems with a movable focus. Furthermore, the photographing lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-9C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein the first lens element has negative refractive power, the image-side surface of the second lens element is concave in a paraxial region thereof, the image-side surface of the third lens element is convex in a paraxial region thereof, the fourth lens element has negative refractive power, the sixth lens element has positive refractive power, the object-side surface of the sixth lens element is convex in a paraxial region thereof, the image-side surface of the sixth lens element is convex in a paraxial region thereof, and the image-side surface of the seventh lens element has at least one inflection point;

wherein an axial distance between the object-side surface of the first lens element and an image surface is TL, a focal length of the photographing lens assembly is f, a curvature radius of the object-side surface of the fifth lens element is R9, a curvature radius of the object-side surface of the sixth lens element is R11, and the following conditions are satisfied:

$$1.80 < TL/f < 4.20; \text{ and}$$

$$0.00 < 100 \times |R11/R9| < 23.50.$$

2. The photographing lens assembly of claim 1, wherein the third lens element has positive refractive power, the object-side surface of the third lens element is convex in a paraxial region thereof, the seventh lens element has negative refractive power, the image-side surface of the seventh lens element is concave in a paraxial region thereof, and at least one of the object-side surface and the image-side surface of each of all lens elements of the photographing lens assembly is aspheric.

3. The photographing lens assembly of claim 1, wherein the object-side surface of the first lens element is concave in a paraxial region thereof, the image-side surface of the first lens element is concave in a paraxial region thereof, and at least four lens elements of the photographing lens assembly are made of plastic material.

4. The photographing lens assembly of claim 1, wherein a central thickness of the fifth lens element is CT5, a central thickness of the sixth lens element is CT6, and the following condition is satisfied:

$$0.80 < CT6/CT5 < 3.50.$$

5. The photographing lens assembly of claim 1, wherein the focal length of the photographing lens assembly is f, a composite focal length of the third lens element and the fourth lens element is f34, the curvature radius of the object-side surface of the sixth lens element is R11, a curvature radius of the image-side surface of the sixth lens element is R12, and the following conditions are satisfied:

$$0.25 < |f/f34| < 1.25; \text{ and}$$

$$0.50 < (|R11| + |R12|)/f < 15.00.$$

6. The photographing lens assembly of claim 1, wherein a curvature radius of the object-side surface of the first lens element is R1, a curvature radius of the image-side surface of the first lens element is R2, and the following condition is satisfied:

$$0.00 < |R1 + R2|/|R1 - R2| < 1.50.$$

7. The photographing lens assembly of claim 1, wherein a central thickness of the sixth lens element is CT6, a central thickness of the seventh lens element is CT7, and the following condition is satisfied:

$$0.30 < CT7/CT6 < 1.05.$$

8. The photographing lens assembly of claim 1, wherein a focal length of the first lens element is f1, a focal length of the third lens element is f3, a curvature radius of the object-side surface of the seventh lens element is R13, a curvature radius of the image-side surface of the seventh lens element is R14, and the following conditions are satisfied:

$$0.10 < |f1/f3| < 5.00; \text{ and}$$

$$-0.30 < (R13 + R14)/(R13 - R14) < 10.00.$$

9. The photographing lens assembly of claim 1, wherein an entrance pupil diameter of the photographing lens assembly is EPD, a maximum image height of the photographing lens assembly is ImgH, a maximum effective radius of the object-side surface of the sixth lens element is Y6R1, a maximum effective radius of the object-side surface of the seventh lens element is Y7R1, and the following conditions are satisfied:

$$0.20 < EPD/ImgH < 0.50; \text{ and}$$

$$1.00 < Y7R1/Y6R1 < 1.25.$$

10. The photographing lens assembly of claim 1, wherein a vertical distance between a critical point on the image-side surface of the seventh lens element and an optical axis is Yc72, a maximum effective radius of the image-side surface of the sixth lens element is Y6R2, a maximum value of an absolute value of a distortion aberration on the image surface at various fields of view is |DIST|max, and the following conditions are satisfied:

$$0.70 < Yc72/Y6R2 < 1.15; \text{ and}$$

$$30.0\% < |DIST|\text{max} < 80.0\%.$$

11. An image capturing unit, comprising:
the photographing lens assembly of claim 1; and
an image sensor disposed on the image surface of the photographing lens assembly.

12. An electronic device, comprising:
the image capturing unit of claim 11.

13. A photographing lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
wherein the first lens element has negative refractive power, the image-side surface of the first lens element is concave in a paraxial region thereof, the image-side surface of the second lens element is concave in a paraxial region thereof, the fourth lens element has negative refractive power, the sixth lens element has positive refractive power, the object-side surface of the sixth lens element is convex in a paraxial region thereof, the image-side surface of the sixth lens element is convex in a paraxial region thereof, and the image-side surface of the seventh lens element has at least one inflection point;
wherein an axial distance between the object-side surface of the first lens element and an image surface is TL, a focal length of the photographing lens assembly is f, a focal length of the first lens element is f1, a focal length of the fourth lens element is f4, a focal length of the sixth lens element is f6, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a central thickness of the second lens element is CT2, a curvature radius of the object-side surface of the first lens element is R1, a curvature radius of the object-side surface of the sixth lens element is R11, and the following conditions are satisfied:

$$1.80 < TL/f < 4.20;$$

$$1.85 < (|f/f1| + |f/f6|)/|f/f4| < 12.50;$$

$$0.10 < (T12 + T23)/CT2 < 1.80;$$

$$0.50 < (|R1| + |R11|)/f < 10.00; \text{ and}$$

$$(T23 + T34)/(T12 + T45) < 1.85.$$

14. The photographing lens assembly of claim 13, wherein the object-side surface of the first lens element is concave in a paraxial region thereof, the object-side surface of the second lens element is convex in a paraxial region thereof, the image-side surface of the third lens element is convex in a paraxial region thereof, and the image-side surface of the seventh lens element is concave in a paraxial region thereof.

15. The photographing lens assembly of claim 13, wherein a maximum field of view of the photographing lens assembly is FOV, and the following condition is satisfied:

$$138.0 \text{ degrees} < FOV < 180.0 \text{ degrees.}$$

16. The photographing lens assembly of claim 13, wherein the axial distance between the first lens element and the second lens element is T12, a central thickness of the third lens element is CT3, and the following condition is satisfied:

$$0.10 < T12/CT3 < 0.90.$$

17. The photographing lens assembly of claim 13, wherein at least one of the object-side surface and the image-side surface of the sixth lens element has at least one inflection point;
    wherein the focal length of the fourth lens element is f4, the focal length of the sixth lens element is f6, and the following condition is satisfied:

$$-10.50 < f4/f6 < -1.00.$$

18. The photographing lens assembly of claim 13, wherein the curvature radius of the object-side surface of the first lens element is R1, a curvature radius of the image-side surface of the second lens element is R4, and the following condition is satisfied:

$$0.00 < \left| (R1 + R4)/(R1 - R4) \right| < 2.20.$$

19. The photographing lens assembly of claim 13, wherein the focal length of the first lens element is f1, a focal length of the seventh lens element is f7, the axial distance between the first lens element and the second lens element is T12, the axial distance between the second lens element and the third lens element is T23, the central thickness of the second lens element is CT2, and the following conditions are satisfied:

$$0.00 < f1/f7 < 1.50; \text{ and}$$
$$0.20 < T12/(CT2 + T23) < 3.00.$$

20. The photographing lens assembly of claim 13, wherein an Abbe number of the second lens element is V2, an Abbe number of the fourth lens element is V4, an Abbe number of the fifth lens element is V5, a displacement in parallel with an optical axis from an axial vertex on the object-side surface of the seventh lens element to a maximum effective radius position on the object-side surface of the seventh lens element is SAG7R1, a central thickness of the seventh lens element is CT7, and the following conditions are satisfied:

$$0.30 < (V2 + V4)/V5 < 1.80; \text{ and}$$
$$-2.00 < SAG7R1/CT7 < -0.50.$$

21. A photographing lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
    wherein the first lens element has negative refractive power, the object-side surface of the first lens element is concave in a paraxial region thereof, the sixth lens element has positive refractive power, and the image-side surface of the seventh lens element has at least one inflection point;
    wherein an axial distance between the object-side surface of the first lens element and an image surface is TL, a focal length of the photographing lens assembly is f, a sum of central thicknesses of all lens elements of the photographing lens assembly is ΣCT, a sum of axial distances between each of all adjacent lens elements of the photographing lens assembly is ΣAT, a focal length of the fifth lens element is f5, a focal length of the sixth lens element is f6, an axial distance between the object-side surface of the first lens element and the image-side surface of the seventh lens element is TD, a central thickness of the first lens element is CT1, a central thickness of the second lens element is CT2, a central thickness of the fourth lens element is CT4, a central thickness of the fifth lens element is CT5, and the following conditions are satisfied:

$$1.80 < TL/f < 4.10;$$
$$2.65 < \sum CT/\sum AT < 10.00;$$
$$0.00 \le \left| f6/f5 \right| < 0.55;$$
$$1.85 < 10 \times f/TD < 3.90; \text{ and}$$
$$1.40 < (CT2 + CT5)/(CT1 + CT4).$$

22. The photographing lens assembly of claim 21, wherein the image-side surface of the first lens element is concave in a paraxial region thereof, the image-side surface of the second lens element is concave in a paraxial region thereof, the image-side surface of the third lens element is convex in a paraxial region thereof, the object-side surface of the sixth lens element is convex in a paraxial region thereof, and the image-side surface of the seventh lens element is concave in a paraxial region thereof.

23. The photographing lens assembly of claim 21, further comprising an aperture stop disposed between the first lens element and the third lens element;
    wherein a maximum field of view of the photographing lens assembly is FOV, and the following condition is satisfied:

$$138.0 \text{ degrees} < FOV < 180.0 \text{ degrees.}$$

24. The photographing lens assembly of claim 21, wherein a curvature radius of the object-side surface of the first lens element is R1, a curvature radius of the object-side surface of the sixth lens element is R11, the focal length of the photographing lens assembly is f, and the following condition is satisfied:

$$0.50 < (|R1| + |R11|)/f < 10.00.$$

25. The photographing lens assembly of claim 21, wherein a curvature radius of the object-side surface of the third lens element is R5, a curvature radius of the image-side surface of the third lens element is R6, and the following condition is satisfied:

$$0.18 < (R5 + R6)/(R5 - R6) < 1.00.$$

26. The photographing lens assembly of claim 21, wherein an axial distance between the first lens element and the second lens element is T12, a central thickness of the seventh lens element is CT7, a focal length of the first lens element is f1, a focal length of the seventh lens element is f7, and the following conditions are satisfied:

$$0.10 < T12/CT7 < 1.35; \text{ and}$$
$$0.00 < f1/f7 < 1.50.$$

27. The photographing lens assembly of claim 21, wherein the object-side surface of the sixth lens element has at least one inflection point;

wherein the focal length of the photographing lens assembly is f, a focal length of the third lens element is f3, and the following condition is satisfied:

$$0.60 < |f/f3| < 2.00.$$

28. The photographing lens assembly of claim 21, wherein a distance in parallel with an optical axis between a maximum effective radius position of the object-side surface of the sixth lens element and a maximum effective radius position of the image-side surface of sixth first lens element is ET6, a distance in parallel with the optical axis between a maximum effective radius position of the object-side surface of the seventh lens element and a maximum effective radius position of the image-side surface of the seventh lens element is ET7, a vertical distance between a critical point on the object-side surface of the first lens element and the optical axis is Yc11, a vertical distance between a critical point on the object-side surface of the sixth lens element and the optical axis is Yc61, and the following conditions are satisfied:

$$2.40 < ET7/ET6 < 6.00; \text{ and}$$
$$0.75 < Yc61/Yc11 < 1.80.$$

29. The photographing lens assembly of claim 21, wherein the axial distance between the object-side surface of the first lens element and the image surface is TL, the focal length of the photographing lens assembly is f, a focal length of the first lens element is f1, a focal length of the fourth lens element is f4, the focal length of the fifth lens element is f5, the focal length of the sixth lens element is f6, a curvature radius of the object-side surface of the first lens element is R1, a curvature radius of the object-side surface of the fifth lens element is R9, a curvature radius of the object-side surface of the sixth lens element is R11, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, the central thickness of the first lens element is CT1, the central thickness of the second lens element is CT2, the central thickness of the fourth lens element is CT4, the central thickness of the fifth lens element is CT5, the sum of central thicknesses of all lens elements of the photographing lens assembly is ΣCT, the sum of axial distances between each of all adjacent lens elements of the photographing lens assembly is ΣAT, the axial distance between the object-side surface of the first lens element and the image-side surface of the seventh lens element is TD, and the following conditions are satisfied:

$$3.08 \le TL/f \le 3.78;$$
$$0.11 \le 100 \times |R11/R9| \le 19.34;$$
$$2.64 \le (|f/f1| + |f/f6|)/|f/f4| \le 4.76;$$
$$0.62 \le (T12 + T23)/CT2 \le 1.29;$$
$$1.80 \le (|R1| + |R11|)/f \le 4.08;$$
$$0.17 \le (T23 + T34)/(T12 + T45) \le 0.68;$$
$$2.90 \le \sum CT / \sum AT \le 5.11;$$
$$0.00 \le |f6/f5| \le 0.38;$$
$$3.08 \le 10 \times f/TD \le 3.82; \text{ and}$$
$$1.72 \le (CT2 + CT5)/(CT1 + CT4) \le 2.12.$$

* * * * *